US012572547B2

(12) United States Patent
Jordan et al.

(10) Patent No.: US 12,572,547 B2
(45) Date of Patent: Mar. 10, 2026

(54) SYSTEMS AND METHODS FOR DEPLOYMENT OF CONTINUOUS ACCESS EVALUATION PROTOCOL (CAEP) HUB ENGINE

(71) Applicant: SGNL.AI, INC., Palo Alto, CA (US)

(72) Inventors: Marc Jordan, Melbourne (AU); Jason Carulli, Laguna Beach, CA (US); Nick Holbrook, Plymouth, MI (US); Erik Gustavson, Palo Alto, CA (US)

(73) Assignee: SGNL.AI, INC., Palo Alto, CA (US)

( * ) Notice: Subject to any disclaimer, the term of this patent is extended or adjusted under 35 U.S.C. 154(b) by 0 days.

(21) Appl. No.: 19/067,737

(22) Filed: Feb. 28, 2025

(65) Prior Publication Data

US 2025/0278405 A1 Sep. 4, 2025

Related U.S. Application Data

(60) Provisional application No. 63/564,967, filed on Mar. 13, 2024, provisional application No. 63/559,470, filed on Feb. 29, 2024.

(51) Int. Cl.
*G06F 16/24* (2019.01)
*G06F 16/22* (2019.01)
*G06F 16/2455* (2019.01)

(52) U.S. Cl.
CPC .... *G06F 16/24553* (2019.01); *G06F 16/2228* (2019.01); *G06F 16/24* (2019.01)

(58) Field of Classification Search
CPC ................. G06F 16/2228; G06F 16/24; G06F 16/24553; G06F 16/907; G06F 16/908; G06F 16/909
See application file for complete search history.

(56) References Cited

U.S. PATENT DOCUMENTS 11,108,828 B1 * 8/2021 Curtis ................... H04L 63/104
11,711,374 B2 * 7/2023 Ross ..................... G06F 21/604
726/28

(Continued)

OTHER PUBLICATIONS

A. Badhib, S. Alshehri and A. Cherif, "A Robust Device-to-Device Continuous Authentication Protocol for the Internet of Things," in IEEE Access, vol. 9, pp. 124768-124792. (Year: 2021).*

(Continued)

*Primary Examiner* — Kris E Mackes

(74) *Attorney, Agent, or Firm* — Rutan & Tucker, LLP; Kyle M. St. James

(57) ABSTRACT

Embodiments disclosed herein provide a computer-implemented method including operations of executing a first query against a nodal graph resulting in retrieval of a state node, wherein the state node includes state information in the nodal graph, wherein the first query is comprised of a first trigger that represents a predetermined condition, determining whether the first trigger forms a portion of a first rule stored in the nodal graph, wherein the first rule is comprised of the first trigger and a list of one or more actions to be taken when the predetermined condition of the first trigger appears in the nodal graph, responsive to determining that the first trigger forms the portion of the first rule, executing a second query against the nodal graph resulting in retrieval of the first rule, and executing the first rule based on context extracted from the state node.

20 Claims, 49 Drawing Sheets

(56) References Cited

U.S. PATENT DOCUMENTS

| | | | | |
|---|---|---|---|---|
| 12,423,449 B2 * | 9/2025 | Norman | ............... | G06F 21/604 |
| 2020/0104402 A1 * | 4/2020 | Burnett | ................ | G06F 16/288 |
| 2023/0131681 A1 * | 4/2023 | Tong | .................... | G06F 16/284 |
| | | | | 707/769 |
| 2023/0153645 A1 * | 5/2023 | Frison | ................... | G06N 20/00 |
| | | | | 706/47 |
| 2025/0225264 A1 * | 7/2025 | Khare | .................. | G06F 21/604 |

OTHER PUBLICATIONS

T. Hilbig, V. Serzantov and T. Schreck, "Protect the Gate—Not Only Once: Continuous Access Evaluation in Practice," 2023 7th Cyber Security in Networking Conference (CSNet), Montreal, QC, Canada, 2023, pp. 137-142. (Year: 2023).*

SNGL, "Administration" (https://help.sgnl.ai/articles/administration/), published Jan. 13, 2023.

SNGL, "Configuring SGNL For SSO with OpenID Connect" (https://help.sgnl.ai/articles/administration/configuring-sgnl-for-sso-with-openid-connect), published Jan. 13, 2023.

SNGL, "Creating And Configuring AAD" (https://help.sgnl.ai/articles/systems-of-record/creating-and-configuring-aad), published Jan. 13, 2023.

SNGL, "Creating And Configuring AAPIM" (https://help.sgnl.ai/articles/systems-of-record/creating-and-configuring-aapim), published Jan. 13, 2023.

SNGL, "Creating And Configuring Curity" (https://help.sgnl.ai/articles/systems-of-record/creating-and-configuring-curity), published Jan. 13, 2023.

SNGL, "Creating And Configuring Okta" (https://help.sgnl.ai/articles/systems-of-record/creating-and-configuring-okta), published Jan. 13, 2023.

SNGL, "Creating And Configuring Salesforce" (https://help.sgnl.ai/articles/systems-of-record/creating-and-configuring-salesforce), published Jan. 13, 2023.

SNGL, "Creating And Configuring Servicenow" (https://help.sgnl.ai/articles/systems-of-record/creating-and-configuring-servicenow), published Jan. 13, 2023.

SNGL, "Policy Management" (https://help.sgnl.ai/articles/policy-management/), published Jan. 13, 2023.

SNGL, "Quickstart Creating Effective Policies" (https://help.sgnl.ai/articles/policy-management/quickstart-creating-effective-policies), published Jan. 13, 2023.

SNGL, "SNGL Policy Overview" (https://help.sgnl.ai/articles/policy-management/sgnl-policy-overview), published Jan. 13, 2023.

SNGL, "SNGL Policy Snippet Reference" (https://help.sgnl.ai/articles/policy-management/sgnl-policy-snippet-reference), published Jan. 13, 2023.

SNGL, "Troubleshooting Access Decisions" (https://help.sgnl.ai/articles/policy-management/troubleshooting-access-decisions), published Jan. 13, 2023.

* cited by examiner

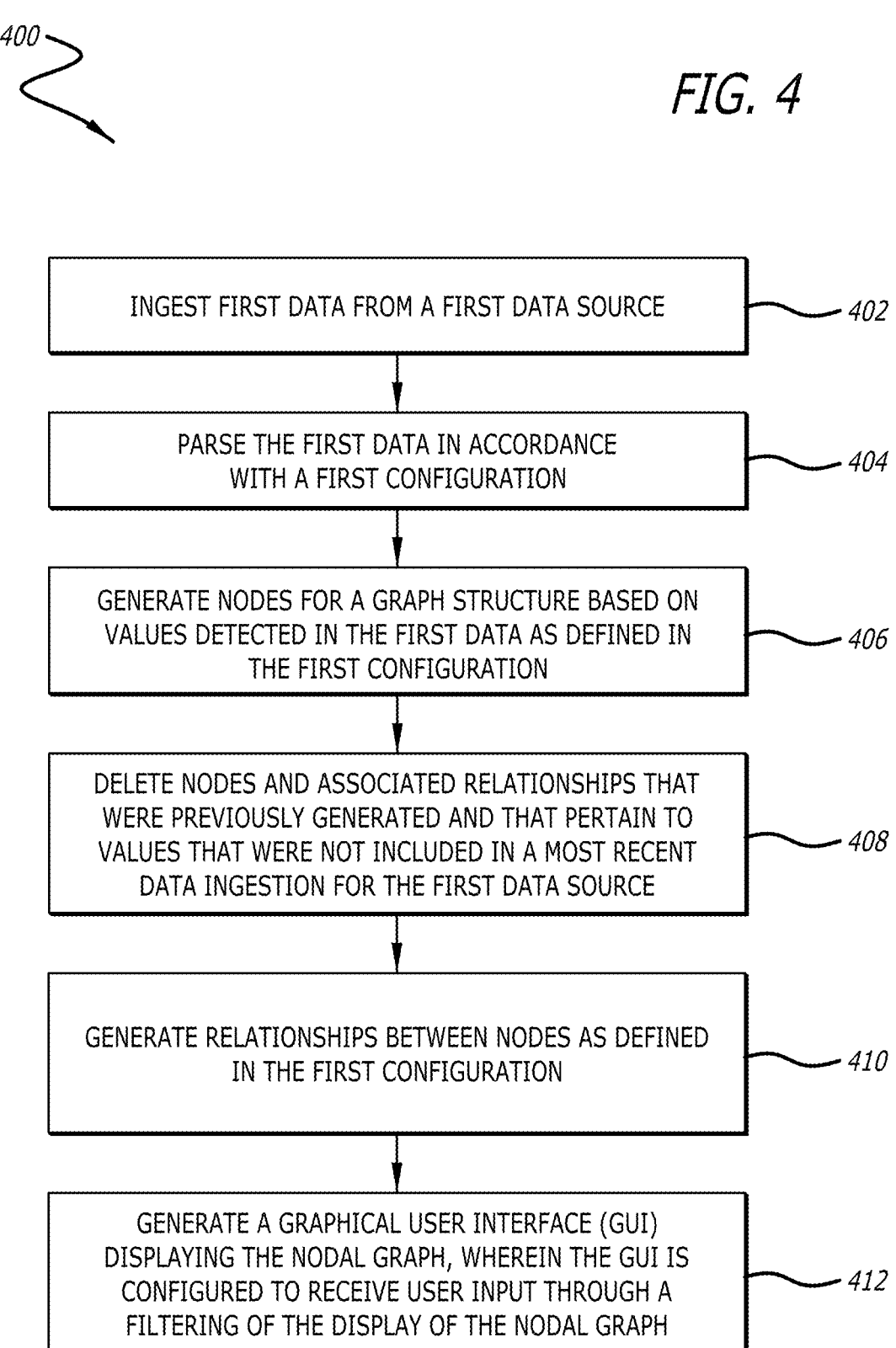

INGEST FIRST DATA FROM A FIRST DATA SOURCE — 402

PARSE THE FIRST DATA IN ACCORDANCE
WITH A FIRST CONFIGURATION — 404

GENERATE NODES FOR A GRAPH STRUCTURE BASED ON
VALUES DETECTED IN THE FIRST DATA AS DEFINED IN
THE FIRST CONFIGURATION — 406

DELETE NODES AND ASSOCIATED RELATIONSHIPS THAT
WERE PREVIOUSLY GENERATED AND THAT PERTAIN TO
VALUES THAT WERE NOT INCLUDED IN A MOST RECENT
DATA INGESTION FOR THE FIRST DATA SOURCE — 408

GENERATE RELATIONSHIPS BETWEEN NODES AS DEFINED
IN THE FIRST CONFIGURATION — 410

GENERATE A GRAPHICAL USER INTERFACE (GUI)
DISPLAYING THE NODAL GRAPH, WHEREIN THE GUI IS
CONFIGURED TO RECEIVE USER INPUT THROUGH A
FILTERING OF THE DISPLAY OF THE NODAL GRAPH — 412

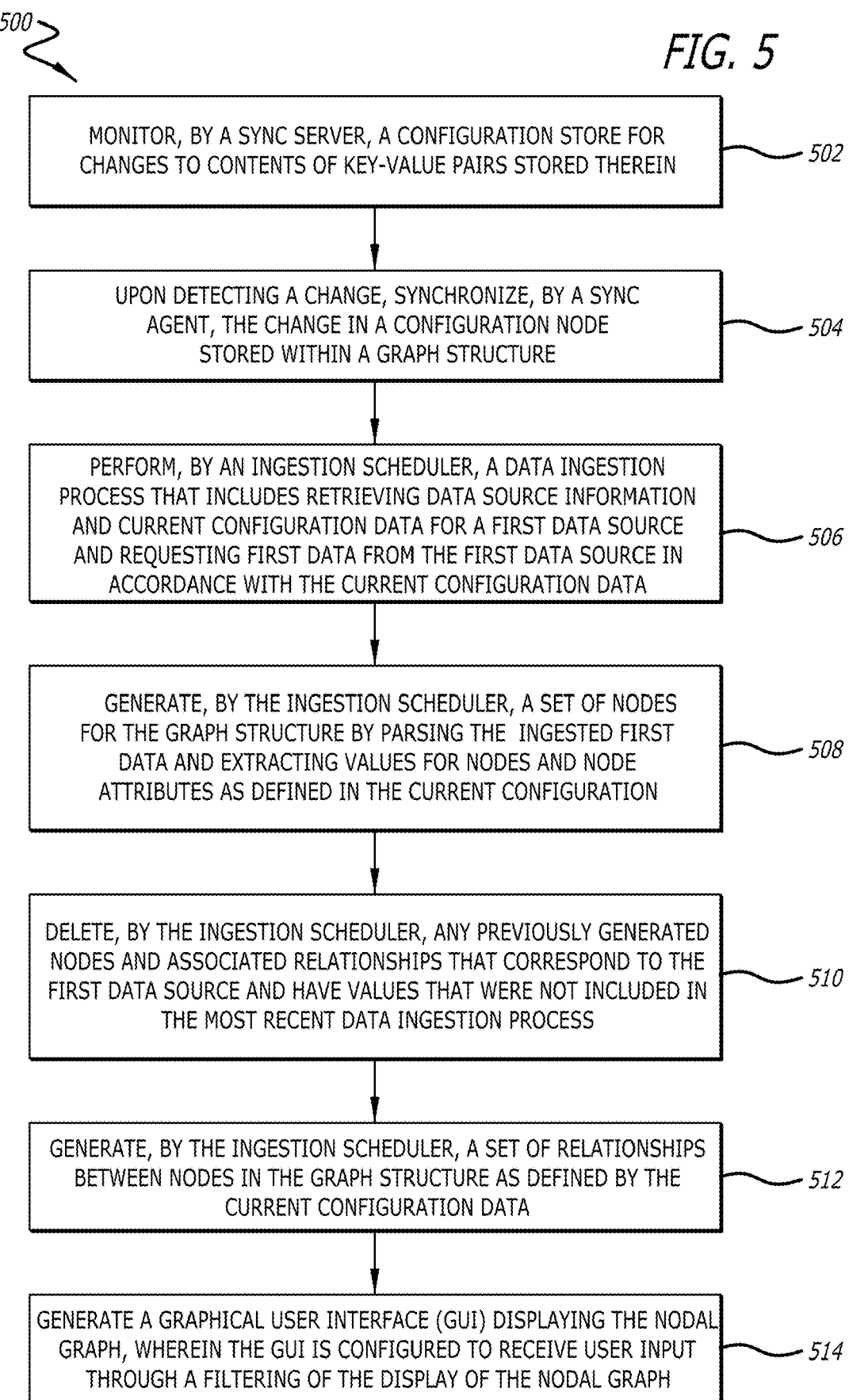

MONITOR, BY A SYNC SERVER, A CONFIGURATION STORE FOR CHANGES TO CONTENTS OF KEY-VALUE PAIRS STORED THEREIN — 502

UPON DETECTING A CHANGE, SYNCHRONIZE, BY A SYNC AGENT, THE CHANGE IN A CONFIGURATION NODE STORED WITHIN A GRAPH STRUCTURE — 504

PERFORM, BY AN INGESTION SCHEDULER, A DATA INGESTION PROCESS THAT INCLUDES RETRIEVING DATA SOURCE INFORMATION AND CURRENT CONFIGURATION DATA FOR A FIRST DATA SOURCE AND REQUESTING FIRST DATA FROM THE FIRST DATA SOURCE IN ACCORDANCE WITH THE CURRENT CONFIGURATION DATA — 506

GENERATE, BY THE INGESTION SCHEDULER, A SET OF NODES FOR THE GRAPH STRUCTURE BY PARSING THE INGESTED FIRST DATA AND EXTRACTING VALUES FOR NODES AND NODE ATTRIBUTES AS DEFINED IN THE CURRENT CONFIGURATION — 508

DELETE, BY THE INGESTION SCHEDULER, ANY PREVIOUSLY GENERATED NODES AND ASSOCIATED RELATIONSHIPS THAT CORRESPOND TO THE FIRST DATA SOURCE AND HAVE VALUES THAT WERE NOT INCLUDED IN THE MOST RECENT DATA INGESTION PROCESS — 510

GENERATE, BY THE INGESTION SCHEDULER, A SET OF RELATIONSHIPS BETWEEN NODES IN THE GRAPH STRUCTURE AS DEFINED BY THE CURRENT CONFIGURATION DATA — 512

GENERATE A GRAPHICAL USER INTERFACE (GUI) DISPLAYING THE NODAL GRAPH, WHEREIN THE GUI IS CONFIGURED TO RECEIVE USER INPUT THROUGH A FILTERING OF THE DISPLAY OF THE NODAL GRAPH — 514

*FIG. 7*

*1102*    *1114*    *FIG. 11B*
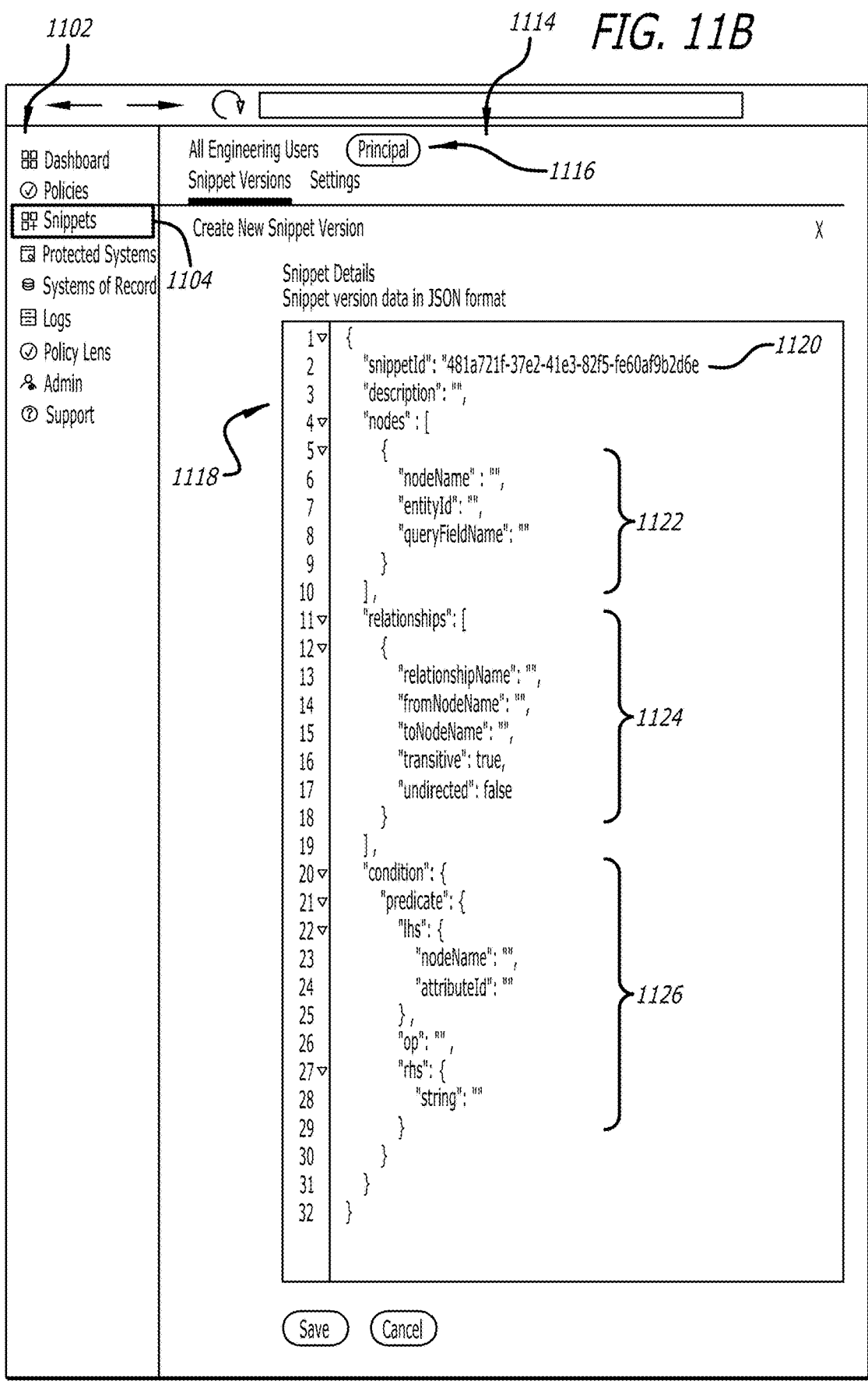

1200

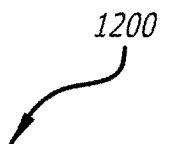

| PROPERTY NAME | PROPERTY TYPE | DESCRIPTION |
|---|---|---|
| SNIPPETID | STRING | THE IDENTIFIER FOR THE SNIPPET YOU WISH TO CREATE THIS SNIPPET VERSION WITHIN. THE SNIPPETID IS ALREADY SET TO THE ID OF THE SNIPPET |
| DESCRIPTION | STRING | A FRIENDLY DESCRIPTION THAT DESCRIBES THIS VERSION OF THE POLICY SNIPPET |
| NODES | ARRAY OF OBJECTS | OPTIONAL FIELD TO DESCRIBE THE TYPE OF ENTITIES THAT WILL BE DESCRIBED IN YOUR POLICY SNIPPET VERSION. MORE INFORMATION BELOW |
| RELATIONSHIPS | ARRAY OF OBJECTS | OPTIONAL FIELD TO DEFINE RELATIONSHIPS BETWEEN NODES USED TO EVALUATE THE POLICY. MORE INFORMATION BELOW |
| CONDITION | OBJECT | OPTIONAL FIELD TO CONSTRAIN THE SEARCH CRITERIA OF THE NODES THAT SHOULD BE EVALUATED. MORE INFORMATION BELOW |
| VERSION | INTEGER | THE VERSION FOR THIS SNIPPET VERSION, MUST BE GREATER THAN THE LATEST EXISTING SNIPPET VERSION. |

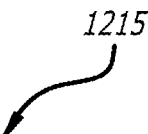

```
"nodes": [
    {
        "nodeName": "user"
        "entityId": "{{oktaUserEntityId}}",
        "queryFieldName" : "principalId",
    },
    {
        "nodeName": "group"
        "entityId": "{{oktaGroupEntityId}}"
    }
    ],
```

*1215*

| PROPERTY NAME | PROPERTY TYPE | DESCRIPTION |
|---|---|---|
| ENTITYID | STRING | THE ENTITY IDENTIFIER FOR THE ENTITY IN YOUR SYSTEM OF RECORD (E.G. OKTA USER) THAT YOU ARE REFERENCING IN THE SNIPPET VERSION, E.G. C4194907-EC87-4018-9A82-B84C73B3EB56 |
| NODENAME | STRING | ASSIGN THE NODE YOU ARE REFERENCING A NAME, SO THAT YOU CAN REFER TO IT IN OTHER PARTS OF THE POLICY SNIPPET VERSION, WHEN DEFINING RELATIONSHIPS OR CONDITIONS |
| QUERYFIELDNAME | STRING | (OPTIONAL) THIS IS THE FIELD NAME OF A PROPERTY IN THE ACCESS REQUEST, THAT YOU MIGHT WANT TO USE AS AN OPERAND AGAINST ONE OF THE NODES (I.E DOES THE PRINCIPALID IN THE ACCESS REQUEST RELATE TO THIS NODE) |

```
"relationships": [
  {
    "relationshipName": "{{ Name of the relationship }}",
    "fromNodeName": "user",
    "toNodeName": "group",
    "transitive": false
  }
],
```

*1225*

| PROPERTY NAME | PROPERTY TYPE | DESCRIPTION |
|---|---|---|
| RELATIONSHIPNAME | STRING | DETERMINES THE RELATIONSHIP TO TRAVERSE, THIS CAN BE ONE OF THE WELL-DEFINED RELATIONSHIPS THAT SGNL CREATES WITHIN A SYSTEM OF RECORD, THE JOIN ATTRIBUTE USED FOR ENTITIES OF THE SAME TYPE ACROSS SYSTEM OF RECORDS, OR A CUSTOM RELATIONSHIP TYPE. |
| FROMNODENAME | STRING | THE NAME OF THE NODE TO START THIS EVALUATION FROM, WITH A NAME AS DECLARED IN THE NODES EXPRESSION IN THE SNIPPET |
| TONODENAME | ARRAY OF OBJECT | THE NAME OF THE NODE TO TERMINATE THIS EVALUATION, WITH A NAME AS DECLARED IN THE NODES EXPRESSION IN THIS SNIPPET |
| TRANSITIVE | BOOLEAN | CAN MULTIPLE RELATIONSHIPS OF THIS TYPE BE TRAVERSED TO DETERMINE WHETHER THIS SNIPPET MATCHES (E.G. DIRECT MEMBER OF A GROUP, OR INDIRECT VIA NESTING; DIRECT REPORT TO A MANAGER OR AN INDIRECT REPORT VIA REPORTING STRUCTURE) |
| UNDIRECTED | BOOLEAN | WHETHER A SNIPPET EVALUATION SHOULD MATCH IN ANY DIRECTION, THEREBY IGNORING THE DIRECTION THAT IS CONFIGURED IN THE RELATIONSHIP |

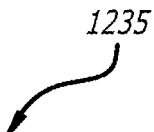

```
"condtion": {
    "predicate": {
        "lhs": {
            "attributeId": "{{attributeId}}",
            "nodeName" : "group"
        },
        "op": "EqualTo",
        "rhs": {
            "string": "S-1-5-21-2562418665-3218585558-18139
        }
    }
}
```

*1235*

| PROPERTY NAME | PROPERTY TYPE | DESCRIPTION |
|---|---|---|
| IHS | OBJECT | SPECIFIES THE "LEFT-HAND-SIDE" OF THE CONDITION EVALUATION, OR THE THING THAT SHOULD BE COMPARED - THIS CAN BE ANY OF THE COMPARATORS DETAILED BELOW |
| OP | STRING | THE OPERATOR TO USE FOR THE CONDITION EVALUATION, SUPPORTED OPERATORS INCLUDE: CONTAINS, ENDSWITH, EQUALTO, GREATERTHAN, GREATERTHANOREQUAL, LESSTHAN, LESSTHANOREQUALTO, REGEXEQUALTO, STARTSWITH |
| RHS | OBJECT | SPECIFIES THE "RIGHT-HAND-SIDE" OF THE CONDITION EVALUATION, OR THE THING THAT SHOULD BE COMPARED TO - THIS CAN BE ANY OF THE COMPARATORS DETAILED BELOW |

```
{
   "nodes": [
      {
         "nodeName" : "user",
         "entityId": "{{aadUserEntityId (UUID of the User Entity in the Azure AD SoR)}}",
         "queryFieldName": "principalId"
      } ,
      {
         "nodeName": "group",
         "entityId": "{{aadGroupEntityId (UUID of the Group Entity in the Azure AD SoR)}}"
      }
   ] ,
   "relationships": [
      {
         "relationshipName": "Group",
         "fromNodeName": "user",
         "toNodeName": "user",
         "transitive": false
      }
   ] ,
   "condition": {
      "predicate": {
         "lhs": {
            "attributeId": "{{jobTitle (UUID of the jobTitle attribute in the Azure AD SoR) }}" ,
            "nodeName": "group"
         } ,
         "op": "EqualTo" ,
         "rhs": "EqualTo" ,
            "string": "S-1-5-21-2562418665-3218585558-1813906818-1576"
         }
      }
   }
   "description":  "Belongs to our AAD Employee Group" ,
   "snippetId": "{{snippetId}}" ,
   "version": 1
}
```

Figures 12G, 12H:
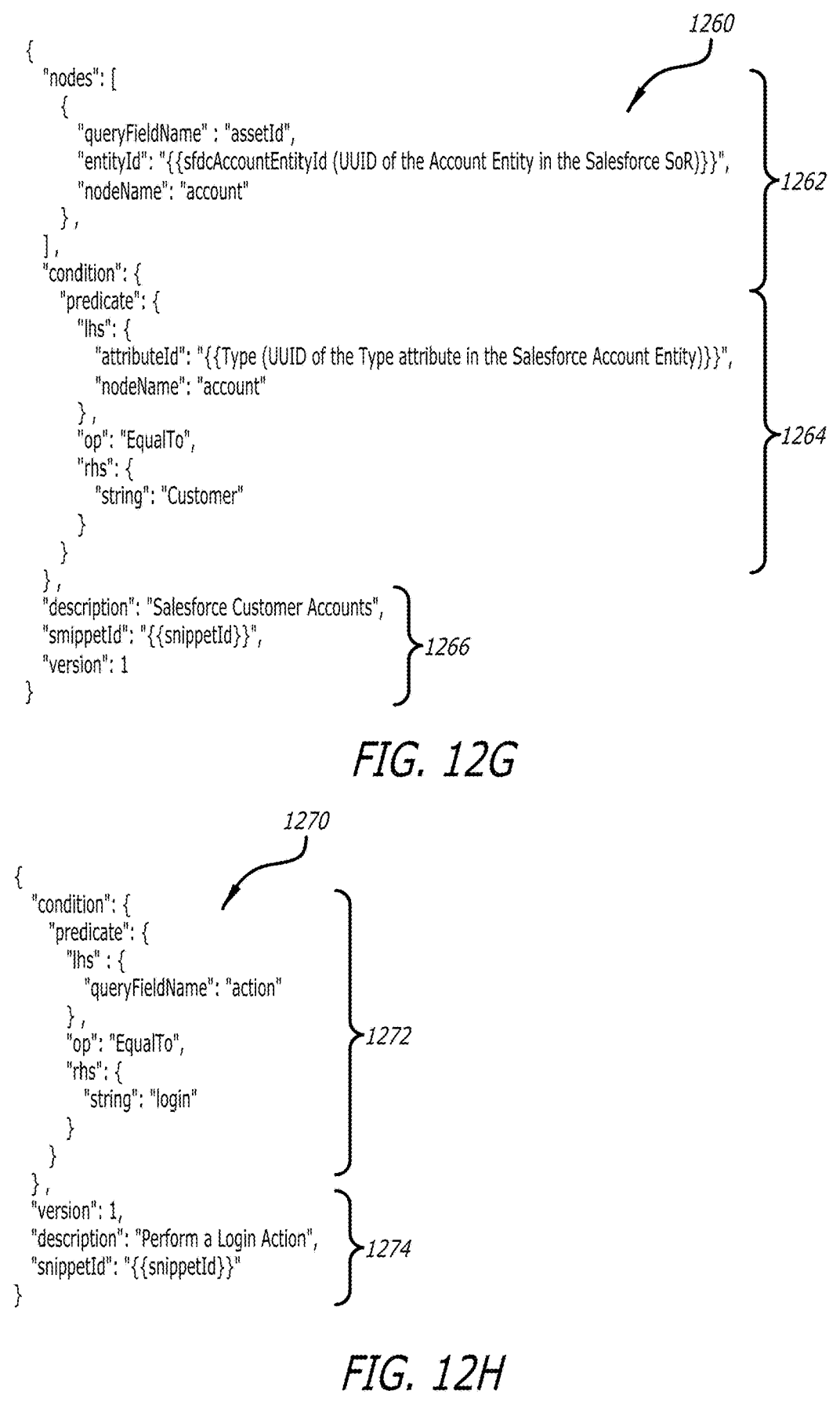

```
{
  "nodes": [
    {
      "queryFieldName" : "assetId",
      "entityId": "{{sfdcAccountEntityId (UUID of the Account Entity in the Salesforce SoR)}}",
      "nodeName": "account"
    },
  ],
  "condition": {
    "predicate": {
      "lhs": {
        "attributeId": "{{Type (UUID of the Type attribute in the Salesforce Account Entity)}}",
        "nodeName": "account"
      },
      "op": "EqualTo",
      "rhs": {
        "string": "Customer"
      }
    }
  },
  "description": "Salesforce Customer Accounts",
  "smippetId": "{{snippetId}}",
  "version": 1
}
```

```
{
  "condition": {
    "predicate": {
      "lhs" : {
        "queryFieldName": "action"
      },
      "op": "EqualTo",
      "rhs": {
        "string": "login"
      }
    }
  },
  "version": 1,
  "description": "Perform a Login Action",
  "snippetId": "{{snippetId}}"
}
```

```
{
  "nodes": [
    {
      "entityId": "{{snowUserEntityId (UUID of the User Entity in ServiceNow SoR)}}",
      "nodeName" : "snowUser",
      "queryFieldName": "principalId"
    },
    {
      "entityId": "{{snowCaseEntityId (UUID of the Case Entity in the ServiceNow SoR)}}"
      "nodeName": "snowCase",
    }
    {
      "entityId": "{{snowAccountEntityId (UUID of the Account Entity in the ServiceNow SoR)}}",
      "nodeName": "snowAccount",
      "queryFieldName": "assetId"
    }
  ],
  "relationships": [
    {
      "relationshipName": "AssignedTo",
      "fromNodeName": "snowCase",
      "toNodeName": "snowUser"
    },
    {
      "relationshipName": "Account", //
      "fromNodeName": "snowCase",
      "toNodeName": "snowAccount"
    }
  ],
  "condition": {
    "predicate": {
      "lhs": {
        "sttributeId":  "active",
        "nodeName":  "snowCase",
      },
      "op": "Equal To",
      "rhs": {
        "boolean": true
      }
    }
  },
  "description": "User is assigned active case for the customer",
  "snippetId": "{{snippetId}}",
  "version": 1
}
```

Policies / New Policy console.dev.sgnl.cloud/sgnl-mj-playground/policies/new

Figure 13:
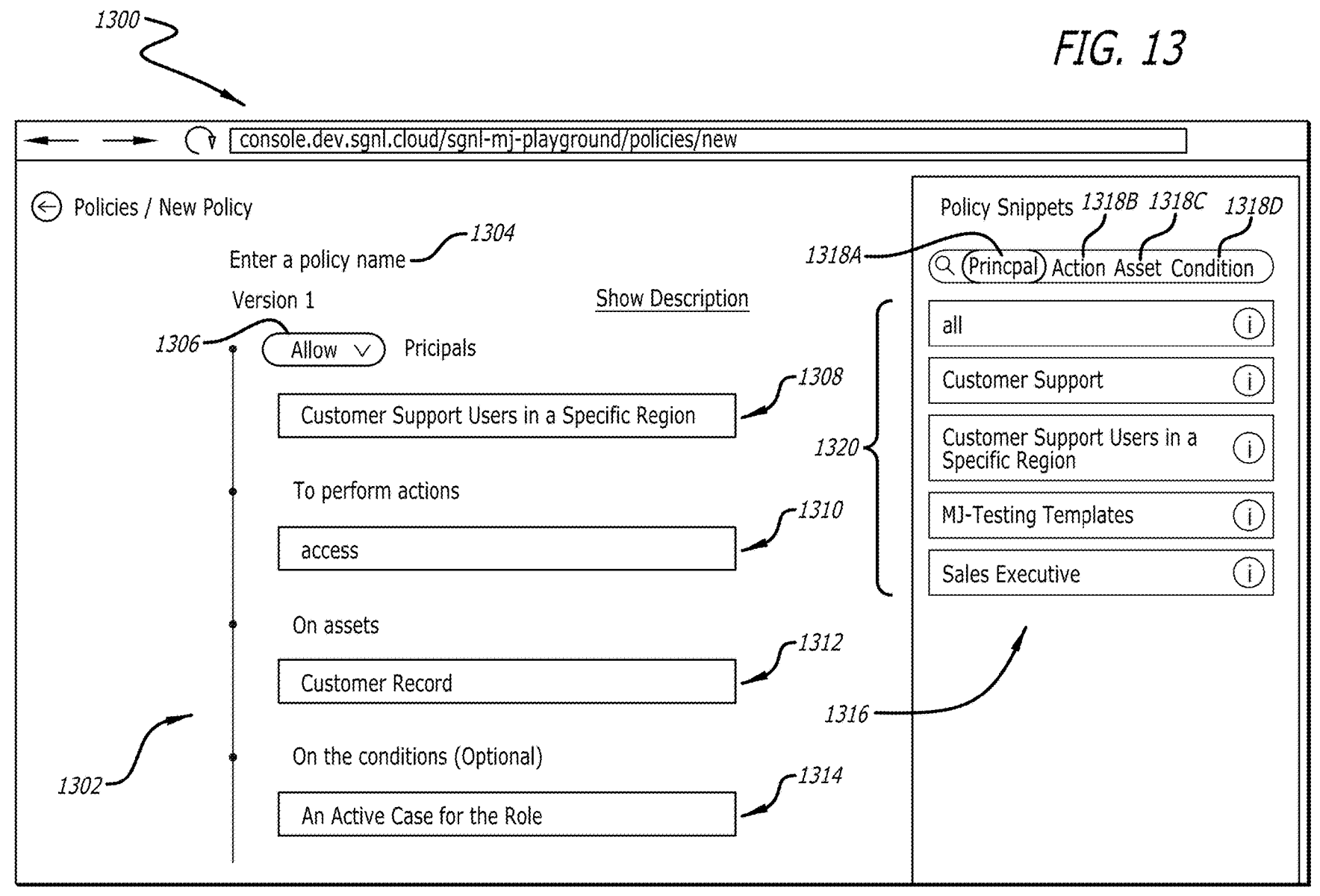

Enter a policy name — 1304

Version 1

Show Description

Allow ∨    Pricipals — 1306

Customer Support Users in a Specific Region — 1308

To perform actions access — 1310

On assets

Customer Record — 1312

On the conditions (Optional)

An Active Case for the Role — 1314

---

Policy Snippets 1318B 1318C 1318D

1318A

🔍 (Princpal) Action Asset Condition all                                                ⓘ

Customer Support                                   ⓘ

Customer Support Users in a Specific Region        ⓘ

MJ-Testing Templates                               ⓘ

Sales Executive                                    ⓘ

← → ⟳ | console.dev.sqnl.cloud/sqnl-rn-playground/protected-systems/9ebdcB22-f7b1-4cd2-a46d-302736babbe6/policies/assign

Billing Management: Assign Policies

Policies Selected: 1

( Next )

| Name | Labels | Version | | Type | Version Created |
|---|---|---|---|---|---|
| ☐ Access Any Customer if an Active Case is Assigned Access by Customer (for Joe) | Sales Ops | Version 16 | ∨ | Allow | 2 days ago |
| ☐ Allow All Policy Policy that Allow All Access | Central IAM Team | Version 54 | ∨ | Allow | 2 Months ago |
| ☐ Allowed to Assume Role with a Active 3NOW case | Service Managment | Version 37 | ∨ | Allow | 2 Months ago |
| ☐ Business Hours Access Policy | Identity & Access | Version 1 | ∨ | Allow | 4 Months ago |
| ☐ Check Group Membership | | Version 1 | ∨ | Allow | 2 Months ago |
| ☑ Customer Support Policy | | Version 1 | ∨ | Allow | 11 Seconds ago |
| ☐ Disallow Access in Embargoed Countries | Central IAM Team | Version 2 | ∨ | Deny | 4 Months ago |
| ☐ Disallow AnomalousActivity | Identity & Access | Version 1 | ∨ | Deny | 4 Months ago |
| ☐ Infrastructure Access Restrictions | Infra | Version 1 | ∨ | Allow | 4 Months ago |
| ☐ Never Gonna Give You Up | Service Managment | Version 1 | ∨ | Allow | 4 Months ago |
| ☐ Never Gonna Let You Down | Sales Ops | Version 1 | ∨ | Allow | 4 Months ago |
| ☐ Never Gonna Turn Around | Sales Ops | Version 1 | ∨ | Allow | 4 Months ago |

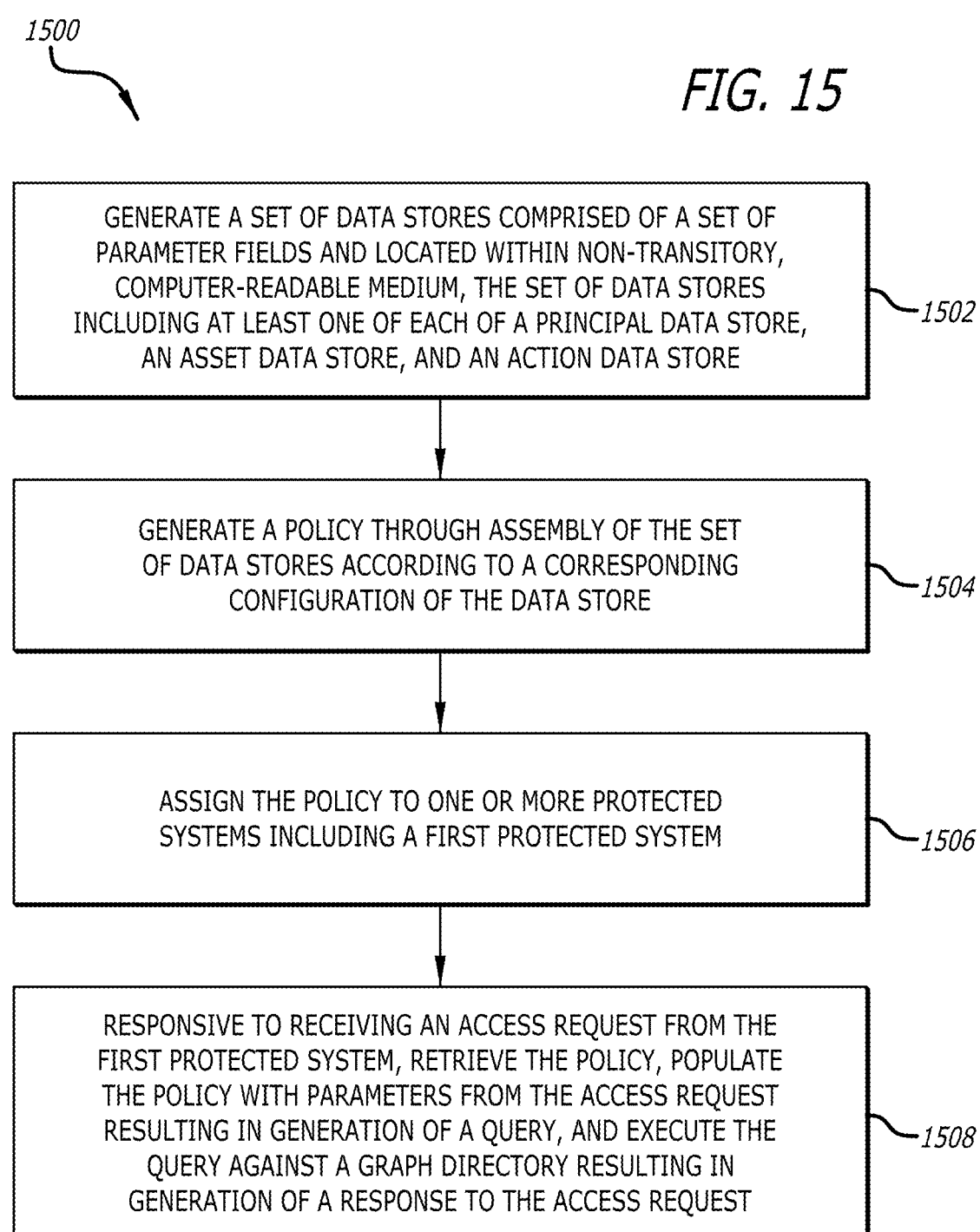

GENERATE A SET OF DATA STORES COMPRISED OF A SET OF PARAMETER FIELDS AND LOCATED WITHIN NON-TRANSITORY, COMPUTER-READABLE MEDIUM, THE SET OF DATA STORES INCLUDING AT LEAST ONE OF EACH OF A PRINCIPAL DATA STORE, AN ASSET DATA STORE, AND AN ACTION DATA STORE ～1502

GENERATE A POLICY THROUGH ASSEMBLY OF THE SET OF DATA STORES ACCORDING TO A CORRESPONDING CONFIGURATION OF THE DATA STORE ～1504

ASSIGN THE POLICY TO ONE OR MORE PROTECTED SYSTEMS INCLUDING A FIRST PROTECTED SYSTEM ～1506

RESPONSIVE TO RECEIVING AN ACCESS REQUEST FROM THE FIRST PROTECTED SYSTEM, RETRIEVE THE POLICY, POPULATE THE POLICY WITH PARAMETERS FROM THE ACCESS REQUEST RESULTING IN GENERATION OF A QUERY, AND EXECUTE THE QUERY AGAINST A GRAPH DIRECTORY RESULTING IN GENERATION OF A RESPONSE TO THE ACCESS REQUEST ～1508

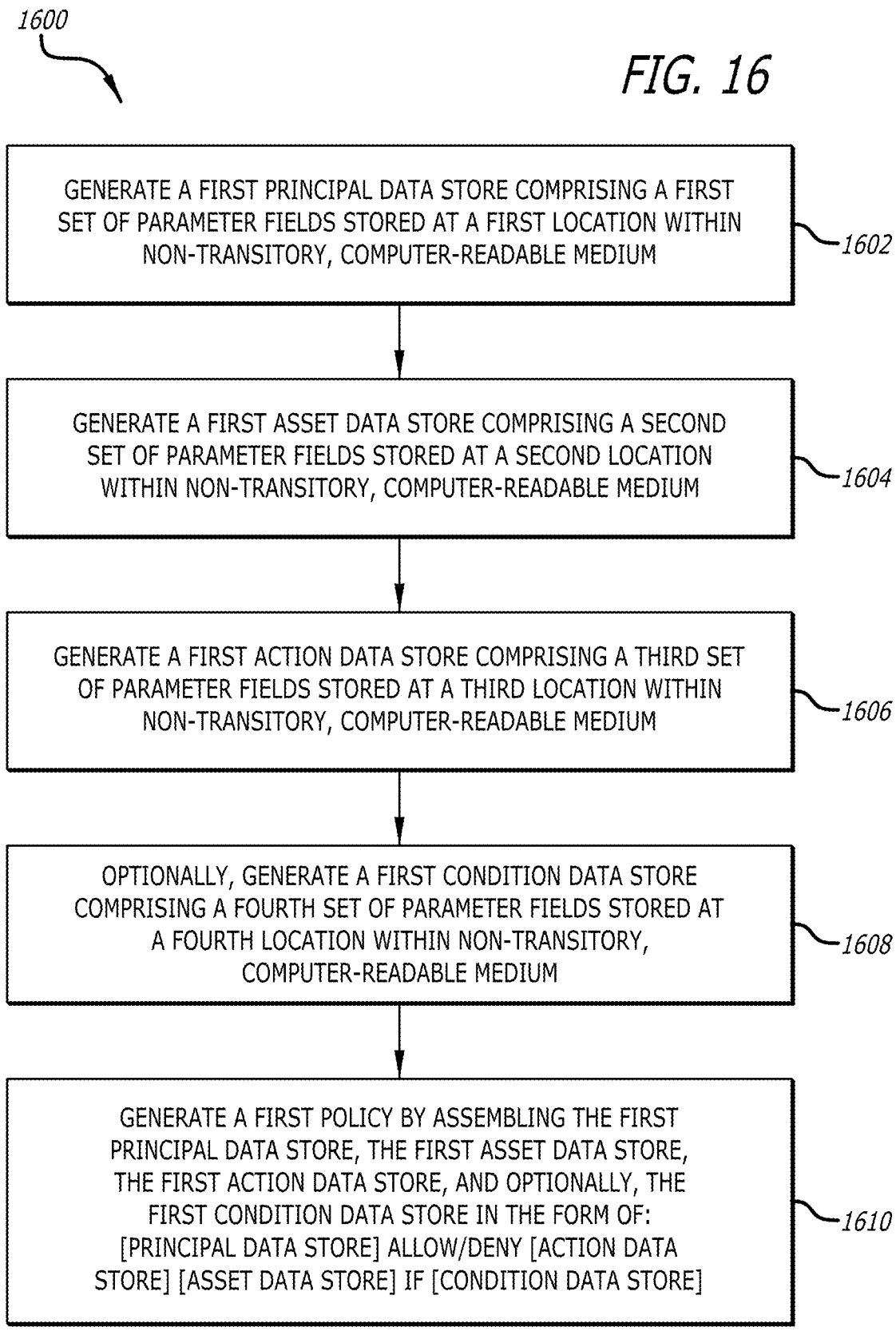

GENERATE A FIRST PRINCIPAL DATA STORE COMPRISING A FIRST SET OF PARAMETER FIELDS STORED AT A FIRST LOCATION WITHIN NON-TRANSITORY, COMPUTER-READABLE MEDIUM ~1602

GENERATE A FIRST ASSET DATA STORE COMPRISING A SECOND SET OF PARAMETER FIELDS STORED AT A SECOND LOCATION WITHIN NON-TRANSITORY, COMPUTER-READABLE MEDIUM ~1604

GENERATE A FIRST ACTION DATA STORE COMPRISING A THIRD SET OF PARAMETER FIELDS STORED AT A THIRD LOCATION WITHIN NON-TRANSITORY, COMPUTER-READABLE MEDIUM ~1606

OPTIONALLY, GENERATE A FIRST CONDITION DATA STORE COMPRISING A FOURTH SET OF PARAMETER FIELDS STORED AT A FOURTH LOCATION WITHIN NON-TRANSITORY, COMPUTER-READABLE MEDIUM ~1608

GENERATE A FIRST POLICY BY ASSEMBLING THE FIRST PRINCIPAL DATA STORE, THE FIRST ASSET DATA STORE, THE FIRST ACTION DATA STORE, AND OPTIONALLY, THE FIRST CONDITION DATA STORE IN THE FORM OF: [PRINCIPAL DATA STORE] ALLOW/DENY [ACTION DATA STORE] [ASSET DATA STORE] IF [CONDITION DATA STORE] ~1610

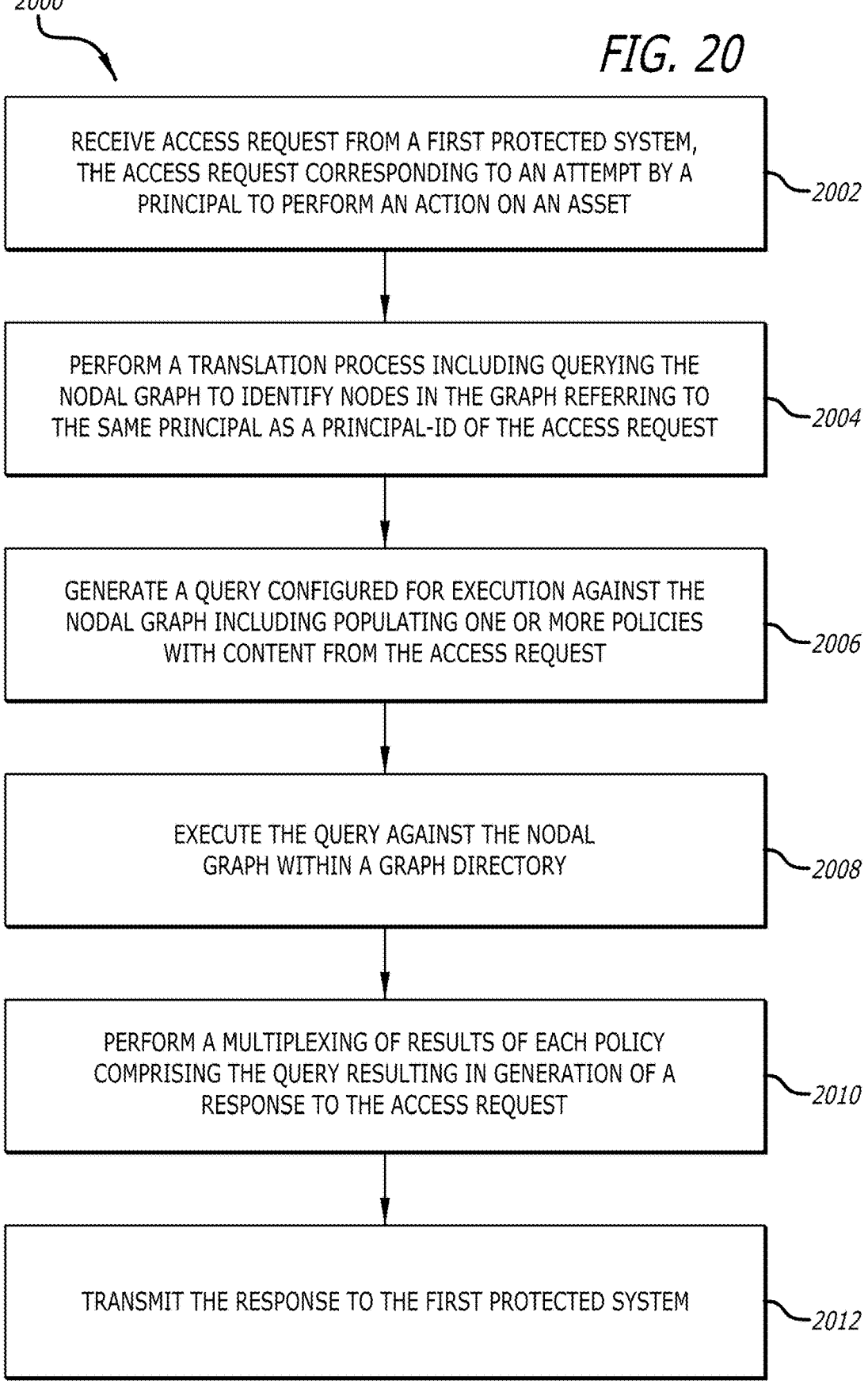

RECEIVE ACCESS REQUEST FROM A FIRST PROTECTED SYSTEM, THE ACCESS REQUEST CORRESPONDING TO AN ATTEMPT BY A PRINCIPAL TO PERFORM AN ACTION ON AN ASSET ⌐2002

PERFORM A TRANSLATION PROCESS INCLUDING QUERYING THE NODAL GRAPH TO IDENTIFY NODES IN THE GRAPH REFERRING TO THE SAME PRINCIPAL AS A PRINCIPAL-ID OF THE ACCESS REQUEST ⌐2004

GENERATE A QUERY CONFIGURED FOR EXECUTION AGAINST THE NODAL GRAPH INCLUDING POPULATING ONE OR MORE POLICIES WITH CONTENT FROM THE ACCESS REQUEST ⌐2006

EXECUTE THE QUERY AGAINST THE NODAL GRAPH WITHIN A GRAPH DIRECTORY ⌐2008

PERFORM A MULTIPLEXING OF RESULTS OF EACH POLICY COMPRISING THE QUERY RESULTING IN GENERATION OF A RESPONSE TO THE ACCESS REQUEST ⌐2010

TRANSMIT THE RESPONSE TO THE FIRST PROTECTED SYSTEM ⌐2012

2300

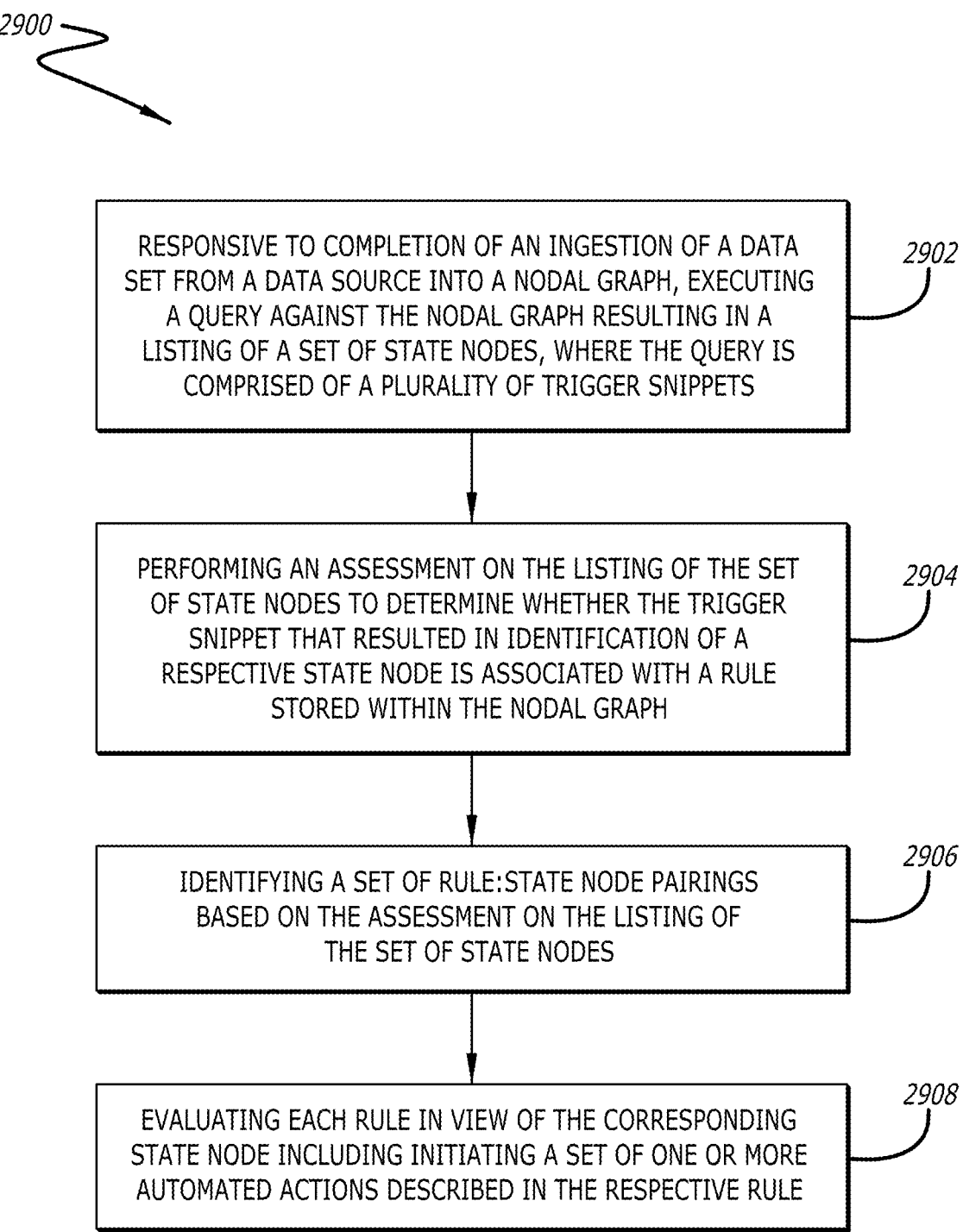

2900

RESPONSIVE TO COMPLETION OF AN INGESTION OF A DATA SET FROM A DATA SOURCE INTO A NODAL GRAPH, EXECUTING A QUERY AGAINST THE NODAL GRAPH RESULTING IN A LISTING OF A SET OF STATE NODES, WHERE THE QUERY IS COMPRISED OF A PLURALITY OF TRIGGER SNIPPETS

2902

PERFORMING AN ASSESSMENT ON THE LISTING OF THE SET OF STATE NODES TO DETERMINE WHETHER THE TRIGGER SNIPPET THAT RESULTED IN IDENTIFICATION OF A RESPECTIVE STATE NODE IS ASSOCIATED WITH A RULE STORED WITHIN THE NODAL GRAPH

2904

IDENTIFYING A SET OF RULE:STATE NODE PAIRINGS BASED ON THE ASSESSMENT ON THE LISTING OF THE SET OF STATE NODES

2906

EVALUATING EACH RULE IN VIEW OF THE CORRESPONDING STATE NODE INCLUDING INITIATING A SET OF ONE OR MORE AUTOMATED ACTIONS DESCRIBED IN THE RESPECTIVE RULE

SYSTEMS AND METHODS FOR DEPLOYMENT OF CONTINUOUS ACCESS EVALUATION PROTOCOL (CAEP) HUB ENGINE

CROSS-REFERENCE TO RELATED APPLICATIONS

This application claims priority and the benefit of both U.S. Provisional Patent Application No. 63/559,470 filed Feb. 29, 2024, and U.S. Provisional Patent Application No. 63/564,967, filed Mar. 13, 2024; the entirety of each of which is incorporated herein by reference.

FIELD

Embodiments of the disclosure relate to the field of identity management. More specifically, one embodiment of the disclosure relates to a platform for developing a graph representation of customer account information for various cloud applications and on-premises systems to which identity management policies may be applied to determine whether an individual has the requisite permissions to perform a desired action.

BACKGROUND

In recent years, identity-related breaches of confidential information have become almost commonplace. In the fields of information technology, cybersecurity, and identity management, an identity-related breach may refer to an incident of unauthorized access to an organization's systems, networks, or data through the compromise of user identities or misuse of identity policy management. Such incidents often result in the theft, misuse, or manipulation of authentication credentials, such as usernames, passwords, security tokens, or biometric data, leading to unauthorized activities within the affected systems.

One issue that may provide a pathway to an identity-related breach is referred to as "standing access," and is understood to mean the persistent or continuous permissions afforded a particular user to systems, applications, and/or data regardless of whether access to such is needed at the particular time. Stated differently, standing access may refer to situations in which a user's access rights to systems, applications, and/or data are always active. As should be understood, standing access provides numerous risks and provides opportunities for users, hackers, or threat attackers to improperly access these systems, applications, and/or data.

Standing access may also lead to what is known as "privilege creep," resulting in a user being provided unnecessary authorization to systems, applications, and/or data. An example of privilege creep may include a user maintaining access to systems, applications, and/or data following a change in the user's role within an organization. Identity-related breaches, and specifically standing access, provide security and compliance issues for organizations. Thus, organizations are in need of an identity management system that does more than merely provide secure handling of digital identities through complex, often-changing passcodes or via a single sign-on identity provider that deploys two-factor authentication. Beyond user authentication, an identity management system should manage and enforce permissions to ensure users have appropriate access to resources based on their roles and responsibilities at the time such access is needed instead of providing "always active" access.

Additional features of such a system may include compliance and auditing functionality enabling an explanation of why a user was provided or denied permission to a system, application, or data at a particular point in time. In summary, what is needed is a platform that provides a novel identity management system, which removes standing access and is agnostic to data sources, applications, systems, etc., that access to which may be desired by employees or individuals of organizations.

SUMMARY

Disclosed herein is a computer-implemented method configured to perform certain operations including executing a first query against a nodal graph resulting in retrieval of a state node, wherein the state node includes state information of a node or relationship stored in the nodal graph, wherein the first query is comprised of a first trigger that represents a predetermined condition, determining whether the first trigger forms a portion of a first rule stored in the nodal graph, wherein the first rule is comprised of the first trigger and a list of one or more actions to be taken when the predetermined condition of the first trigger appears in the nodal graph, responsive to determining that the first trigger forms the portion of the first rule, executing a second query against the nodal graph resulting in retrieval of the first rule, and executing the first rule based on context extracted from the state node, wherein executing the first rule results in an automated access management action.

In some embodiments, automated access management action includes one or more of revoking a user session of a first user for a software application, denying access to the first user to a resource, or requiring the first user to reauthenticate with the software application, wherein the first user is indicated in the state node. In some embodiments, revoking the user session includes either automatically (i) transmitting a logoff request to the software application or (ii) revoking an access token for the user for the software application. In some embodiments, the first query is comprised of a plurality of triggers including the first trigger, wherein each of the plurality of triggers are evaluated against the nodal graph. In some embodiments, the operations further comprise ingesting data from one or more data sources, and modifying at least a portion of the nodal graph based on the ingested data. In some embodiments, executing the first query against the nodal graph is performed in response to completion of ingesting the data. In some embodiments, the first trigger evaluates the nodal graph for a change to a node attribute or a relationship.

Disclosed herein is a computer-implemented method configured to perform certain operations including ingesting first data from a first data source at a first time and second data from a second data source, parsing the first data in accordance with a first configuration and the second data in accordance with a second configuration, generating a set of nodes and one or more relationships between one or more nodes of the set of nodes resulting in generation of a nodal graph, wherein generating the set of nodes and the one or more relationships is based on values detected in parsing the first data as defined in the first configuration and the second data as defined in the second configuration, and ingesting third data from the first data source at a second time subsequent the first time, parsing the third data in accordance with the first configuration, and modifying the nodal graph based on values detected in parsing the third data as defined in the first configuration.

In some embodiments, the operations further comprise generating a graphical user interface (GUI) that is configured for display on a physical display screen of a network device, wherein the GUI displays a visualization of the nodal graph. In some embodiments, ingesting the first data from the first data source includes monitoring, by a sync server, a configuration store for a change to content of one or more key-value pairs stored therein, wherein the content of the one or more key-value pairs corresponds to the first data. In some embodiments, responsive to detecting the change to the content of the one or more key-value pairs, executing, by a sync agent, a query configured to cause modifications to the nodal graph based on the change detected to the content of the one or more key-value pairs. In some embodiments, the nodal graph includes a first configuration node corresponding to the first data source, wherein the first configuration node includes ingestion information pertaining to ingestion of data from the first data source including one or more of a data source identifier, information describing an application programming interface (API) with which to ingest the data from the first data source, a frequency of ingestion operations from the first data source, or a set of key-value pairs that are to be ingested for the first data source. In some embodiments, ingesting the first data from the first data source includes requesting the first data as defined by the first configuration node from the first data source via the API in accordance. In some embodiments, ingesting the third data from the first data source includes requesting the third data as defined by the first configuration node from the first data source via the API in accordance, and modifying the nodal graph based on the values detected in parsing the third data as defined in the first configuration includes deleting a first node in the nodal graph, wherein the first node includes values ingested with the first data not present during ingestion of third data.

Disclosed herein is a computer-implemented method configured to perform certain operations including receiving an access request from a first protected system, the access request corresponding to an attempt by a principal to perform an action on an asset, wherein the first protected system corresponds to a first data source, generating a nodal graph query configured for execution against a nodal graph, wherein the nodal graph query is comprised of one or more policies, and wherein generating the nodal graph query includes populating parameter fields of the one or more policies with parameters or context extracted from the access request, executing the nodal graph query against the nodal graph resulting in a result for each of the one or more policies, wherein the result for each of the one or more policies is either: (i) an indication to allow a respective policy, (ii) an indication to deny the respective policy, or (iii) an indication that the respective policy does not apply, generating a response to the access request based on the result for each of the one or more policies, and transmitting the response to the first protected system to either allow or deny the access request.

In some embodiments, the operations further comprise identifying a set of nodes within a nodal graph that corresponds to the principal through a relationship indicating that the set of nodes refer to the principal, wherein the set of nodes corresponds to data sources different than the first data source. In some embodiments, the context of the access request includes a timestamp and one or more of a device identifier of a network device from which the access request originated or an Internet Protocol (IP) address of the network device from which the access request originated. In some embodiments, the one or more policies includes a plurality of policies, and wherein generating the response to the access request based on the result for each of the one or more policies includes performing a multiplexing operation condensing result a plurality of policy execution results into a single answer. In some embodiments, the operations further comprise analyzing a token of the first protected system accompanying the access request, and identifying the first protected system from the token. In some embodiments, executing the nodal graph query against the nodal graph includes traversing the nodal graph attempting to find a pattern match between a portion of the nodal graph and the nodal graph query. In some embodiments, the result for each of the one or more policies is provided to a user through a graphical user interface (GUI) configured to receive user input for investigating the result for each of the one or more policies Disclosed herein is a computer-implemented method configured to perform certain operations including generating a set of data stores each comprised of a set of parameter fields located in first non-transitory, computer-readable medium, wherein the set of data stores include at least one of each of a principal data store, an asset data store, and an action data store, generating a policy through assembly of the set of data stores according to a configuration of each data store of the set of data stores, assigning the policy to one or more protected systems including a first protected system, and responsive to receiving an access request from the first protected system, retrieve the policy, determining a response to the access request including populating the policy with parameters or context from the access request resulting in generation of a query, executing the query against a nodal graph resulting in generation of the response to the access request, and transmitting the response to the first protected system.

In some embodiments, a principal data store includes a first set of parameter fields defining an entity including a principal identifier that identifies a first node corresponding to the entity within the nodal graph. In some embodiments, an asset data store includes a second set of parameter fields defining an asset including an asset identifier that identifies a second node corresponding to the asset within the nodal graph. In some embodiments, an action data store includes a third set of parameter fields defining an action to be performed by the principal on the asset. In some embodiments, the policy includes is an assembly of a reference to each of the principal data store, the asset data store, and the action data store. In some embodiments, the access request includes an inquiry as to whether a principal may perform an action on an asset in accordance with contents of the nodal graph. In some embodiments, the response to the access request is indication to allow or deny the principal to perform the action on the asset.

Other embodiments include a computing device, comprising a processor and a non-transitory computer-readable medium having stored thereon instructions that, when executed by the processor, cause the processor to perform the operations discussed above. Yet other embodiments include a non-transitory computer-readable medium having stored thereon instructions that, when executed by one or more processors, cause the one or more processor to perform the operations discussed above.

BRIEF DESCRIPTION OF THE DRAWINGS

Illustrative examples are described in detail below with reference to the following figures:

FIG. 4 is a flowchart illustration of operations of a first method of building a graph representation of customer account information from various cloud applications and/or on-premises systems in accordance with embodiments of the disclosure;

FIG. 5 is a flowchart illustration of operations of a second, detailed method of building a graph representation of customer account information from various cloud applications and/or on-premises systems in accordance with embodiments of the disclosure;

FIG. 7 is an example graphical user interface (GUI) displaying an entity listing screen for a first example cloud application ("ServiceNow") in accordance with embodiments of the disclosure;

FIG. 11B illustrates a graphical user interface generated in response to receipt of user input to the pop-up of FIG. 11A and is configured to receive additional user input corresponding to completing the generation of a snippet in accordance with embodiments of the disclosure;

FIGS. 12A-12D provide tables and snippets illustrating describing and illustrating parameter fields of snippet types in accordance with embodiments of the disclosure;

FIGS. 12F-12I illustrate example snippets in accordance with embodiments of the disclosure;

FIG. 13 illustrates a graphical user interface configured to receive user input corresponding to generating a policy from a plurality of snippets in accordance with embodiments of the disclosure;

FIG. 14 illustrates a graphical user interface configured to receive user input corresponding to assigning one or more policies to a protected system in accordance with embodiments of the disclosure;

FIG. 15 is a flowchart illustrating operations of a method of generating and evaluating a policy in accordance with embodiments of the disclosure;

FIG. 16 is a flowchart illustrating operations of a method of generating a policy through assembly of a plurality of snippets in accordance with embodiments of the disclosure;

FIG. 20 is a flowchart illustrating operations of a method of evaluating a policy in response to receipt of an access request from a protected system in accordance with embodiments of the disclosure;

FIG. 29 is a flowchart illustrating operations of a method of real-time access enforcement through continuous monitoring of changes to a nodal graph generated through ingestion of data from a plurality of data sources in accordance with embodiments of the disclosure;

DETAILED DESCRIPTION

I. Terminology

Figure 1:
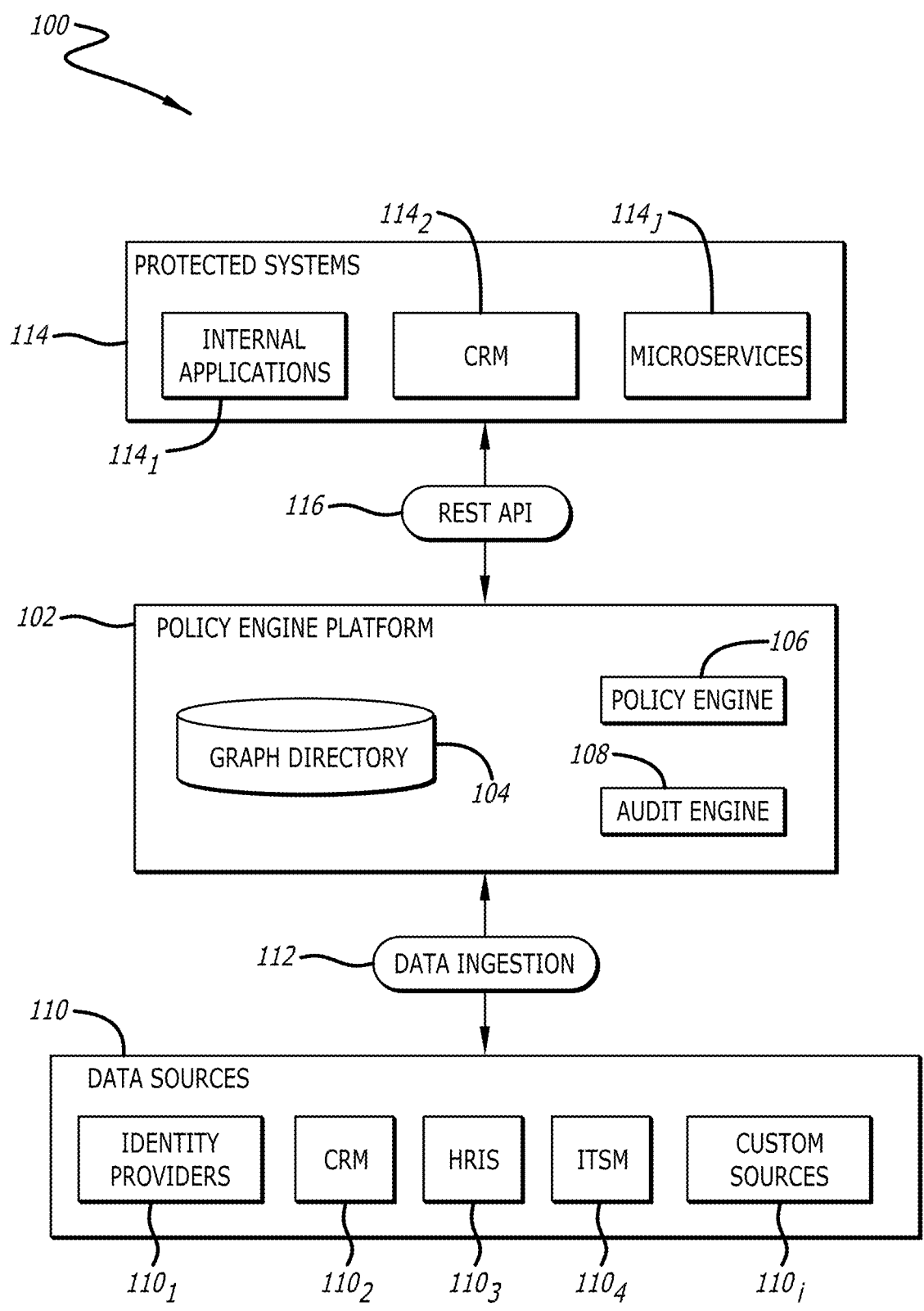
FIG. 1 is a system diagram illustrating networked exchange of data between a set of data sources, a policy enforcement platform, and a plurality of applications in accordance with embodiments of the disclosure.

In the following description, certain terminology is used to describe various features of the invention. For example, each of the terms "logic," "engine," and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to, a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "computerized" generally represents that any corresponding operations are conducted by hardware in combination with software and/or firmware.

The term "object" generally relates to content (or a reference to access such content) having a logical structure or organization that enables it to be classified for purposes of analysis as a cyberthreat such as malware or phishing. The content may include an executable (e.g., an application, program, code segment, a script, dynamic link library "dll" or any file in a format that can be directly executed by a computer such as a file having an extension of ".exe", ".vbs", ".js", etc.), a non-executable (e.g., a storage file; any document such as a Portable Document Format "PDF" document; a word processing document such as WORD® document; an electronic mail "email" message, web page, etc.), or simply a collection of related data. Additionally, the term object may refer to an instance of an executable that is executing ("a process"). In one embodiment, an object may be an image data such as one or more images and/or videos. In another embodiment, an object may be a set of instructions that are executable by one or more processors. The object may be retrieved from information in transit (e.g., one or more packets, one or more flows each being a plurality of related packets, etc.) or information at rest (e.g., data bytes from a storage medium).

Examples of objects may include one or more flows or a self-contained element within a flow itself. A "flow" generally refers to related packets that are received, transmitted, or exchanged within a communication session. For convenience, a packet is broadly referred to as a series of bits or bytes having a prescribed format, which may, according to one embodiment, include packets, frames, or cells. Further, an "object" may also refer to individual or a number of packets carrying related payloads, e.g., a single webpage received over a network. Moreover, an object may be a file retrieved from a storage location over an interconnect. As a self-contained element, the object may be an executable (e.g., an application, program, segment of code, dynamically link library "DLL", etc.) or a non-executable. Examples of non-executables may include a document (e.g., a Portable Document Format "PDF" document, MICROSOFT® OFFICE® document, MICROSOFT® EXCEL® spreadsheet, etc.), an electronic mail (email), downloaded web page, or the like.

The term "network device" may be construed as any electronic computing system with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, an endpoint (e.g., a laptop, a mobile phone, a tablet, a computer, etc.), a standalone appliance, a server, a router or other intermediary communication device, a firewall, etc.

The term "rules" refers to logic used in executing certain operations, wherein execution may vary (or not occur) based on a rule. Each rule is capable of being represented as a logical expression for example, such as an "if this, then that" statement, where "this" represents a condition, and "that" represents the conclusion. The conclusion is applied when the condition is met by analysis of parameters (predetermined or dynamically obtained). The term "implicated rules," as used herein, are the one or more specific rules applied in reaching a verdict, reflecting predetermined or dynamically obtained parameters and the conclusions drawn from them based on the logical expressions.

According to one embodiment of the disclosure, rules may also provide configuration information containing parameter values such as, for example, threshold values used in detection (e.g., specifying a time a player has a ball, a velocity of a pass or shot, a number of goals, etc.). Rules may be stored in a rules store (e.g., a repository) in persistent memory of a network device and are typically updated frequently (periodically or aperiodically).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. System Overview—Policy Engine Platform

Referring now to FIG. 1, a system diagram illustrating networked exchange of data between a set of data sources, a policy enforcement platform, and a plurality of applications is shown in accordance with embodiments of the disclosure. FIG. 1 illustrates a networked environment 100 that includes a plurality of components that may be communicatively coupled via one or more networks, such as the internet. FIG. 1 includes a policy engine platform 102 comprised of a graph directory 104, a policy engine 106, and an audit engine 108. The policy engine platform 102 may be communicatively coupled to a plurality of data sources 110 from which data may be ingested. Example data sources 110 may include various identity providers 110$_1$ such as Okta, Inc., Auth0, Inc., Salesforce, Inc., etc., customer relationship management (CRM) systems 110$_2$ such as HubSpot, Inc., Pipedrive, Inc., Salesforce, Inc., etc., and a plurality of human resource information systems (HRIS) 110$_3$ such as Workday, Inc., Automatic Data Processing, Inc. (ADP), Bamboo HR, LLC, etc. Example data sources 110 may also include various information technology service management (ITSM) systems 110$_4$ such as ServiceNow, Inc., and one or more custom sources 110$_i$. The policy engine platform 102 may ingest data from the data sources 110 periodically or aperiodically via a data ingestion pipeline 112, which may be formed of one or more access programming interfaces (APIs).

Additionally, FIG. 1 illustrates that the policy engine platform 102 may interface with systems, applications, services, and/or data (collectively, protected systems 114) via one or more APIs (e.g., REST API) to request a determination as to whether a principal (e.g., an entity such as a user, a service, a robotic system, etc.) is authorized to perform an action (e.g., read, write, update, view) on an asset (e.g., a customer account, a document, a piece of infrastructure). Example protected systems 114 include internal applications 114$_1$, customer relationship management systems (CRMs) 114$_2$, and/or microservices 114$_j$.

In particular, the policy engine platform 102 receives an authorization request from a protected system 114 in response to a principal attempting to perform an action on an asset, retrieves the applicable policy, and applies the applicable policy to a nodal graph within the graph directory 104 that has been generated based on the data ingested from the data sources 110. In some embodiments, the response to the authorization request may be either an "allow" or "deny" indication via the REST API based on whether application of an applicable policy indicates that a principal may perform a specific action on a specific asset based on an attempted traversal of the graph.

Additionally, other requests may be received by the policy engine platform 102. In some instances, the policy engine platform 102 may receive a request for and transmit a response including a statement identifying the assets on which a principal may perform a given set of actions. In other instances, the policy engine platform 102 may receive a request for and transmit a response including a statement identifying the principals that may perform actions on an individual or set of assets.

The policy engine platform 102 addresses several critical needs in modern cybersecurity and access management by providing technological improvements to the technology field of access management including zero standing privilege, monitoring and managing dynamic and context-aware access to systems, applications, and/or data, and enforcing real-time, context-aware policies. Additionally, the policy engine platform 102 is configured to integrate with existing cloud applications such as AWS, Azure, GitHub, and Salesforce, as well as on-premises systems, and scale with the addition or subtraction or applications or systems due to its a microservices architecture.

More specifically, the policy engine platform 102 is configured to ensure that a particular principal does not have standing access to systems, applications, or data unless access to such is needed at that point in time, which drastically reduces the risk of unauthorized access and limits the potential damage from security breaches. Further, the policy engine platform 102 employs dynamic, real-time access management policies based on the current context by granting and revoking permissions as needed, enhancing security and reducing the chances of permission sprawl and role bloat. Thus, by eliminating standing access and enforcing real-time, context-aware policies, the policy engine platform 102 protects against identity breaches, phishing attacks, session hijacking, and credential theft.

Figure 2:
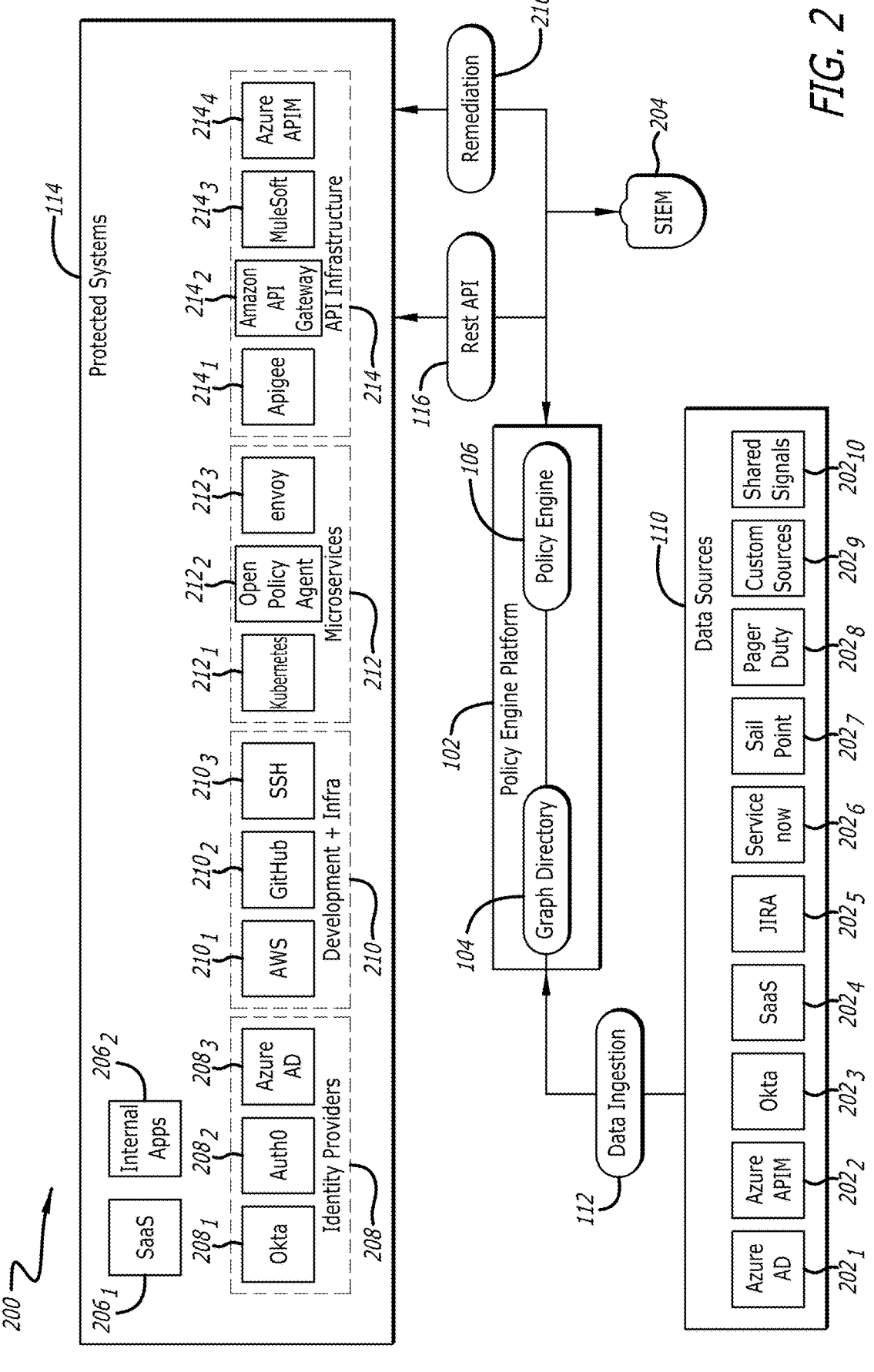
FIG. 2 is a detailed system diagram illustrating the networked exchange of data in a similar manner as shown in FIG. 1 in accordance with embodiments of the disclosure.

Referring now to FIG. 2, a detailed system diagram illustrating the networked exchange of data in a similar manner as shown in FIG. 1 is shown in accordance with embodiments of the disclosure. FIG. 2 illustrates the networked environment 200 that includes many of the same components as illustrated in FIG. 1; however, with additional detail. For example, the networked environment 200 includes the policy engine platform 102, the data sources 110, the data ingestion pipeline 112, the protected systems 114, and the API pipeline 116.

In addition, FIG. 2 illustrates that the data sources 110 may include illustrative examples of systems or applications 202$_1$-202$_{10}$ such as Azure AD, Azure APM, Okta, Salesforce, JIRA, ServiceNow, SailPoint, PagerDuty, custom sources, and data sharing schemas/protocols (Shared Signals Framework (SSF)). Further, FIG. 2 illustrates an interface via one or more APIs with an audit logging service 204, e.g., a security information and event management (SIEM) system.

FIG. 2 also provides additional detail as to illustrative examples of the protected systems 114, which may include software as a service (SaaS) platforms 206$_1$ such as Salesforce, internal applications 206$_2$, identity providers 208 such as Okta 208$_1$, Auth0 208$_2$, and Azure AD 208$_3$, as well as development and infrastructure systems/applications 210 such as AWS 210₁, GitHub 210₂, and SSH 210₃. Additionally, the protected systems 114 may include microservices 212 such as Kubernetes 212₁, Open Policy Agent 212₂, and envoy 212₃. The protected systems 114 may interface with the policy engine platform 102 via APIs included within an API infrastructure 214 including Apigee 214₁, Amazon API gateway 214₂, MuleSoft 214₃, and Azure APIM 214₄, among others.

FIG. 2 illustrates remediation options 216 for the systems and/or applications communicatively coupled with the policy enforcement platform 102 (e.g., those illustrated as part of the data ingestion pipeline 112). Remediation options 216 may include a number of possible actions that include, but are not limited to, the termination of active sessions, modification to privileges, roles, and/or groups, generation of alerts, notification, service tickets (e.g., JIRA tickets), and/or revocation of credentials, tokens, and/or keys for a given set of principals across one or more systems. As one illustrative example, a user might obtain access to an Amazon Web Services (AWS) resource as a result of an open change request inside of ServiceNow, that was approved to allow the user access. The policy engine platform 102 may monitor the approved change request with a rule. Based on the rule, the policy engine platform 102 initiates a set of automated actions. In some instances, the rule monitors for a match of certain criteria such that so long as the criteria match the conditions specified in the rule, actions to revoke permission or privilege are not taken. In other embodiments, the rule may monitor for certain conditions such that when those conditions are matched, the set of automated actions are initiated. As will be discussed in further detail below, a change request in ServiceNow may trigger the transmission of an access request to the policy engine platform 102, e.g., a request for the policy engine platform 102 to determine whether a principal (user) is permitted to take action (access) on an asset (the AWS resource). As also detailed below, receipt of the access request triggers retrieval of one or more policies (e.g., logic expressions formed of one or more rule statements) assigned to ServiceNow (a protected system), which is executed by the policy engine platform 102 against a nodal graph formed of data ingested from various data sources, such as ServiceNow. Following execution of one or more policies assigned to ServiceNow, the policy engine platform 102 returns a response to the access response in the form or either allow the action or deny the action.

As one specific, illustrative example, a Rule may be configured as follows: "For a user to obtain access to AWS, the user needs an approved change that details the role the user is permitted. When the change is no longer active, revoke access to that role." In such an example, the policy engine platform 102 provides an indication that the user is allowed access to AWS while the change meets the criteria. Further, when the change no longer meets the criteria, the policy engine platform 102 makes a series of requests (transmissions) to one or more of the protected systems 114 with instructions to perform a set of actions to revoke permission for the user to AWS. In this particular case, the actions may include transmission of an HTTP Request to modify the policy for that role to disallow access to AWS after the time the change was closed and until a new change meeting the criteria of the Rule is generated.

As will be discussed in further detail below, the policy engine platform 102 is configured to ingest data from the data sources 110 via a data ingestion pipeline 112, which may comprise various mediums over which data is transferred in accordance with one or more application programming interfaces (APIs). The ingested data may be obtained from any of the data sources in accordance with configuration files for each data source 110. In some examples, the configuration files may be stored within the graph directory 104. A first configuration may correspond to a first data source 110 and indicate an API for obtaining data therefrom (e.g., either via a push or pull operation), a frequency at which to retrieve data if applicable, and a set of fields that are to be included in data obtained from the particular data source 110. The ingested data may be deposited directly into the graph directory 104. The first configuration corresponding to the first data source 110 may then be executed to parse the ingested data from the first data source 110 and build a portion of a nodal graph stored within the graph directory 104 by identifying field values as nodes and relationships between nodes as set forth in the first configuration. In some instances, a plurality of configuration files may correspond to a single data source and/or be executed in accordance with the building of the nodal graph (e.g., a first configuration identifies nodes, and a second configuration identifies relationships).

As data is ingested from a plurality of data sources, the nodal graph is revised, which may include expanding through the addition of new nodes and/or relationships and/or shrinking due to nodes previously identified being no longer in the ingested data. In instances when a first node is identified following a first ingestion of data but is not identified following a second, subsequent ingestion of data, the first node is removed from the nodal graph and all relationships connecting thereto are also removed. Data ingestion may continuously occur, e.g., ingesting data from each data source at predetermined intervals such as every second, minute, 5 minutes, 30 minutes, etc. Thus, the nodal graph stored within the graph directory 104 may be ever-evolving.

Additionally, the policy engine platform 102 includes a policy engine 106, which may be logic that, when executed by one or more processors, is configured to receive requests from one or more protected systems 114. As noted above, the requests may be an authorization request, an authorized asset identification request, or an authorized action identification request.

a. Logical Representation

Figure 3:
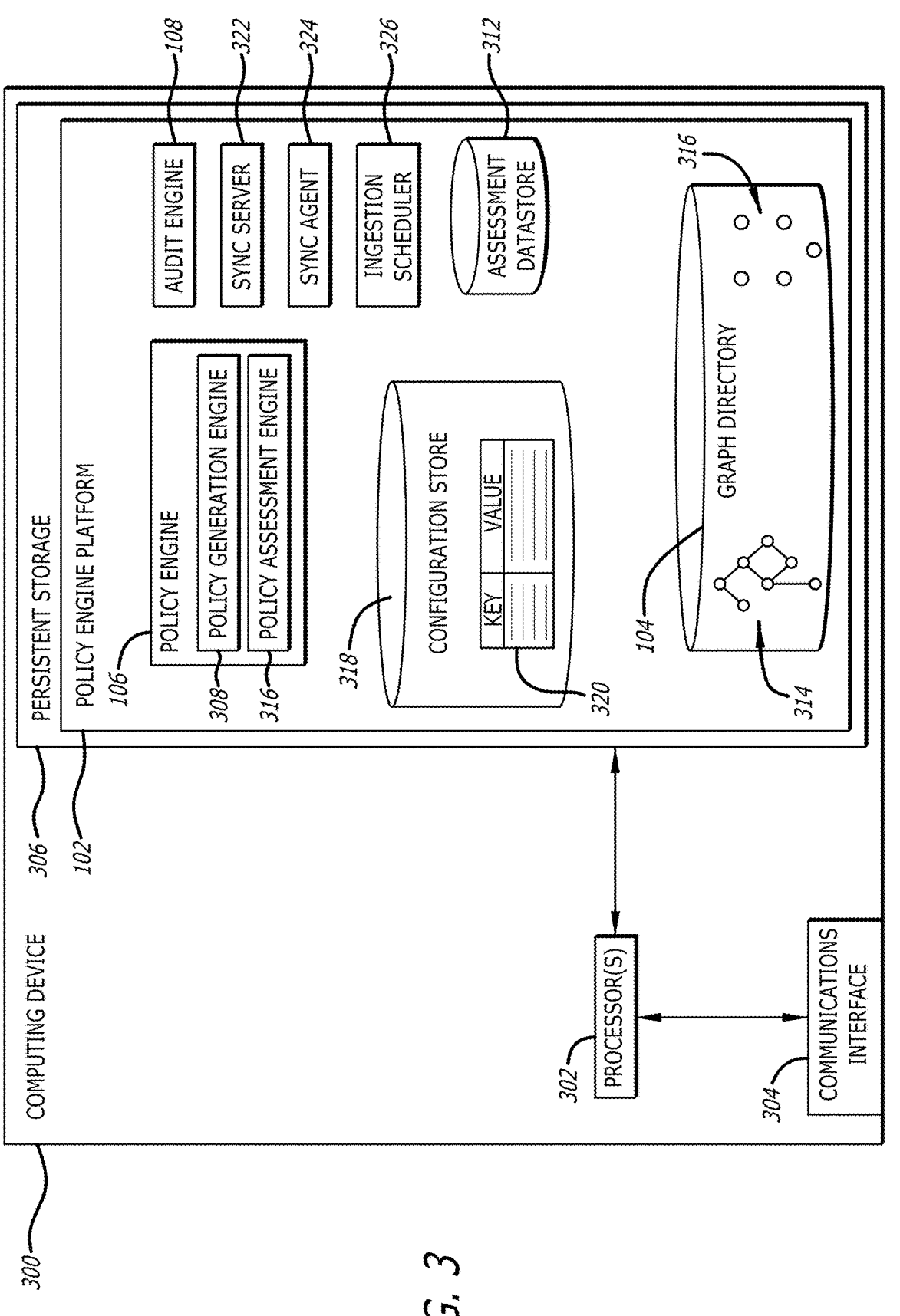
FIG. 3 is a logical representation of the policy engine platform of FIG. 1 in accordance with embodiments of the disclosure.

Referring to FIG. 3, a logical representation of the policy engine platform of FIG. 1 operating on a computing device is shown in accordance with embodiments of the disclosure. A computing device 300 is shown, which may represent a server device (or a distributed server farm) or other cloud computing resources, and in an embodiment, may include a housing, which may be made entirely or partially of a hardened material (e.g., hardened plastic, metal, glass, composite or any combination thereof) that protects the circuitry within the housing, namely one or more processors 302 that are coupled to a communication interface 304 via a first transmission medium. The communication interface 304, in combination with a communication logic (not shown but may be stored within the persistent storage 306), enables communications with external network devices to receive communications as well as updates for the policy engine platform 102. According to one embodiment of the disclosure, the communication interface 304 may be implemented as a physical interface including one or more ports for wired connectors. Additionally, or in the alternative, the communication interface 304 may be implemented with one or more radio units for supporting wireless communications with other electronic devices. The communication interface logic may include logic for performing operations of receiving and transmitting one or more objects via the communication interface 304 to enable communication between the policy engine platform 102 and network devices via a network (e.g., the internet) and/or cloud computing services, not shown.

The processor 302 is further coupled to a persistent storage 306 (e.g., non-transitory, computer-readable medium) via a second transmission medium. According to one embodiment of the disclosure, the persistent storage 306 may have stored thereon the policy engine platform 102, which may include the following components: a graph directory 104, a policy engine 106, an audit engine 108, a configuration store 318 that stores a plurality of key-value pairs 320, a sync server 322, a sync agent 324, and an ingestion scheduler 326. Additionally, the graph directory 104 is configured to store a graph structure 314 and a set of a configuration nodes 316. While details of the graph structure 314 and the configuration nodes 316 are discussed in further detail below, as a brief introduction, the graph structure 314 may be formed from and stored within a graph database management system that is configured to organize and store data as nodes, relationships, and properties (as opposed to storing data in tables with rows and columns). The graph structure 314 comprises a series of graph nodes that are connected through relationships.

As discussed further below at least with respect to FIGS. 4-5, the sync server 322 is configured to monitor the configuration store 318 for changes to the key-value pairs 320. When a change is detected, the sync server 322 alerts the sync agent 324, which is configured to push the change to the configuration nodes 316 within the graph directory 104. For example, the sync agent 32 may cause modifications to a configuration node 316 through execution of a query, e.g., written the Cypher query language.

The ingestion scheduler 326 is configured to perform data ingestion processes for each data source. In some embodiments, the ingestion scheduler 326 may be a Kubernetes service deploying a series of pods, with each pod running an instance of logic that performs the operations set forth in FIGS. 4-5. The operations may include running at periodic or aperiodic intervals to check the configuration information included within a configuration node, ingesting data from a data source according to the configuration information, generating nodes/relationships in accordance with the configuration information, and/or deleting nodes/relationships in accordance with the configuration information.

FIG. 3 also illustrates that the policy engine 106 may include sub-logic modules such as a policy generation engine 308 and a policy assessment engine 310. The operations of these software modules, upon execution by the processor 302, are described below. Briefly, the policy generation engine 308 may receive user input defining whether a principal can perform some action on an asset. The policy is then stored within the graph directory 104.

The policy assessment engine 308 is configured to receive a request from a protected system 114, retrieve an applicable policy, and "apply" the policy to the nodal graph 314 by attempting to traverse the graph 314, which includes determining whether the content of the nodal graph 314 satisfies the criteria of the policy. For example, an authorization request may be received requesting an indication as to whether sales team member "Chris" may apply a discount to a customer's order within a CRM solution. The policy assessment engine 308 may first determine that the applicable policy is: "a sales team member should only be able to apply discounts to customer invoices in the billing platform if they are the assigned account owner and the discount is less than an allowed value." The policy assessment engine 308 attempts to traverse the nodal graph 314 by determining whether each of the following are satisfied by the nodal graph 314:

A "sales team member" node having a name value of "Chris" exists within the graph The "sales team member" node having a name value of "Chris" node has an "account owner" relationship to a "customer" node The discount is less than the allowed value The assessment datastore 312 may store each request, each response, a state of the nodal graph 314 at the time of assessment (application of policy), and the applied policy. Of course, it is contemplated that some or all of this logic may be implemented as hardware, and if so, such logic could be implemented separately from each other. Similarly, the data stores may be implemented as one or more data stores.

b. Logical Flow—Graph Generation

Referring to FIG. 4, a flowchart illustration of operations of a first method of building a graph representation of customer account information from various cloud applications and/or on-premises systems is shown in accordance with embodiments of the disclosure. Each block illustrated in FIG. 4 represents an operation in the process 400 performed by, for example, the policy engine platform 102 of FIG. 1. It should be understood that not every operation illustrated in FIG. 4 is required. In fact, certain operations may be optional to complete aspects of the process 400. The discussion of the operations of process 400 may be done so with reference to any of the previously described figures.

Figure 7:
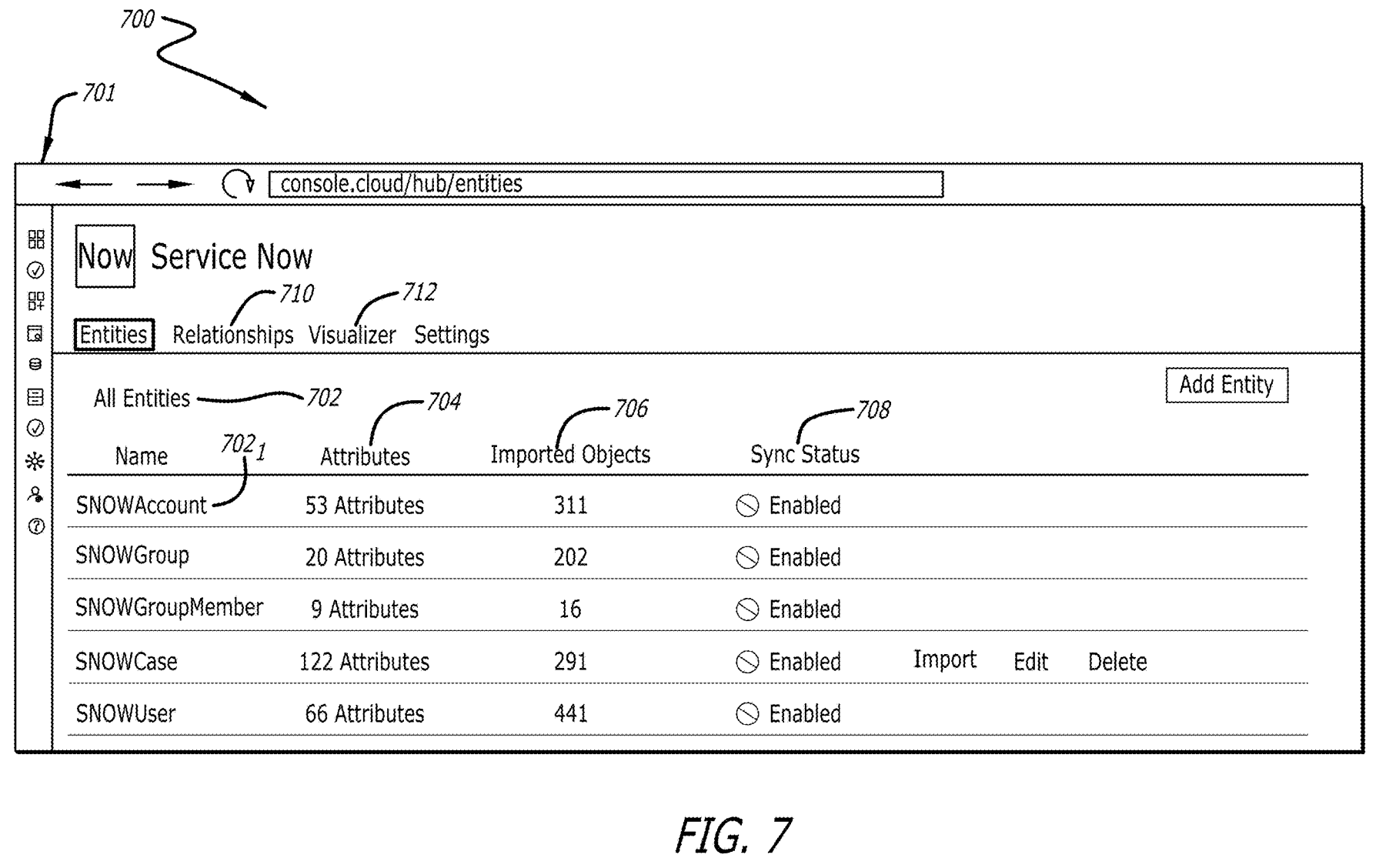

The process 400 begins with an operation of ingesting first data from a first data source (block 402). For example, and referring to FIG. 2, data may be ingested from data sources 110 such as Azure AD 202$_1$ and Okta 202$_3$, any of which may correspond to the "first data source." In one embodiment, the data may be ingested from a comma-separated values (CSV) file. For example, as seen in FIG. 7, which provides a sample GUI displaying an entity listing screen for a first example cloud application ("ServiceNow") that includes a value of 311 in column 706 of row 702$_1$, which indicates that 311 entities of "SNOWAccount" have been imported and will be used in building a graph representation thereof. The 311 entity values may have been uploaded via a CSV file that includes 311 "SNOWAccount" entities and, optionally, one or more attributes associated with the SNOWAccount entity as set forth in a configuration specific to the ServiceNow data source stored in a configuration node within a graph structure as discussed in more detail with respect to FIG. 5. Additional CSV files may also be ingested providing values for additional entities as defined in the same configuration (or a different configuration specific to a second data source), where one or more configurations also indicate a relationship between the ingested entities.

Following ingestion, the first data is parsed in accordance with a first configuration and nodes are generated for a graph structure based on values detected in the first data as defined in the first configuration (blocks 404, 406). As used herein, a graph structure refers to a structured database configured to organize and manage entities and their relationships in a graph format, or structure, in which data is represented as nodes (vertices) and edges (relationships). Nodes may represent entities such as accounts, users, groups, members, tickets, employees, etc., and edges may represent the relationships or connections between them. The edges may indicate such relationships as "owns", "is assigned to", "is account lead", etc.

In some instances, the graph structure may be stored as database files with the corresponding database being a schema-less database. For example, the graph directory 104 may comprise a plurality of database files such as an entity database file, a relationship database file, an attribute database file, etc., where each database file stores a particular type of information and where each database has a fixed record size depending on its information. In some instances, graph structure may be stored as linked lists of fixed size records, with some database files stored as linked lists including a key and a value while pointing to the next attribute. As illustrated in FIG. 3, the graph structure may be stored within a graph directory that is also comprised of nodes that are not connected to the graph structure through relationships and are referred to as configuration nodes. The configuration nodes store the configuration information discussed above and may include ingestion information such as a data source identifier, an API with which to ingest information from the data source, a frequency of ingestion for the data source, and the key-value pairs that are to be ingested for the data source.

Following ingestion of the first data and generation of nodes therefrom, nodes and associated relationships that were previously generated and that pertain to values that were not included in a most recent data ingestion for the first data source are deleted from the graph structure (block 408). Relationships are then generated between nodes within the graph structure as defined in the first configuration (block 410). Following generation of the graph structure, e.g., the database files, a graphical user interface (GUI) displaying the graph structure may be generated, wherein the GUI is configured to receive user input resulting in a filtering of the display of the graph structure (block 412). FIGS. 6 and 8A-8D provide illustrative examples of possible graphic displays of a nodal graph. In some embodiments, the graph structure forms a graph database against which queries (policies) are executed as discussed below to determine a response to an access request, where the graph database specifically stores and processes data using a graph structure instead of conventional tables or documents.

Referring now to FIG. 5, a flowchart illustration of operations of a second, detailed method of building a graph representation of customer account information from various cloud applications and/or on-premises systems is shown in accordance with embodiments of the disclosure. Each block illustrated in FIG. 5 represents an operation in the process 500 performed by, for example, the policy engine platform 102 of FIG. 1. It should be understood that not every operation illustrated in FIG. 5 is required. In fact, certain operations may be optional to complete aspects of the process 500. The discussion of the operations of process 500 may be done so with reference to any of the previously described figures.

The process 500 begins with an operation of monitoring, by a sync server, a configuration store for changes to contents of key-value pairs stored therein (block 502). Upon detecting a change, a sync agent performs a synchronization operation that includes synchronizing a configuration node stored within a graph directory with the altered key-value pair (block 504). Stated differently, the sync agent is notified by the sync server of the change, and the sync agent updates the configuration node that includes the key-value pair. For example, a configuration node is specific to a particular data source and details a set of entities and attributes that are to be ingested from the data source, where the key-value pairs may indicate the entities to ingest for a data source and the attributes of the entities. The entities will form the nodes within the graph structure.

A data ingestion process is then performed by an ingestion scheduler that includes operations of retrieving data source information and current configuration data for a first data source and requesting first data from the first data source in accordance with the current configuration data (block 506). As noted above, the data source information and current configuration data are stored within a configuration node within a graph directory along with a graph structure. The ingestion scheduler then generates a set of nodes for the graph structure by parsing the ingested first data and extracting values for nodes and node attributes as defined in the current configuration (block 508).

In some embodiments, the graph structure may be formed from a graph database management system that is configured to organize and store data as nodes, relationships, and properties (e.g., attributes) as opposed to a traditional relational database that stores data in tables with rows and columns. One technical benefit of the graph structure is the ease and speed at which the graph structure is able to be updated. For example, the configuration data for a given data source details the entities to be ingested for the data source and also indicates attributes about each entity as key-value pairs. With a graph structure, an administrator may quickly and easily alter the attributes associated with an entity by altering the key-value pairs for the entity. Conversely, alteration of properties of an entity when stored in a relational database may involve the complete reorganize/redesign of the database structure (e.g., reorganizing the data in a database table). In some particular embodiments, the graph structure may be a Neo4j graph database, where a query language, e.g., Cypher, is utilized to create, modify, and query the graph data.

The ingestion scheduler may delete any previously generated nodes and associated relationships that correspond to the first data source and have values that were not included in the most recent data ingestion process (block 510). For example, when a graph structure includes a node directed to tickets, such as those utilized in project management and issue tracking systems (e.g., JIRA developed by Atlassian), and a first data ingestion operation indicates that an open ticket exists that corresponds to a particular issue, a node is generated within the graph structure for the ticket. When the issue is resolved, the ticket is no longer open and may not be ingested. As a result, the node corresponding to the closed ticket for the resolved issue should be deleted from graph structure. As will be detailed below, the removal of nodes from the graph structure when the data represented by the nodes has been deleted or altered at the data source is critical in preventing the graph from becoming "stale" (e.g., including old or outdated information) and thus enabling the policy engine platform, and particularly the policy engine, to provide real-time policy management, eliminate standing privilege access through dynamic authorization decisions, and manage/revoke privileged sessions in real-time.

Figure 6:
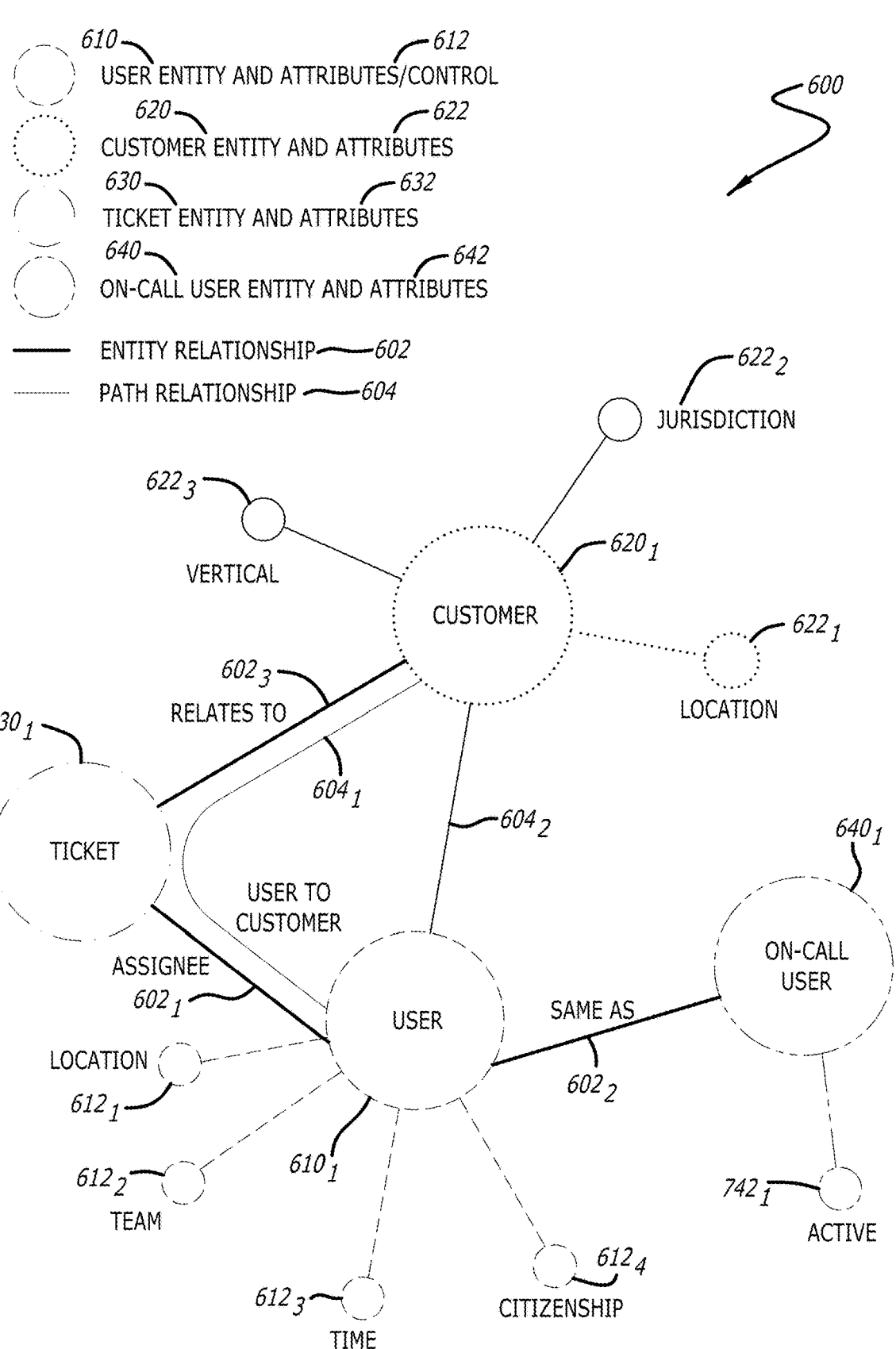
FIG. 6 is a portion of an example graph representation of customer account information from various cloud applications and/or on-premises systems in accordance with embodiments of the disclosure.
Figure 8:
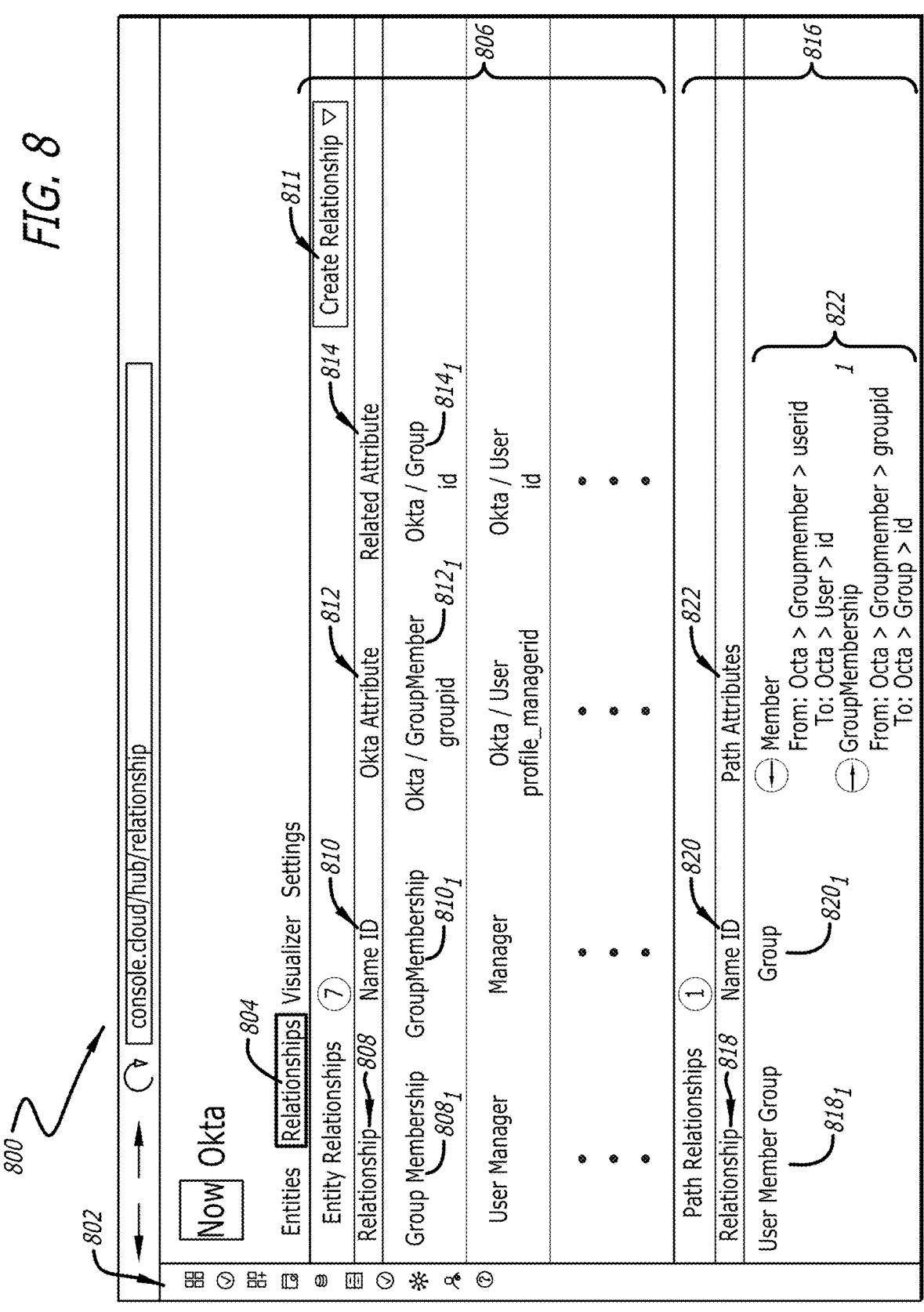
FIG. 8 is an example graphical user interface (GUI) displaying a relationship listing screen for a second example cloud application ("Okta") in accordance with embodiments of the disclosure.

The ingestion scheduler also generates a set of relationships between nodes in the graph structure as defined by the current configuration data (block 512). As illustrated in FIGS. 6 and 8, the ingestion scheduler may generate entity relationships that may include directional labels between two entities. For "is assigned to" or "is a member of" are both directional labels that indicate one entity "is assigned to" another entity (e.g., a ticket entity is assigned to an admin entity) or one entity "is a member of" another entity (e.g., a user entity is a member of a group entity).

Following data ingestion, a graphical user interface (GUI) may be generated that display graph structure as a nodal graph, wherein the GUI is configured to receive user input through a filtering of the display of the nodal graph (block 514). Examples of the GUI are provided in FIGS. 8A-8D.

c. Example Graph Structure Representation

Referring to FIG. 6, a portion of an example graph representation of customer account information from various cloud applications and/or on-premises systems is shown in accordance with embodiments of the disclosure. The example graph structure 600 includes a plurality of entities and relationships therebetween. The illustrated example entities include a user $610_1$, a customer $620_1$, a ticket $630_1$, and an on-call user $640_1$.

The user entity $610_1$ includes attributes of location $610_1$, team $612_2$, time $612_3$, and citizenship $612_4$. Additionally, the user entity $610_1$ has relationships to other entities including an "assignee" relationship $602_1$ with a ticket entity $630_1$, which indicates that a particular user may be assigned to a particular ticket, and a "same as" relationship $602_2$ with the on-call user entity 640, which indicates that a user node and an on-call user node may refer to the same individual. The customer entity $620_1$ includes attributes of location $622_1$, jurisdiction $622_2$, and vertical $622_3$. Additionally, the customer entity $620_1$ has relationships to other entities including a "relates to" relationship $602_3$ with the ticket entity $630_1$. The ticket entity $630_1$ is shown without having attributes as an example.

The graph structure 600 also illustrates path relationships, which indicate how various nodes are related, either through a direct relationship between entities ("entity relationship") or through a series of entity relationships. For instance, a first path relationship $604_1$ illustrates a path between a customer node and a user node based on each node's entity relationship with a particular ticket node. Additionally, a path relationship may also indicate a direct relationship between two nodes such as the path relationship $604_2$.

Additionally, an on-call user entity $640_1$ includes an attribute of active $642_1$. The use of subscripts in FIG. 6 are intended to note that there may be a plurality of nodes for an entity type, e.g., a fully formed graph may include a plurality of user nodes, a plurality of on-call user nodes, a plurality of tickets, etc. In such instances, a user node may have "assignee" relationships with a plurality of ticket nodes. It should be understood by one of skill in the art that not all customers have a relationship to all tickets, for example. The ingested data discussed above is stored in a graph directory and nodes/relationships are formed based on the values of the ingested data and in accordance with the configuration files pertaining to each data source. Thus, building a graph structure involves creating the proper nodes, relationships (entity and/or path) as rules of the configuration files dictate. As will be discussed below, the relationships may then be traversed from node to node in order to determine whether the contents of the graph structure satisfy a policy (e.g., determining whether the graph include nodes for each entity within the policy and one or more relationships between the nodes).

d. Illustrative Interfaces

Referring now to FIG. 7, an example graphical user interface (GUI) displaying an entity listing screen for a first example cloud application ("ServiceNow") is shown in accordance with embodiments of the disclosure. The GUI 700 provides an illustrative example of a display screen that may be rendered for an information technology (IT) administrator. The GUI 700 provides a sidebar 701 and a table of example entities under the application "ServiceNow" such that the entities may be utilized in building a graph structure. In the table, each row corresponds to a separate entity type. The table includes a first column 702 being a name of the entity type, a second column 704 being a number of different possible attributes for the entity type, a third column 706 indicating the number of imported objects (which translates to the number of different nodes within a graph structure of the entity type), and a fourth column 708 indicating a sync status of the entity type (e.g., if the entity type is being requested during data ingestion).

Reviewing a first row of the GUI 700, one example entity includes a "SNOWAccount" entity $702_1$ having 53 different possible attributes with 311 objects having been ingested (e.g., during a last data ingestion), and an indication that the sync status is "enabled." The remaining entity types within the table similarly correspond to nodes to be included within a graph structure. The GUI 700 includes alternative tabs 710, 712 that provide, for example, a listing of relationships between the entity types listed in the table shown in FIG. 7 (and optionally, entity types of different applications, such as MICROSOFT 365®) (relationships 710) and a graph visualization that may display a graphical representation of a graph structure as shown in FIGS. 9A-9D (visualization 712).

FIG. 8 is an example graphical user interface (GUI) displaying a relationship listing screen for a second example cloud application ("Okta") in accordance with embodiments of the disclosure. The GUI 800 provides an illustrative example of a display screen that may be rendered for an IT administrator. The GUI 800 provides a sidebar 802 and a table 804 of example relationships for the application "Okta" such that the relationships may be utilized in building a graph structure. The table 804 may be viewed as having two components including a first component 806 listing entity relationships and a second component 816 listing path relationships. The first component 806 includes columns such as a relationship (name/label) column 808, a name ID column 810, an Okta attribute column 812, and a related attribute column 814. A first row in the first component 806 provides an example entity relationship having a name/label $808_1$ of Group Membership, a name ID $810_1$ of "GroupMembership", an Okta attribute $812_1$ of Okta/Group-Member (groupid), and a related attribute $814_1$ of Okta/Group (id).

Similarly, the second component 816 includes columns such as a relationship (name/label) column 818, a name ID column 820, and a path attributes column 822. A first row in the second component 816 provides an example path relationship having a name/label $818_1$ of User Member Group, a name ID $820_1$ of "Group", path attributes $822_1$ of Member (from: Otka>GroupMember>userid, to: Okta>user>id) and GroupMembership (from: Okta>GroupMember>groupid, to: Okta>Group>id).

Figure 9A:
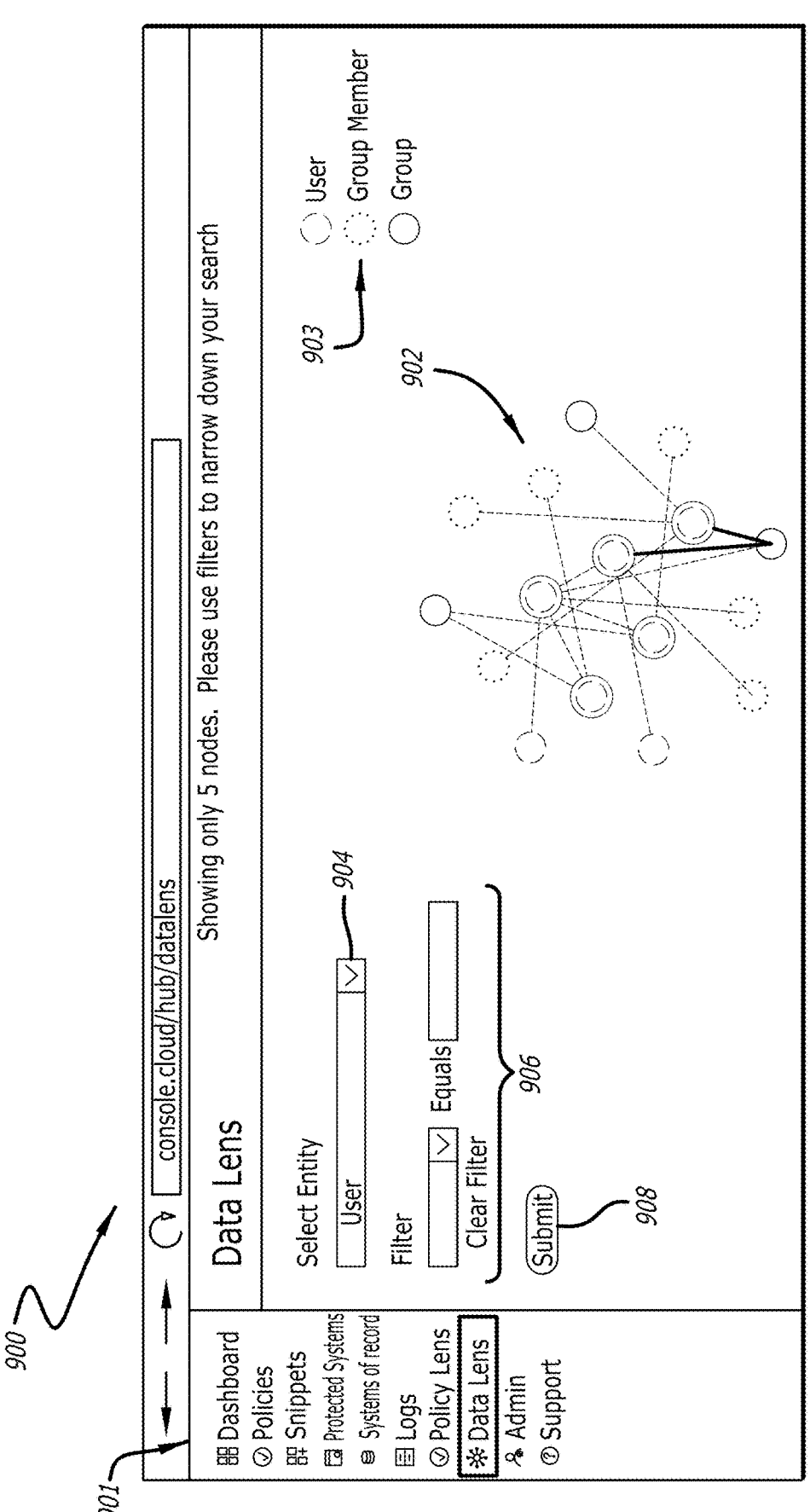
FIG. 9A is an example GUI displaying a portion of a graph representation of customer account information from various cloud applications and/or on-premises systems in accordance with embodiments of the disclosure.

Referring now to FIG. 9A, an example GUI displaying a portion of a graph representation of customer account information from various cloud applications and/or on-premises systems is shown in accordance with embodiments of the disclosure. The GUI 900 provides an illustrative example of a display screen that may be rendered for an IT administrator enabling the IT administrator to view a graphical representation of a graph structure stored and maintained by the policy engine platform as discussed above. The GUI 900 provides a sidebar 901 illustrating that a "Data Lens" component is being displayed, which corresponds to the right-hand side of the GUI 900. The Data Lens provides a graphical representation of a graph structure in the form of the nodal graph 902 comprised of nodes and relationships.

A legend 903 may be provided that illustrates what each node type represents. The legend 903 may also indicate what kind of relationship each line type represents. The Data Lens component provides user input (UI) elements such as a dropdown 904, and the dropdown group 906, which enables the IT admin (or other viewer) to filter the nodal graph 902 by a selected entity (dropdown 904) and one of a plurality of additional, predefined filters that are based on the contents of the graph structure (dropdown group 906). The UI element 908 causes the user input to be submitted to the policy engine platform. As shown in FIG. 9A, the dropdown 904 illustrates user input has been provided selecting a "User" entity, which may be an entity ingested through the Okta data source.

Figure 9B:
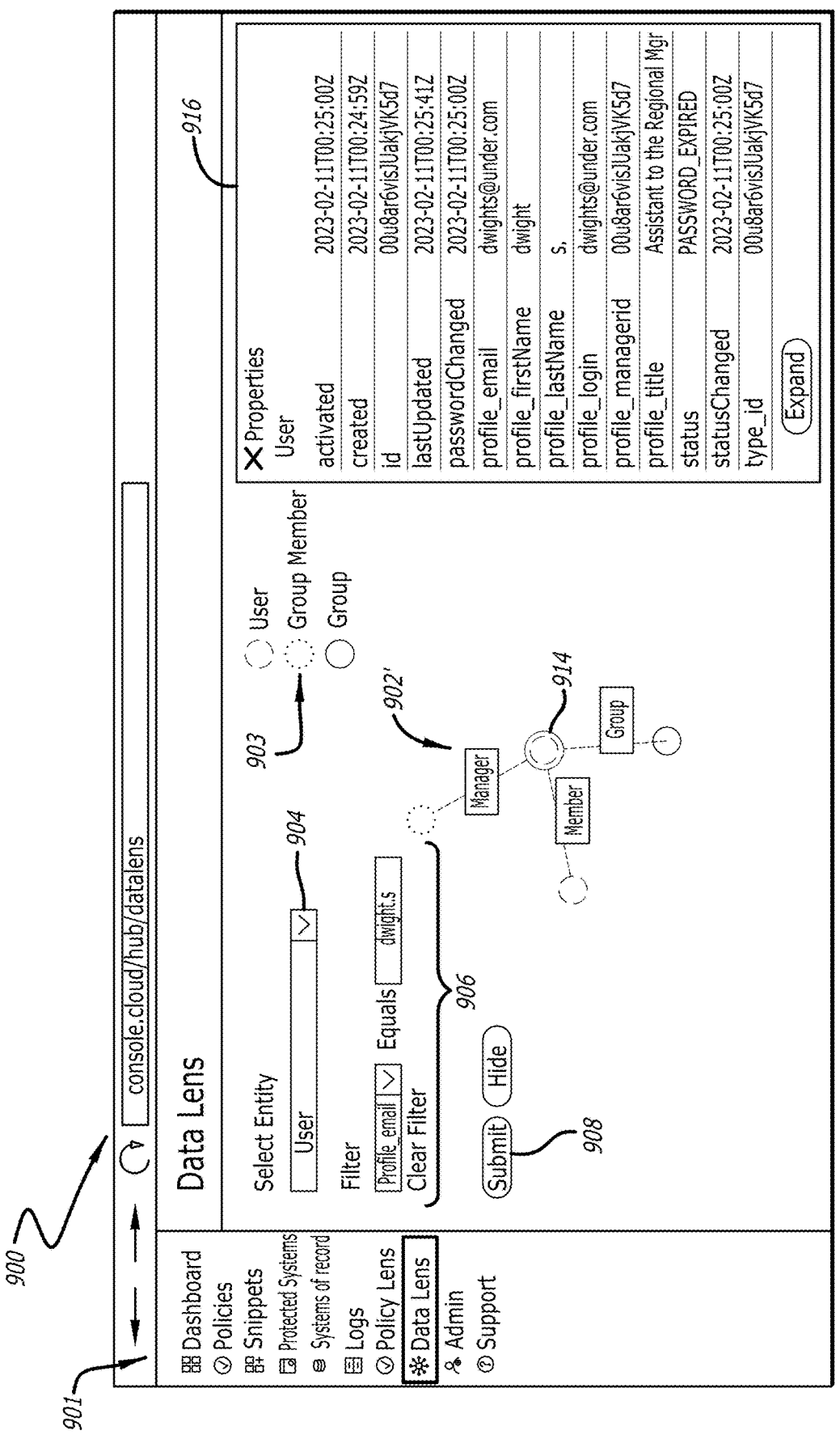
FIG. 9B illustrates the GUI of FIG. 9A following receipt of user input resulting in a filtering by entity "User" and a selected attribute and value, and display of a dynamic, automated alteration of the portion of the graph representation of customer account information in accordance with embodiments of the disclosure.

FIG. 9B provides a revised version of the GUI of FIG. 9A following receipt of user input resulting in a filtering by entity "User" and a selected attribute and value, and display of a dynamic, automated alteration of the portion of the graph representation of customer account information in accordance with embodiments of the disclosure. The GUI 900 as seen in FIG. 9B includes many of the same components and visuals illustrated in FIG. 9A while also showing filtering parameters selected in each of the dropdown 904 (User) and dropdown group 906 ("profile email equals dwight.s"). The nodal graph 902 of FIG. 9A is shown in a filtered state in FIG. 9B as nodal graph 902'.

FIG. 9B also illustrates that the nodes of the nodal graph 902' are selectable through user input to search for a specific node. FIG. 9B illustrates selection of a User attribute from the Filter dropdown and entrance of the attribute value for the desired node in a text box 907. For example, an IT administrator may be interested in seeing the attributes and relationships for an Okta User with the email dwight.s@under.com, user input may cause selection of "profile_email" from the dropdown 906, and entrance of the email address in text box 907.

Further use input may be received corresponding to selection of a node, e.g., node 910, which results in the generation of a properties table 912. The table 912 is populated with the properties of the entity corresponding to the selected node 910. The properties (attributes) are pulled from the graph structure, e.g., through execution of one or more query statements. As the attributes (properties) may differ for each entity, the properties listed within the table 912 may differ based on the selected node.

Figure 9C:
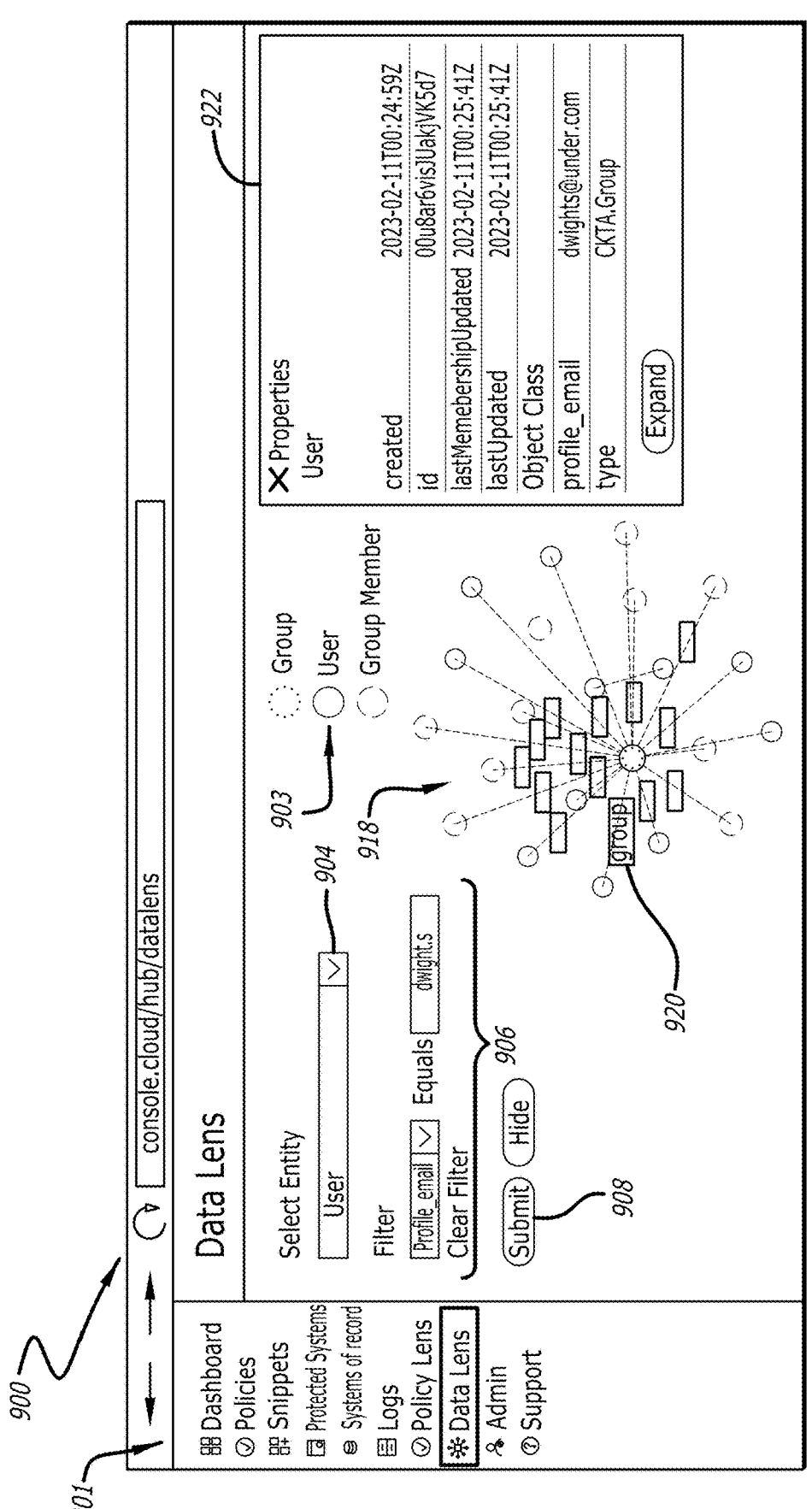
FIG. 9C illustrates the GUI of FIG. 9B following expansion of the graph representation to include Group nodes related to the User and a dynamic, automated alteration of the portion of the graph representation of customer account information displayed in FIG. 9B in accordance with embodiments of the disclosure.

Referring to FIG. 9C, a revised version of the GUI of FIG. 9B following expansion of the graph representation to include Group nodes related to the User and a dynamic, automated alteration of the portion of the graph representation of customer account information displayed is shown in accordance with embodiments of the disclosure. FIG. 9C illustrates that the GUI 900 may be display a nodal graph 914 based on a selected node 916. The selected node 916 corresponds to a "Group" entity, which may have been selected from the nodal graph 902' of FIG. 9B. The nodal graph 914 shows group member nodes belonging to the group of the selected node 916. A properties table 918 is shown as a result of the selection of the selected node 916 and provides properties of the group of the selected node 916.

Figure 9D:
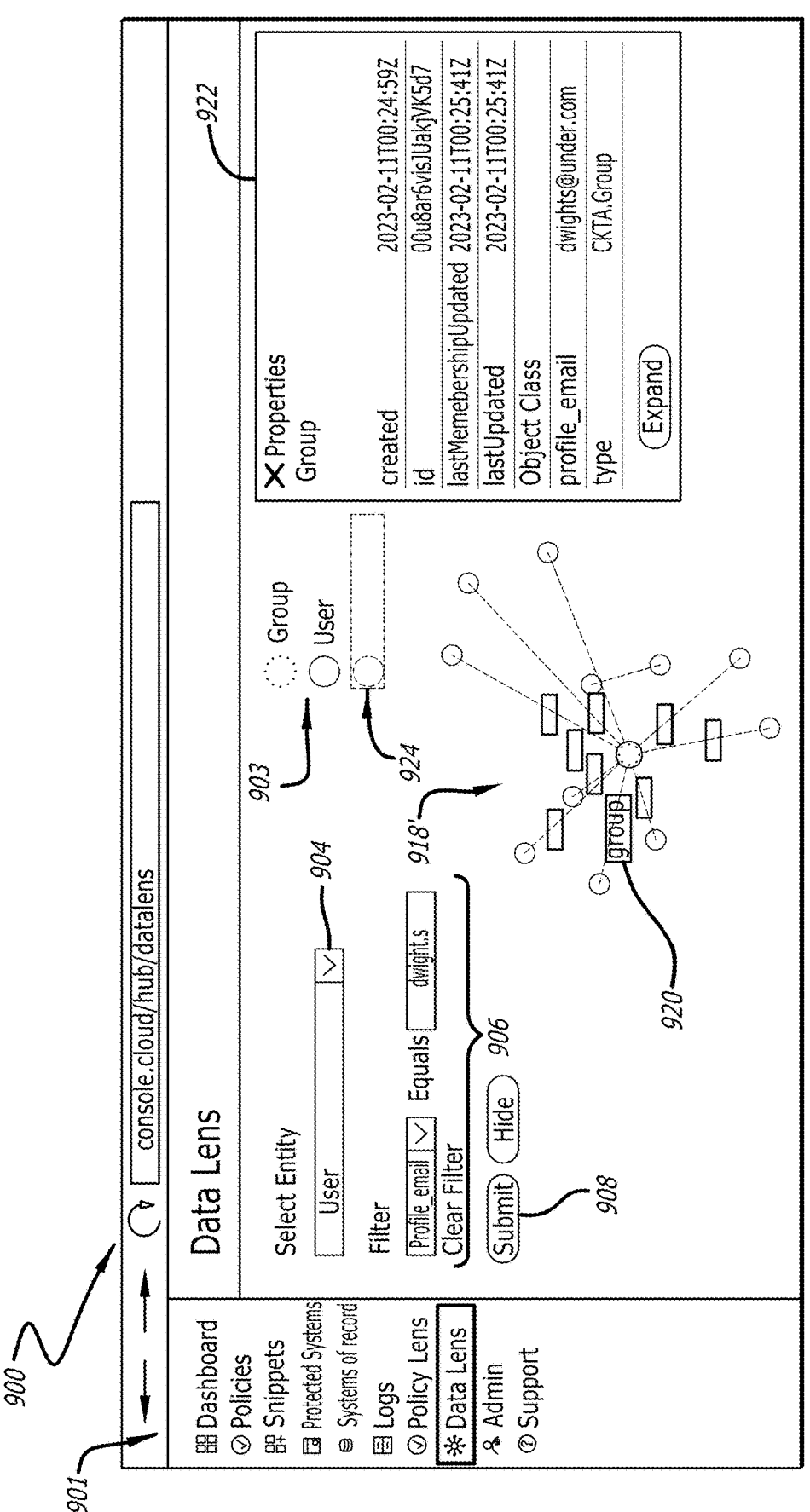
FIG. 9D illustrates the GUI of FIG. 9C following receipt of user input resulting in a filtering by de-selecting an Entity and a dynamic, automated alteration of the portion of the graph representation of customer account information displayed in FIG. 9C in accordance with embodiments of the disclosure.

Referring to FIG. 9D, a revised version of the GUI of FIG. 9C following receipt of user input resulting in a filtering by de-selecting an Entity and a dynamic, automated alteration of the portion of the graph representation of customer account information displayed is shown in accordance with embodiments of the disclosure. FIG. 9D illustrates a feature provided by the policy engine platform being the ability to toggle visibility of certain nodes and their relationships. For instance, the IT administrator may not wish to view all nodes and relationships of a "GroupMember" entity. Through receipt of user input clicking on the "GroupMember" entity 924 in the legend 903, the node corresponding to the GroupMember entity will be hidden along with its relationships as shown in nodal graph 914'. By clicking on the GroupMember" entity 920 in the legend 903 again, the nodes and relationships will return to the GUI 900.

Figure 9E:
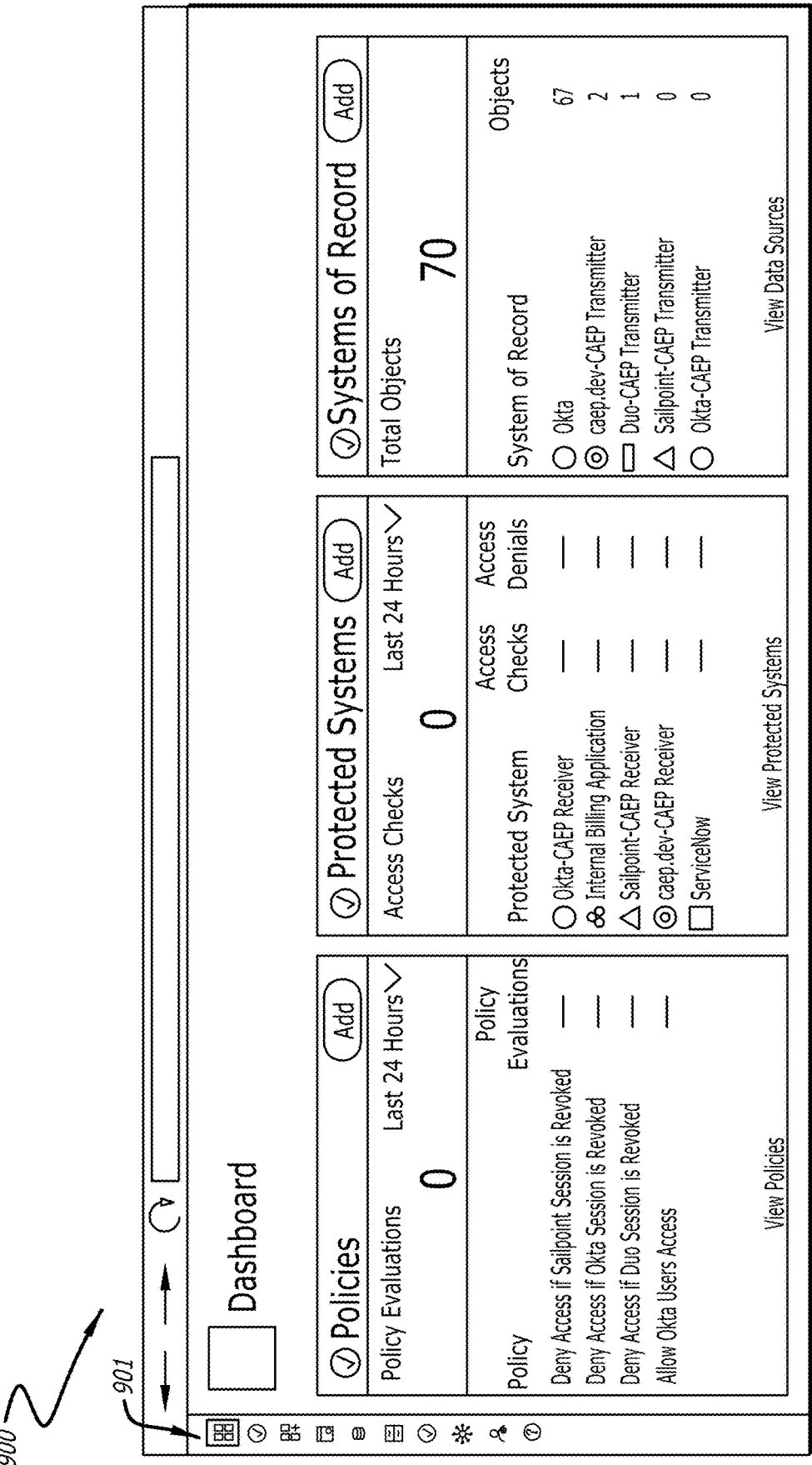
FIG. 9E illustrates a dashboard view of statistics of the polices, the protected systems, and the data sources that comprise or provide data comprising the policy engine platform 102 in accordance with embodiments of the disclosure.

Referring to FIG. 9E, a dashboard view of statistics of the polices, the protected systems, and the data sources that comprise or provide data comprising the policy engine platform 102 is shown in accordance with embodiments of the disclosure. FIG. 9E illustrates a dashboard view of the policies and recent policy evaluation results with an indicator as to a number of policy evaluations for a past time period, the protected systems and how many access requests (or checks) have been transmitted to the policy engine platform 102 for consideration. The GUI 900 of FIG. 9E also shows a number of data sources that are ingesting data for graph building as well as a number of items stored in the graph.

III. Policy Generation

As discussed above, the policy engine platform 102 of FIG. 1 is configured to build a nodal graph from data ingested from a plurality of data sources 110. The policy engine platform 102 is further configured to receive access requests from any of the protected systems 114 and evaluate one or more policies assigned to the protected system 114 based on the contents of the access request. However, such policies first need to be generated, assigned to one or more protected systems, and stored for subsequent retrieval, e.g., upon receipt of an access request. The policy generation process discussed below enables dynamic policy generation for enforcement of zero-trust security principles by enabling organizations to define access rules based on real-time user attributes, activities, and security context rather than relying solely on static roles.

The policy engine platform 102 utilizes attribute-based access control (ABAC), relationship-based access control (ReBAC) and real-time context instead of traditional role-based access control (RBAC), which enables decisions on whether to allow/deny a certain access request to depend on multiple factors, which has not previously been possible. Examples of such factors include user identity and role (e.g., employee, contractor, admin), device security posture (e.g., managed vs. unmanaged), location (e.g., access allowed only from corporate network, or geographical location), risk score (e.g., high-risk login attempts trigger restrictions), business context (e.g., only active employees can access financial records), etc. As discussed below, policies are built dynamically using various attributes, attributes, and context, ensuring continuous enforcement even if conditions change.

The policy engine platform 102 advantageously deploys a no-code policy generation methodology such that admins, users, or security teams (e.g., Security Operations Center (SOC) analysts) to define policies without writing programming code, scripts, etc. Instead, the policy engine platform 102 generate a plurality of graphical user interfaces (GUIs) that are configured to receive user input while guiding the user through a series of prompts and user input (UI) components, where the user input corresponds to generation of conditional logic rules (e.g., "Allow access IF user is in department X AND using a managed device"). Alternatively, the policy engine platform 102 may provide or suggest predefined templates for common security scenarios. In yet other embodiments, instead of relying on user input through one or more GUI screens, the policy engine platform 102 may also be configured to receive such data through a configuration file or similar upload or retrieval of stored data. Following the discussion of aspects of the policy generation process, the disclosure includes a detailed description and several examples as to how the generated polices are evaluated in response to receipt of an access request from a protected system.

Figure 10A:
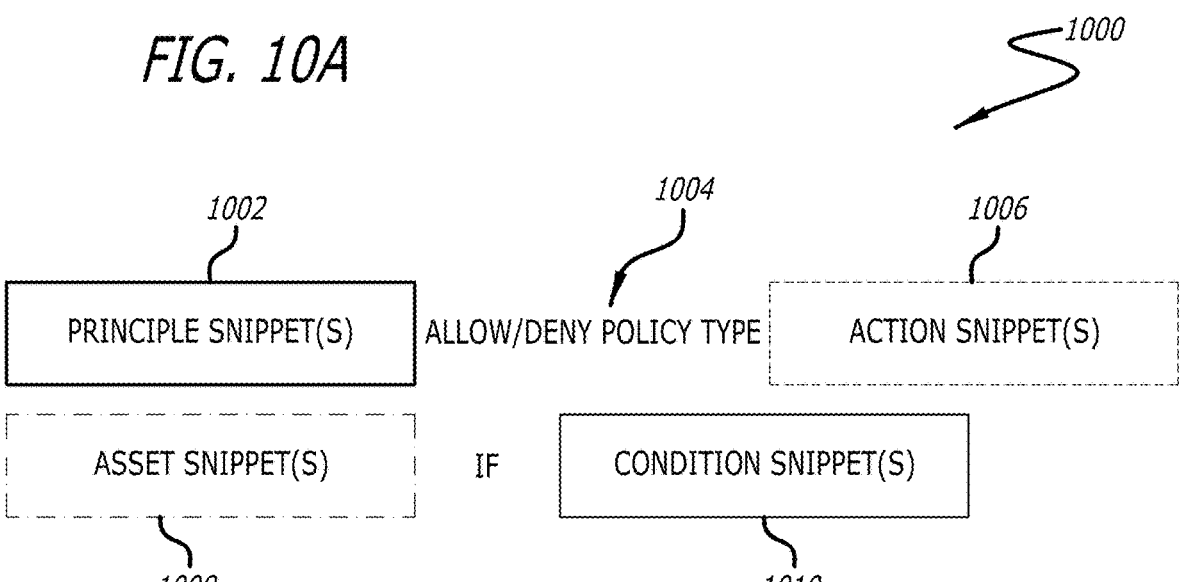
FIG. 10A is an abstracted policy structure illustrating how snippets are assembled in a designated structure to express a policy in accordance with embodiments of the disclosure.

Referring now to FIG. 10A, an abstracted policy structure illustrating how snippets are assembled in a designated structure to express a policy is shown in accordance with embodiments of the disclosure. An abstracted policy structure 1000 is shown to include a plurality of snippets of differing types, where the types include principal, asset, action, and condition. As used herein the term "snippet" refers to a modular logic component that is reusable as forming a portion of multiple policies and formed of parameter fields that are dynamically populated at evaluation time with values from an access request received from a protected system. In some instances, the modular logic component may be stored as a data store within non-transitory, computer-readable medium. The deployment of snippets by the policy engine platform 102 provides numerous technological advantages over current access management systems as (i) the reusable nature of snippets are defined once and reused across numerous policies, which reduces the computing resources needed to store policies for various policies and protected systems as each snippet is stored a single time and each policy includes a reference to the snippets forming the policy (e.g., a pointer to the location in non-transitory, computer-readable medium at which each snippet is stored or an address thereof), and (ii) the reusable nature of snippets allows for a single update to apply to each of the policies comprised of the snippet, which ensures consistency across such policies, which could number in the tens, hundreds, thousands, etc. The abstracted policy structure 1000 has a set structure that is both easily converted into a search query that can be executed against the nodal graph by populating parameter fields of each snippet with content in a received access request and has a human-readable logical flow.

The principal snippet 1002 describes the cohort of identities (e.g., users, services, robots, etc.) to which a policy pertains. For example, a principal snippet may refer to "Customer Support" and have a set of parameter fields defining Customer Support, which enables the policy engine platform 102 to populate the parameter fields using content within a received access request. Example parameter fields for a Customer Support principal snippet may define a data source from which relevant data would have been ingested. This may provide a starting point within a nodal graph for traversing the nodal graph during the query execution process, which is discussed below. For example, the data source for Customer Support may be Workday. The principal snippet 1002 may further include a parameter field of entity type and correspond to one or more key:value pairs such as key (role) and value (support) or key (manager) and value (director of customer support). Thus, such a principal snippet corresponds to a query against a nodal graph for a user entity type ingested from a specific data source (e.g., Workday) where the user either has a role defined within the nodal graph as "support" or "direct of customer support." As one of ordinary skill in the art would understand from the discussion above, the data source, entity type and define key:value pairs are defined within the nodal graph and correspond a distinct node type.

The policy type 1004 refers to a pre-configuration of a policy as either an allow policy type or a deny policy type. An allow policy type is evaluated to determine whether the principal is permitted to perform a particular action on a particular asset, and optionally, in view of a condition. In contrast, a deny policy type is evaluated to determine whether the principal is to be denied permission to perform a particular action on a particular asset, and optionally, in view of a condition.

The action snippet 1006 defines the actions, if applicable, that are covered by the policy. Examples actions may include access, edit, delete, copy, etc. Actions may also be defined by an organization with such defined actions being implemented in the nodal graph based on the organization's configuration of a corresponding nodal graph as described above. For instance, an organization may define an action such as "renumber" corresponding to an operation of renumbering a Jira ticket. Another example of an action may be "access" and a policy implementing an action snippet directed to "access" may query a nodal graph to determine whether a principal can access a particular asset.

One technological advantage provided by the policy engine platform 102, and specifically the policy generation process, is the dynamic and flexible nature of providing an organization or authorized user the ability to define actions that are customized to the particular organization's needs and enforce policies including the customized actions in the same manner as any other action. An important to note is that such a technological advantage extends to any of the snippet types, e.g., a principal snippet may be defined and customized according to an organization's need with the organization able to define the parameter fields forming the principal snippet. This flexible nature does not exist in current access management technology.

The asset snippet 1008 defines the asset(s) (e.g., resources, services, infrastructure, etc.) that are within the scope of a policy. For example, an asset snippet may refer to "Customer orders" and have a set of parameter fields defining Customer orders, which enables the policy engine platform 102 to populate the parameter fields using content within a received access request. Example parameter fields for a Customer order asset snippet may include a data source parameter field defining a data source from which relevant data would have been ingested (e.g., Salesforce), a parameter field of entity type (order), and correspond to one or more key:value pairs such as key (account) and value (exists). As one of ordinary skill in the art would understand from the discussion above, the data source, entity type and define key:value pairs are defined within the nodal graph and correspond a distinct node type. As one of ordinary skill in the art would understand from the discussion above, the data source, entity type and define key:value pairs are defined within the nodal graph and correspond a distinct node type.

The condition snippet 1010 defines the conditions that would cause evaluation to give the decision dictated by the policy type. A condition snippet type typically includes an attribute parameter field defining the specific attribute being evaluated by the condition snippet, an operator that defines the logical expression, and a value to which the specific attribute is evaluated in accordance with the operator. The attribute parameter field may refer to a node within the nodal graph, an attribute of a node in the nodal graph, or an external value, e.g., date or time. Example operators include: "equals", which checks if an attribute matches a specific value; "not_equals", which ensures an attribute does not match the value; "greater_than", which verifies if an attribute is greater than the value; "greater_than_or_equals", which checks if an attribute is greater than or equal to the value; "less_than", which ensures an attribute is less than value; "less_than_or_equals", which checks if an attribute is less than or equal to the value; "contains", which checks if a string contains a specific substring, e.g., the value; "not_ contains", which ensures a string does not contain a given substring, e.g., the value; "starts_with", which ensures a string starts with a specified value; "ends_with", which ensures a string ends with a specified value; "in", which checks if an attribute's value is in a specified list; "not_in", which ensures an attribute's value is not in a specified list, e.g., the value; "is_true", which checks if a boolean attribute is true; "is_false", which checks if a boolean attribute is false; "exists", which ensures an attribute is present in the specified value; "not_exists", which ensures an attribute is not present in the specified value.

Figure 10B:
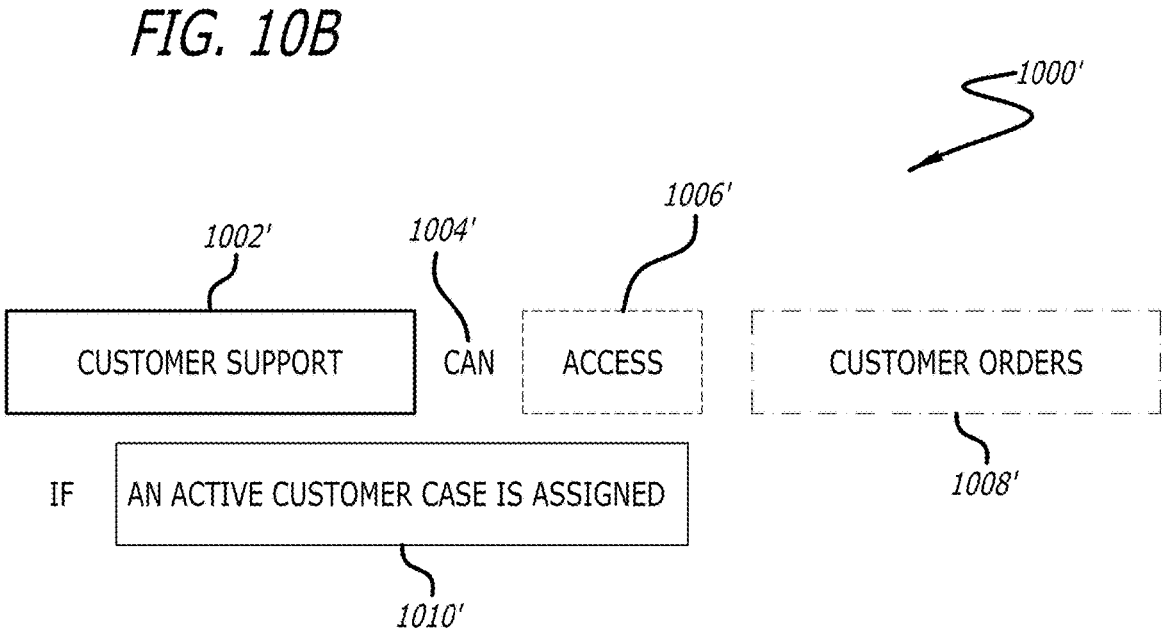
FIG. 10B illustrates the abstracted policy structure of FIG. 10A populated with example data in accordance with embodiments of the disclosure.

Referring to FIG. 10B, the abstracted policy structure of FIG. 10A populated with example data is shown in accordance with embodiments of the disclosure. The policy 1000' represents an illustrative example in which the snippets 1002, 1006, 1008, and 1010 in FIG. 10A have been populated with example snippets. As merely an illustrative example and with no intention of limiting the scope of the disclosure, the policy 1000' includes: the principal snippet 1002' reciting "Customer support", the action snippet 1006' reciting "access", the asset snippet 1008' reciting "customer orders", and the condition snippet 1010' reciting "an active customer case is assigned." The example policy 1000' may correspond to the use case of: "Our Customer Support team should only be able to access a Customer's orders in our CRM solution if they have business justification."

Figure 11A:
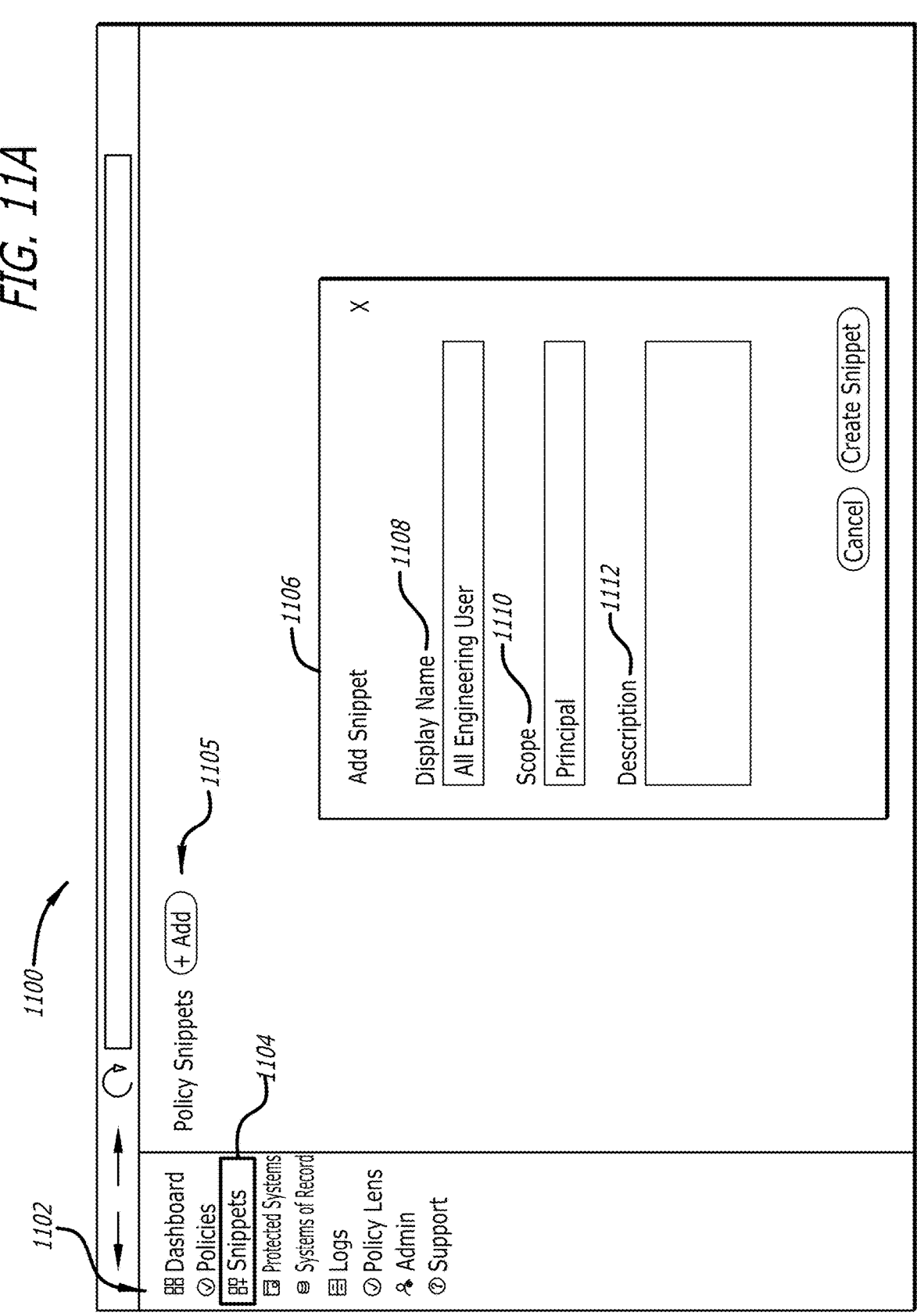
FIG. 11A illustrates a graphical user interface pop-up configured to receive user input corresponding to an initial step in the generation of a snippet in accordance with embodiments of the disclosure.

Referring now to FIG. 11A, a graphical user interface pop-up configured to receive user input corresponding to an initial step in the generation of a snippet is shown in accordance with embodiments of the disclosure. As noted above, some embodiments of the policy engine platform 102 provide one or more GUI displays configured to receive user input corresponding to the generation of a snippet. FIG. 11A provides such a GUI display in the form of a pop-up 1106 that is shown to be overlaid on a policy snippet display page 1105 that is rendered on a physical display screen of a network device within the web browser 1100. The rendered display may also include a side panel having a plurality of selectable options including a "Snippets" option 1104, that is indicated as being selected.

The pop-up 1106 corresponds to a set of UI components configured to receive user input resulting in at least partial generation of a snippet. The UI component 1108 may be a text field and be configured to receive user input corresponding to a display name for the snippet being generated, the UI component 1110 may be a drop-down menu corresponding to selectable snippet types, as discussed above, and the UI component 1112 may be a text field and be configured to receive user input corresponding to a text description of the snippet being generated. Further user input to the "Create Snippet" button (which may include alternative text) may result in an initial step in generating the snippet including retrieval of programming code corresponding to the selected snippet type of principal, action, asset, or condition. Such user input may also result in generation and rendering of the snippet display 1114 shown in FIG. 11B.

Referring to FIG. 11B, a graphical user interface generated in response to receipt of user input to the pop-up of FIG. 11A and is configured to receive additional user input corresponding to completing the generation of a snippet is shown in accordance with embodiments of the disclosure. The user input to the "Create Snippet" button discussed may also result in generation and rendering of the snippet display 1114 which is also shown in the web browser of FIG. 11A. The header 1116 may be customizable based on the user input provided to the pop-up 1106, e.g., a display name of "All Engineering Users" and a principal snippet type.

The user may then provide further input to an editable component 1118, which may provide provide a snippetId for the newly created snippet and programming code in an editable format enabling the user to easily add values for any predetermined aspects of the snippet type, e.g., nodes 1122 including example predetermined parameter fields of node-Name, entityId, queryFieldName, relationships 1124 including example predetermined parameter fields of relationship-Name, fromNodeName, toNodeName, transitive, undirected, and condition 1126 including example predetermined parameter fields of nodeName and attributeId of a "left hand side" (LHS), e.g., of a logical expression, an operation of the logical expression, and predetermined parameter fields of string of a "right hand side" (RHS) of the logical expression.

Figure 11C:
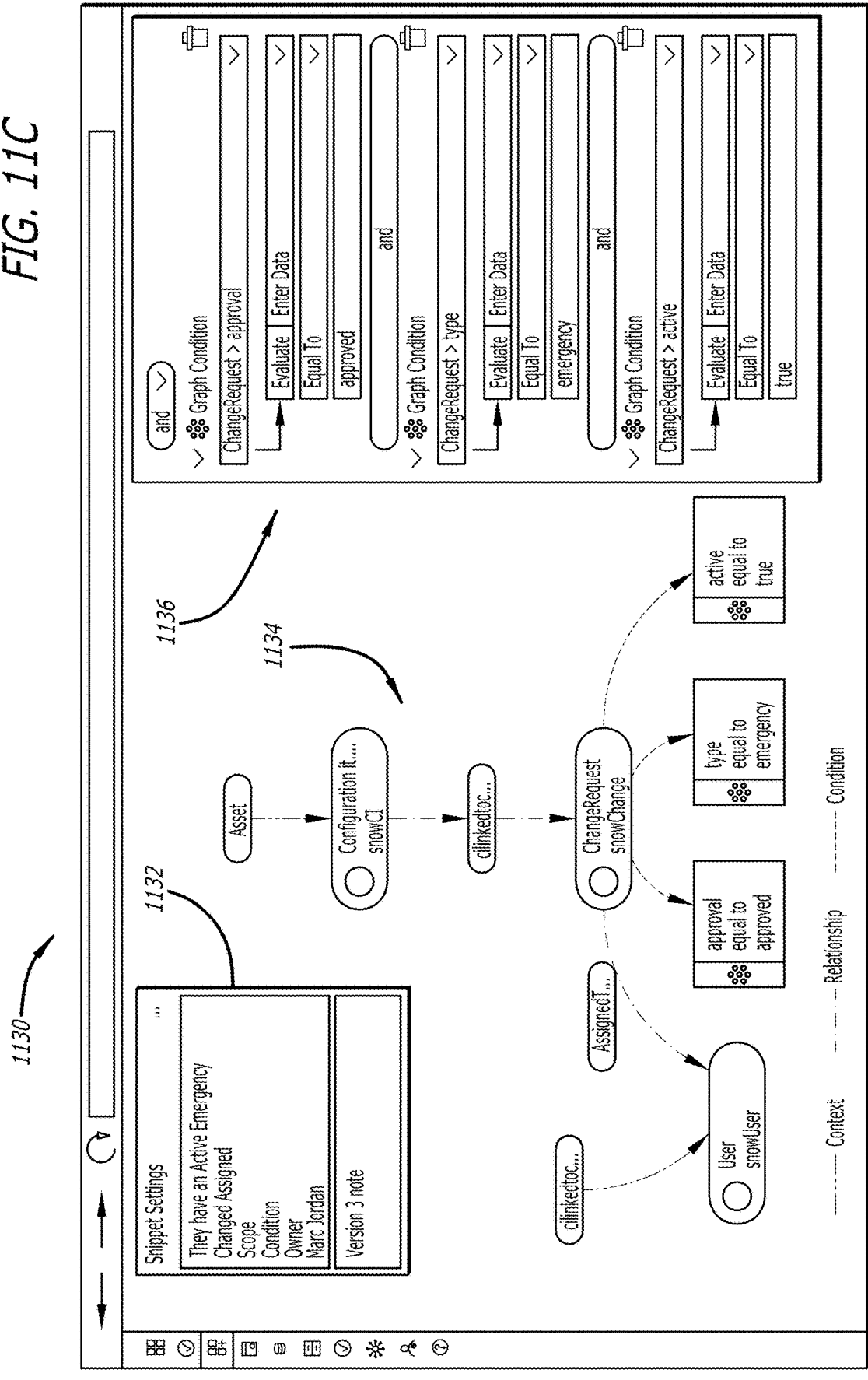
FIG. 11C illustrates a graphical user interface that serves as an alternative methodology for receiving additional user input corresponding to completing the generation of a snippet in accordance with embodiments of the disclosure.

Referring to FIG. 11C, a graphical user interface that serves as an alternative methodology for receiving additional user input corresponding to completing the generation of a snippet is shown in accordance with embodiments of the disclosure. The graphical user interface (GUI) 1130 should be understood as being generated for and rendered on a display screen of a network device. In some instances, the GUI 1130 is displayed within a web browser as shown in numerous figures and described herein. The GUI 1130 provides an alternative methodology for creating a snippet compared to that of FIG. 11B. For example, FIG. 11B provides an "advanced" text-based approach in which a user may directly alter the programming code provided. In contrast, the GUI 1130 provides a graphical approach to building a snippet 1132 by enabling a user to provide user input through the selection panel 1136, which results in a graphical form (e.g., a tree) illustrating the snippet 1132.

FIGS. 11A-11C discussed above provide one illustrative example of a graphical user interface for creating snippets. As further detail on a snippet, snippets are data objects that are configured to be created and partially updated after creation. As further noted above, a snippet may be defined as a data store comprising a set of parameter blocks, with each parameter block including or more parameter fields, where the data store is stored at a specific location in non-transitory, computer-readable medium.

Common parameter fields utilized in snippet generation include snippetID, description, and common parameter blocks utilized in snippet generation include nodes, relationships, condition, and version. Referring to FIG. 12A, a table 1200 providing a property name, a property type, and a description for a plurality of parameter fields. In further detail, the parameter block "nodes" describes the types of entities that will be described in a snippet by directly referencing entities that are synchronized within the nodal graph. Defining nodes is advantageous when a snippet refers to one or more specific entities as part of the snippet evaluation (which is part of a larger query or policy evaluation). For instance, if a snippet is to evaluate whether an Okta User is from the Engineering Department of an enterprise or organization, a node is be created to specify the Okta User node, which then uses the parameter field "attributeId" from the Okta User node previously defined to specify a condition that evaluates whether the user's profile_department attribute is EqualTo Engineering. It should be understood that nodes are optional, and do not need to be defined when a snippet evaluates whether a principal from any protected system has privileged access to secure assets. For example, it may be desirable to use nodes to reference user entities and group entities in a snippet being created from an Okta Tenant. FIG. 12B provides an example node snippet 1230 and an example node 1235 reciting a property name, a property type, and a description for a plurality of parameter fields utilized in the node snippet 1210.

Relationships reference previously defined nodes expressed in the 'nodes' expression of a snippet in order to define which edges in the graph (the relationships) to traverse in order to evaluate the snippet. Relationships are to be defined at least when the snippet is configured to make evaluation decisions based on relationships between nodes. For instance, if a snippet evaluates whether an Okta User is a Manager of another Okta User, the parameter block relationship is used to assess whether the principal requesting access has that relationship. However, relationships do not need to be defined for a snippet that does not draw upon one of the well-defined relationships within the nodal graph. FIG. 12C provides an example (abstracted without organization/enterprise or individual) relationship snippet 1220 and a table 1225 reciting a property name, a property type, and a description for a plurality of parameter fields utilized in the relationship snippet 1220.

Conditions constrain the search criteria of the nodes that should be evaluated as part of the snippet evaluation and of the evaluation of a policy comprising the snippet. Conditions may be extremely flexible. As an initial basic example, a user providing input to generate a snippet may want to ensure that a principal snippet should only be evaluated for users in a certain group, the user would specify node and relationship parameter blocks, and in the conditions, specify a constraint that the group is to have a specific identifier to be matched. FIG. 12D provides an example condition snippet 2130 and a table 1235 reciting a property name, a property type, and a description for a plurality of parameter fields utilized in the condition snippet 1230. FIG. 12E provides a second example condition snippet 1230 having multiple conditions, e.g., multiple logical expressions to evaluate as part of the snippet evaluation process.

Referring to FIGS. 12F-12I, example snippets are shown in accordance with embodiments of the disclosure. FIG. 12F illustrates an example principal snippet 1250 that is configured to evaluate whether a principal is a direct member of a specified Azure AD Group. The principal snippet 1250 includes a node parameter block 1252 comprised of a set of parameter fields, e.g., nodeName, entityID, and queryFieldName. The principal snippet 1250 also includes a relationships parameter block 1254 comprised of a set of parameter fields, e.g., relaionshipName, fromNodeName, toNodeName, and transitive. The principal snippet 1250 further includes a condition parameter block 1256 comprised of a set of parameter fields, e.g., lhs comprised of the parameter fields attritubeID and nodeName, op (operand) (e.g., "EqualTo"), and rhs (e.g., "EqualTo" an example alphanumeric string). The principal snippet 1250 further includes parameter fields of description, snippetId, and version (collectively, 1258).

FIG. 12G illustrates an example asset snippet 1260 that is configured to determine whether the asset attempting to be accessed is a Customer Salesforce Account. The asset snippet 1260 is shown to include a nodes parameter block 1262, a condition parameter block 1264, and a set of parameter fields, collectively, 1266. FIG. 12H illustrates an example condition snippet 1270 that is configured to determine whether the calling principal is the assignee on an active case that belongs to the customer for which access is requested. The condition snippet 1270 is comprised of a condition parameter block 1272 and a set of parameter fields, collectively, 1274. FIG. 12I illustrates an example action snippet 1280 that is configured to evaluate whether a principal can perform a login action. The action snippet 1280 is comprised of a nodes parameter block 1282, a relationships parameter block 1284, a condition parameter block 1286, and a set of parameter fields, collectively, 1288. As should be understood, the programming code provide in any of FIGS. 12A-12I are merely illustrative of the novel concepts disclosed through the specification and are not intended to limit the scope of the disclosure.

Referring now to FIG. 13, a graphical user interface configured to receive user input corresponding to generating a policy from a plurality of snippets is shown in accordance with embodiments of the disclosure. FIG. 13 provides another example GUI displayed in a web browser 1300 and configured to be rendered on a physical display screen of a network device. The GUI 1302 corresponds to a policy generation display component that includes a plurality of UI components each configured to reach user input that, in totality, define a policy, which may be stored in non-transitory, computer-readable medium, assigned to one or more protected systems 114 (see FIG. 1), and subsequently retrieved for query generation when an access request is received from one of the one or more protected systems 114 to which the policy is assigned. The GUI 1302 illustrates that the policy engine platform 102 is configured to receive user input such as a policy name in the UI component 1304 and user input corresponding to selection of a policy type (e.g., allow or deny) via the UI component 1306. Additionally, the GUI 1302 may be configured to receive indicators representative of a pre-generated snippet (see above) that may be dragged-and-dropped from a snippet selection panel 1316. As shown, the abstracted policy structure forms the basis of the GUI 1302 including slots to receive snippets corresponding to principals, actions, assets, and conditions. The snippet selection panel 1316 may be to receive user input selecting a snippet type through selectable tabs 1318A (principal), 1318B (action), 1318C (asset), and condition (1318D), such that indicators of pre-generated snippets for the selected snippet type appear in the snippet selection panel 1316, e.g., in list form.

As shown, the tab 1318A (principal) is selected and a set of pre-generated snippets having the type of principal are displayed in the listing 1320. In the example illustration of FIG. 13, the indicator for the pre-generated principal-type snippet "Customer Support Users in a Specific Region" has been dragged-and-dropped into the opening under the "Principals" heading (indicator 1308). Similarly, FIG. 13 illustrates indicators 1310, 1312, and 1314 have been dragged-and-dropped under the remaining headers including "To perform actions", "On assets," and "One the conditions (Optional)", respectively.

It should be noted that the policy platform engine 102 may receive data in other forms or methodologies as opposed to entered or selected options via UI components of a GUI. For example, the policy platform engine 102 may obtain stored data, such as a spreadsheet, a comma-separate value (CSV) file, or other data base or data store format from which the snippets and/or policies discussed herein may be formed.

Referring to FIG. 14, a graphical user interface configured to receive user input corresponding to assigning one or more policies to a protected system is shown in accordance with embodiments of the disclosure. FIG. 14 provides an example GUI displayed in a web browser 1400 that is configured to be rendered on a physical display screen of a network device. The GUI 1402 corresponds to a policy assignment display component that includes a listing of generated policies, which may each be stored in non-transitory, computer-readable medium and assigned to one or more protected systems 114 (see FIG. 1). The GUI 1402 may be configured to receive user input selecting one or more policies from the listing, e.g., the selected policy 1404, and assignment to a selected protected system 114, e.g., which may have been selected prior to generation of the GUI 1302, or alternatively, may be generated subsequent to selection of the policy 1404, e.g., upon selection of the "Next" UI component.

The listing may include various details about each policy such as any labels selected for each policy (e.g., indicating to which department within an enterprise organization the policy pertains, the department within an enterprise organization that created the policy, etc.). The details may further include an indication of a current version of the policy (e.g., each version may indicate various edits to the policy) with the option to select different versions, a listing of the type of policy (allow/deny), a date/time (or indication thereof) as to when each policy was created, etc.

Referring to FIG. 15, a flowchart illustrating operations of a method of generating and evaluating a policy is shown in accordance with embodiments of the disclosure. Each block illustrated in FIG. 15 represents an operation in the process 1500 performed by, for example, the policy engine platform 102 of FIG. 1. It should be understood that not every operation illustrated in FIG. 15 is required. In fact, certain operations may be optional to complete aspects of the process 1500. The discussion of the operations of process 1500 may be done so with reference to any of the previously described figures.

The process 1500 begins with an operation of generating a set of data stores, where each data store represents a snippet of a particular type (principal, asset, action, condition) that is comprised of a set of parameter fields that may be divided into parameter blocks as discussed above (block 1502). Each data store is then stored at a particular, identifiable location in non-transitory, computer-readable medium. The generation of a particular data store (snippet) may include generation of programming code that is comprised of a plurality of parameter fields that are to be populated with content for an access request received from a protected system as will be discussed below. Thus, each data store represents a data structure comprised of parameter fields that are populated at the time of evaluation based on a specific access request providing the technological advantage of the data stores being reusable across multiple access requests from varying protected systems, which reduces the computing resources needed in the contrasting situation (e.g., the current technological environment) that includes creating predetermined rules for access management that are not dynamically populated at the time of evaluation.

Following the generation of the set of data stores, a policy is generated through the assembly of the set of data stores according to a corresponding configuration of the data store, e.g., a type of the data store (block 1504). As discussed above with respect to at least FIGS. 10A-10B, a policy may be assembled according to a particular structure that is based on the snippet type, e.g., the abstracted policy structure of FIG. 10A with an illustrative example shown in FIG. 10B. The policy is then assigned to one or more protected systems including at least a first protected system (block 1506). The assignment of the policy to the first protected system results in the evaluation of the policy when an access request is received from the first protected system. Thus, responsive to receiving such an access request from the first protected system, policy is retrieved from the non-transitory, computer-readable medium, the parameter fields of the snippets comprising the policy are populated with parameters from the access request (as applicable) resulting in generation of a query, and the query is executed against a nodal graph (a graph directory) resulting in generation of a response to the access request (block 1508). Details as to the generation of the query and execution against the nodal graph to generate a response to the access request are discussed below.

Referring to FIG. 16, a flowchart illustrating operations of a method of generating a policy through assembly of a plurality of snippets is shown in accordance with embodiments of the disclosure. Each block illustrated in FIG. 16 represents an operation in the process 1600 performed by, for example, the policy engine platform 102 of FIG. 1. It should be understood that not every operation illustrated in FIG. 16 is required. In fact, certain operations may be optional to complete aspects of the process 1600. The discussion of the operations of process 1600 may be done so with reference to any of the previously described figures.

The process 1600 begins with an operation of generating a first principal data store comprising a first set of parameter fields stored at a first location within non-transitory, computer-readable medium (block 1602). As noted above, a first principal data store may refer to a first principal snippet, such as one having a structure similar to the illustrative example of FIG. 12F. Additional operations may include generation of a first asset data store comprising a second set of parameter fields stored at a second location within non-transitory, computer-readable medium and a first action data store comprising a third set of parameter fields stored at a third location within non-transitory, computer-readable medium (blocks 1604, 1606). Further, a first condition data store comprising a fourth set of parameter fields stored at a fourth location within non-transitory, computer-readable medium may also be generated (block 1608). The process 1600 of generating a policy through assembly of a plurality of snippets (e.g., data stores) includes generating a first policy by assembling the first principal data store, first asset data store, first action data store, and optionally, the first condition data store in the form of: [first principal data store] allow/deny [first action data store] [first asset data store] if [first condition data store] (block 1610). The first policy may then be stored in the graph directory 104, e.g., on non-transitory, computer-readable medium, where the first policy is assigned to a first protected system and subsequently retrieved by the policy engine platform 102 upon receipt of an access request from the first protected system for evaluation in order to generate a response to the access request, as discussed below. In some embodiments, the first policy is stored in the graph directory 104, which is generally stored using an adjacency list model. In some instances, the nodal graph of the graph directory 104 may be comprised of a plurality of storage components such as a node store for storing all nodes and node properties, a relationship for storing all relationships with pointers to connected nodes, a property store for storing key-value data for both nodes and relationships, and a label store for managing indexing for node categories.

IV. Policy Evaluation

As discussed above, the policy engine platform 102 of FIG. 1 is configured to repeatedly ingest data from a plurality of data sources, build a graph database using a graph structure, which represents relationships between the data ingested from various systems, and generate snippets and policies that form the basis for evaluations against the graph structure. Additionally, the policy engine platform 102 is configured to receive access requests from protected systems, retrieve policies assigned to the protected system, populate the policies with content from the access request thereby creating a query, and execute the query against the graph structure (e.g., evaluate a policy). Based on the results of the execution of one or more policies assigned to the protected system, the policy engine platform 102 provides a response to the protected system to either allow or deny an action by a principal on an asset as indicated in the access request.

In more technical detail, an access request is received by the policy engine platform 102, and specifically, the policy engine 106, where the access request includes a token identifying the protected system from which the access request originated, a principal identifier, an asset identifier, and context data such as a device identifier, IP address, and a timestamp. The principal identifier is utilized as an anchor node in the nodal graph of the graph directory 104 to locate all nodes within the nodal graph that have a "same as" relationship, e.g., a relationship between two nodes indicating equivalence between the nodes, which is typically utilized between two nodes from different platforms (data sources) such as Okta and AWS, or AWS and JIRA. The policies assigned to the protected system from which the access request originated are identified. Taking a first policy, a query is constructed by populating parameter fields of the policy with values from the access request. The query is then executed against the nodal graph by transversing the nodal graph beginning at an anchor node, typically a node corresponding to the principal identifier within the access request. Execution results indicate whether the query found a matching pattern within the nodal graph, where the pattern refers to a sequence of nodes and relationships indicating the user corresponding to the principal identifier within the access request exists and access conditions may be verified for the user as set forth by the policy.

For example, a policy may require that a user (employee of Salesforce) can only access a JIRA ticket when the user is authenticated through AWS, is within the customer service group in an enterprise, and the JIRA ticket is active. In such an example, the policy engine 106 receives an access request indicating that User_A wants to access JIRA ticket_123. To evaluate the access request, the policy engine 106 first searches a nodal graph for the User_A as being an employee of Salesforce. If a node pertaining to User_A is found, the nodal graph is traversed along "same as" relationships, e.g., from Salesforce user nodes to AWS user nodes. Upon identifying an AWS user node connected to the Salesforce anchor node via a "same as" relationship, the parameters of the AWS user node is searched for an "authentication" parameter or flag. Upon determining that the Salesforce user node is the same as an AWS user node that has been authenticated, the nodal graph is further traversed to determine whether an "assigned to" relationship connects the any of the user nodes (Salesforce or AWS) corresponding to User_A to the JIRA ticket_123. Finally, assuming the JIRA ticket_123 is found to be connected to the Salesforce user node corresponding to User_A, a match is found when the JIRA ticket_123 has a parameter of "active." When any of the components discussed in the example above are not found, a result of "no match" is returned. Based on the whether the first policy returned a match, and whether other policies assigned to the protected system from which the access request originated returned matches, no matches, or not applicable, the policy engine 106 determines a response to the access request.

As an example, a user may attempt to login to Salesforce (a protected system) and the request may be intercepted by the policy engine platform 102, or the policy engine platform 102 may receive an access request from Salesforce triggered by the login attempt, where both scenarios are encompassed in the terminology used herein of "receiving an access request." As a result, the policy engine platform 102 initiates a real-time evaluation of the user's ability to login to Salesforce. In order to determine whether the user should be permitted to login to Salesforce, the policy engine platform 102 may retrieve a policy assigned to Salesforce that confirms compliance with numerous predefined requirements that require querying of ingested data that has been formed into a graph structure, where the querying results in evaluation of any of: (i) a user identify and role within an enterprise organization, (ii) compliance of the network device from which the login request originated, (iii) one or more risk scores, (iv) geolocation such as whether the login request came from a corporate VPN, a public Wi-Fi, etc. Such a policy may be "Grant access to Salesforce IF the user is an active employee AND using a managed device. Otherwise, deny access." The generation of such a policy from a plurality of snippets is discussed above.

As the example above illustrates, the policy engine platform 102 does not grant "always-on" access. In contrast, attempted actions by a principal at a protected system or on a resource may trigger an access request, which is evaluated at the time of the attempted action and based on configurations, parameters, or the state of the principal, asset, network device, etc., at the time of evaluation. Thus, while parameters, configurations, or states may result in an access being granted as one particular point in time, following a change to even a single parameter, configuration, or state may result in a denial of the same action at a second point in time when an attempted action occurs.

As a result, the policy engine platform 102 and the methods deployed thereby enable enforcement of access management policies across multiple platforms in response to an attempted action or operation. Examples of platforms across which a policy may be enforced include cloud applications (e.g., Salesforce, ServiceNow, AWS, GCP, Azure), on-premise resources (e.g., VPNs, legacy apps), APIs, microservices, etc., which ensures a consistent security posture across an entire information technology (IT) ecosystem.

Figure 17:
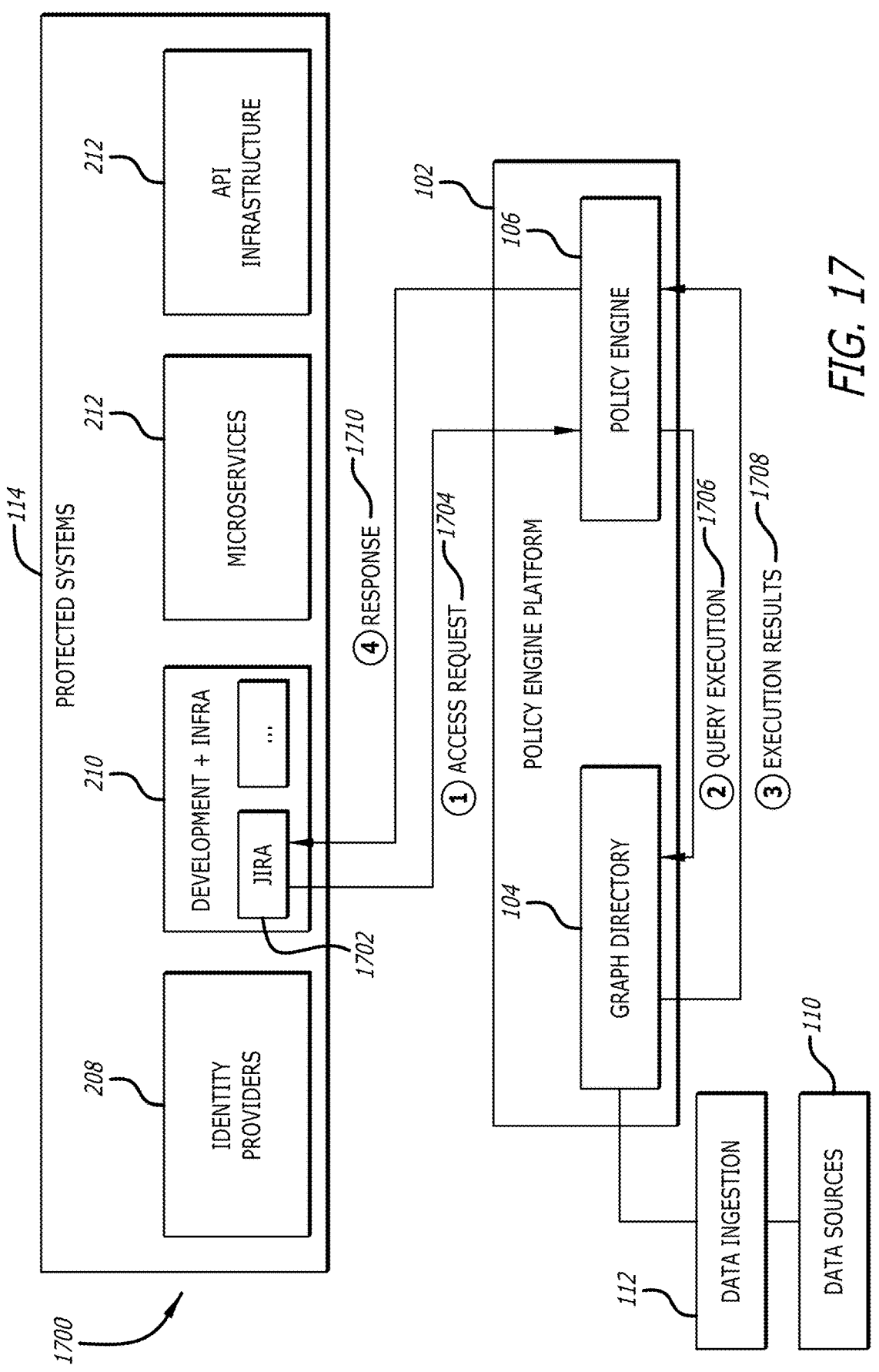
FIG. 17 is a conceptual diagram illustrating the flow of an access request from a protected system to the policy engine platform of FIG. 1 and of a response back to the protected system in accordance with embodiments of the disclosure.

Referring now to FIG. 17, a conceptual diagram illustrating the flow of an access request from a protected system to the policy engine platform of FIG. 1 and of a response back to the protected system is shown in accordance with embodiments of the disclosure. FIG. 17 provides a conceptual diagram similar to that illustrated in FIG. 2 with numerous components illustrated in an abstracted manner for purposes of clarity. Those components illustrated in FIG. 17 are that illustrated in and/or discussed with respect to FIG. 2 will be not discussed herein unless to expand on or clarify functionality that may be specific to the embodiment illustrated in FIG. 17. Specifically, FIG. 17 illustrates a sequence of network transmissions and logical operations (collectively, "operations") between or performed by a protected system 114, e.g., the protected system 1702, and the policy engine platform 102, e.g., the policy engine 106 and the graph directory 104, while providing access management control.

The sequence of operations 1700 begin with an operation of the transmission of an access request from a first protected system, JIRA 1702, to the policy engine platform 102, where the access request 1704 is received by the policy engine 106 (operation 1). A subsequent operation is the execution of a query 1706 against the nodal graph of the graph directory 104 (operation 2). The policy engine 106 performs several operations between receipt of the access request 1704 and execution of the query 1706, which are described below and illustrated at least in FIGS. 18-23. However as a brief introduction to those operations, upon receipt of the access request 1704, a translation process is performed to locate a principal node (an anchor node) in the nodal graph that corresponds to a principal_Id within the access request 1704 and identifies principal nodes connected to the anchor node through a "same as" relationship and extract parameters and context from the access request 1704 and policies assigned to JIRA 1702, generate a query to be executed against the nodal graph based on the extracted parameters and context, execute the query against the nodal graph to obtain query results, and determine a response to the access request 1704 from the query results.

As noted above, the execution of the query 1706 against the nodal graph returns a set of executions results 1708 to the policy engine 106 (operation 2). The generation of the query 1706 will be discussed in further detail. To note, the generation of the query 1706 may include extracting content from the access request 1704 and populating corresponding parameter fields of a policy assigned to JIRA 1702, where the result of populating the policy with the content from the access request 1704 is the query 1706. As discussed throughout the disclosure, a query may be comprised of one or more policies based on the number of policies assigned to the protected system from which the access request was received. Following receipt of the execution results 1708, the policy engine 106 determines whether the response 1710 is to indicate that an attempted action by a principal on an asset be allowed or denied. The response 1710 is then transmitted by the JIRA 1702 (operation 4).

Figure 18:
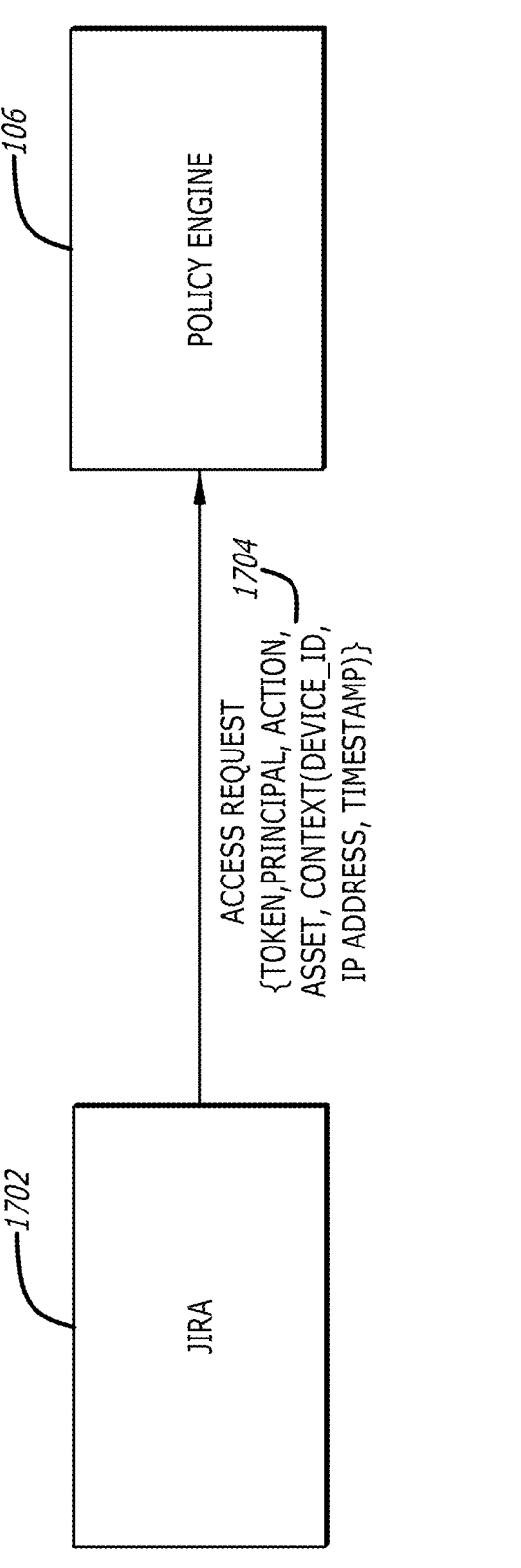
FIG. 18 is a conceptual diagram illustrating detail as to the access request of FIG. 17 in accordance with embodiments of the disclosure.

Referring to FIG. 18, a conceptual diagram illustrating detail as to the access request of FIG. 17 is shown in accordance with embodiments of the disclosure. FIG. 18 continues the example illustrated in and discussed with respect to FIG. 17 by providing one illustrative example of content that may be included in the access request 1704. As shown, JIRA 1702 may generate and transmit the access request 1704 to the policy engine 106, where the access request 1704 includes indicators of a principal, an action, an asset, and a timestamp. As the source of the access request 1704 is determinable by the policy engine 106, the access request 1704 may further include an identifier of the protected system from which the access request 1704 originated, e.g., JIRA 1702. As discussed above, the principal corresponds to a user, a service, a robotic system, etc., and identifies who (or what) is seeking attempting to take or cause performance of an action, such as logging into a platform (protected system). Other example actions include accessing, editing, deleting, or copying, a document or file. The asset identifies the on what the action will be performed in the event the response to the access request is "allow," with examples of assets being a customer account, a document, a piece of infrastructure, etc.

Figure 19:
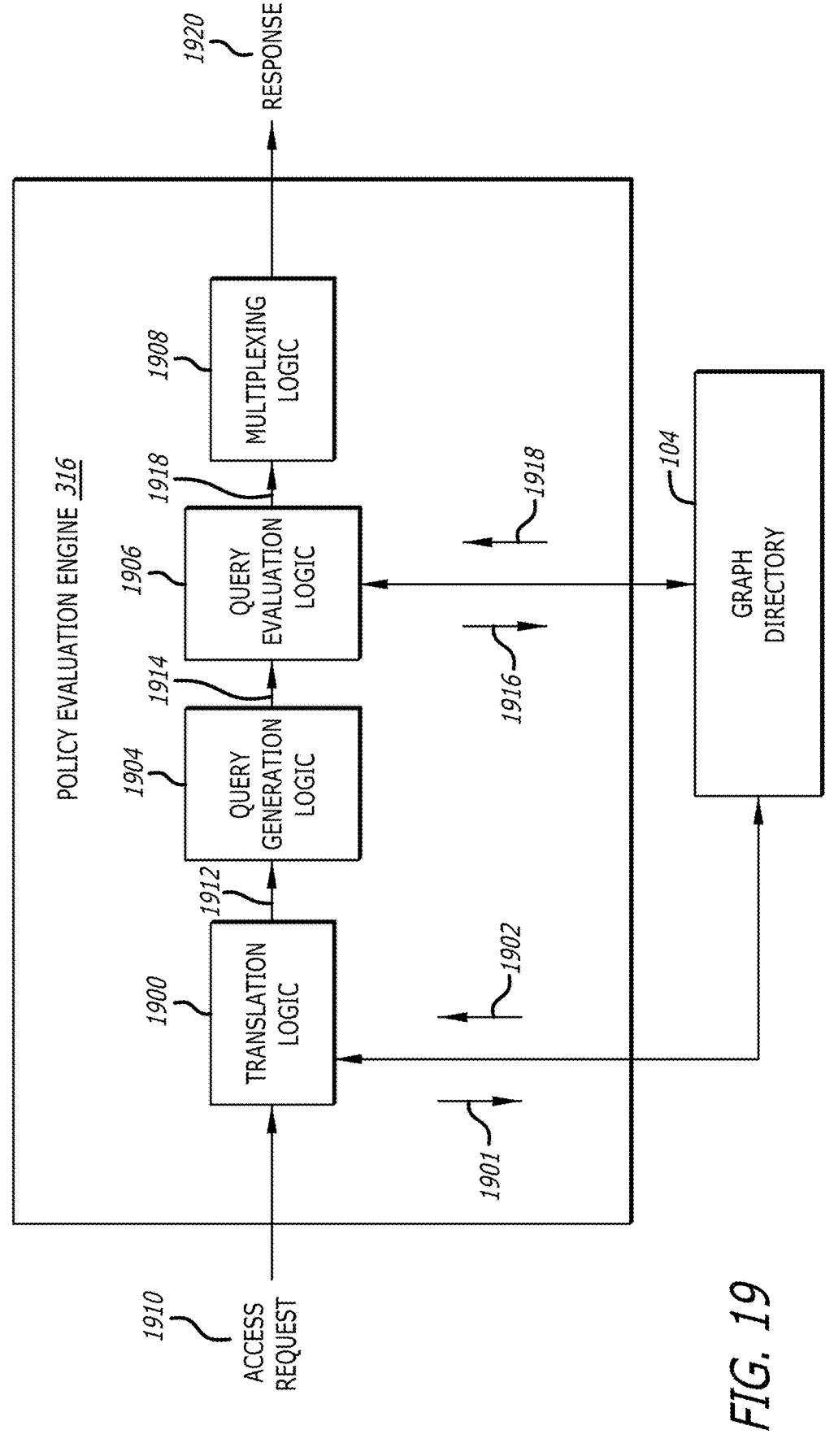
FIG. 19 is a logical representation of logic components comprising the policy evaluation engine of the policy engine platform as shown in FIG. 3 in accordance with embodiments of the disclosure.

Referring now to FIG. 19, a logical representation of logic components comprising the policy evaluation engine of the policy engine platform as shown in FIG. 3 is shown in accordance with embodiments of the disclosure. The logical representation of the policy evaluation engine 316 illustrates logical components that perform operations performed as a result of receiving the access request 1910 through determination of the response 1920. As shown, logical components comprising the policy evaluation engine 316 include a translation logic 1900, a query generation logic 1904, a query evaluation logic 1906, and a multiplexing logic 1908.

As noted above, an access request, such as the access request 1910, may be transmitted by a first protected system 114 and include content such as an authentication token unique to the particular protected system 114, indicators of a principal, optionally an action, an asset, and additional context such as a device identifier (e.g., on which the user in operating), an IP address from which the access request originated or, if different, the IP address of the user's device, and a timestamp. As the policy engine platform 102 and the policy evaluation engine 316 are configured to service a plurality of protected systems 114 that each have their own formatting for identifying principals, actions, and assets, the policy evaluation engine 316 includes a translation logic 1900 that is configured to extract the indicator of the principal (principal_Id or principalId) and query the nodal graph for a principal node corresponding to the first protected system and having a value of the principal_Id, which may be referred to as an anchor node. The translation logic 1900 may then traverse the nodal graph from the anchor node across any "same as" relationships, where nodes connected to the anchor node with a "same as" relationship are understood to refer to the same principal, and where such nodes are typically associated with other platforms (data sources). Thus, the translation logic 1900 serves to translate the principal_Id in the received access request by identifying the values representing the same principal across various platforms from which data is ingested into the nodal graph. The translation logic 1900 may transmit a query 1901 to the nodal graph to obtain query results 1902 that include the nodes that are connected to a specified, anchor node via a "same as" relationship.

For example, a protected system 114, such as JIRA, may transmit an access request that provides identifiers of a principal, an action, and an asset in a form that is specific to JIRA. An illustrative example of such may be that JIRA provides a principal_Id as an alphanumeric identifier, e.g., "AFH8344KJ" is indicative of a user named "Chris Williams." However, other data systems do not necessarily, and more likely than not, do not utilize the same indicator to refer to the same user named "Chris Williams." To be clear, a second data source may refer to the same user named Chris Williams through a first account email ("cwill@cp2.org") while a third data source may refer to the same user named Chris Williams through a username ("chris_williams"). Assuming principal nodes for Chris Williams have been generated in the nodal graph through ingested of data from the first, second, and third data sources, such nodes will be connected through a "same as" relationship, based on pre-configuration of the formatting of data received by each data source prior to ingestion as discussed above.

The values extracted from the access request 1910 (collectively, extracted content 1912) are passed to the query generation logic 1904 that is configured to build a query for evaluation through execution against the nodal graph. In some embodiments, the query generation logic 1904 utilizes a query framework where multiple policies are combined together within a single query. In greater detail, the query generation process begins in response to receipt of the access request 1910 with the extraction of content from the access request 1910, e.g., via the translation logic parsing the access request 1910 and querying the nodal graph. As noted above, the translation logic 1900 may provide an indication of all principal nodes having a "same as" relationship with the principal node indicated by the principal_Id in the access request 1910 (extracted content 1912). However, the translation logic 1900 may extract additional information from the access request 1910 and the nodal graph that is included in the extracted content 1912, where such additional information may include roles, identity relationships, contextual attributes, etc.

Upon receipt of the extracted content 1912, the query generation logic 1904 retrieves the policies assigned to the protected system from which the access request 1910 originated, where the policies are stored in the nodal graph, e.g., using an adjacency list model. In some embodiments, the query generation logic 1904 may filter out policies that are not applicable or relevant to the access request. Each of the retrieved policies (or those not filtered out) is then populated with values from the extracted content 1912 as applicable, e.g., the principal_Id and an asset identifier (asset_Id or assetId) from the access request 1910 replace variables in any of the policies that refer to the principal attempting to take an action, and an asset on which the action is to be taken, respectively.

The query generation logic 1904 then maps the conditions to elements (nodes, relationships, or parameters) within the nodal graph and dynamically generates a query 1916 utilizing nodal graph query language syntax such as "MATCH", "WHERE", etc. In some embodiments, the policies are combined into a single query. In other embodiments, each policy may be represented as its own query. In some embodiments, the query 1916 is executable programming code provided in a declarative query language configured for traversing graph databases, such as the nodal graph.

The policy evaluation engine 316, and specifically, the query evaluation logic 1906 executes the query 1916 against the nodal graph. In some instances, the query evaluation logic 1906 utilizes relationship caching to improve the technological process of traversing the nodal graph. For example, by storing certain paths between nodes, e.g., commonly traversed paths, the traversal process is improved at least by consuming fewer resources through a reduction in paths traversed (otherwise numerous paths may be traversed in an attempt to find a path from a first node to a second node).

In some embodiments, execution of the query 1916 against the nodal graph includes accessing the nodal graph via an API. Accessing the nodal graph of the graph directory 104 may optionally involve an authentication process between the policy evaluation engine 316 and the graph directory 104. Execution of the query 1916 includes implementation of a graph traversal algorithm to traverse the graph from anchor node through relationships defined in the query. The execution includes traversing the nodal graph to match patterns defined in the query, e.g., determining whether a user (a Salesforce user identified by an email address as the anchor node) is associated with an active JIRA ticket, may include searching for a "same as" relationship between user nodes of different systems, e.g., Salesforce and JIRA. Additionally, upon finding a "same as" relationship exists between user nodes of Salesforce and JIRA starting from an anchor node in the Salesforce system, the execution would then search of a JIRA ticket having a particular identifier (e.g., a ticket number) that has a relationship of "assigned to" or the like with the JIRA user node. Further, assuming such an "assigned to" relationship with a JIRA ticket is found, the execution would then determine whether a status parameter of the JIRA ticket was set to "active." If such a pattern is found, the matched policy may be returned to the query evaluation logic 1906 as part of query results 1918. In some examples, matched patterns are returned indicating that a match was found. In other examples, an indicator as to whether each pattern was found (or not applicable), or some combination thereof, may be returned as the query results 1918.

In some embodiments, the query results 1918 are then provided to a multiplexing logic 1908 that is configured to evaluate the query results 1918, particularly when the query 1916 was comprised of a plurality of policies and determine the response 1920. The multiplexing logic 1908 determines whether the response 1920 will consist of "ALLOW" or "DENY." In other examples, other terminology or indicators may be utilized to express whether the access request should be allowed or denied. The multiplexing logic 1908 is configured to handle evaluating the query results 1918 when the query 1916 is generated from a single policy and when the query 1916 is generated from a plurality of policies. As shown in FIG. 13, when a policy is created, the policy is designated as either an "allow" policy or a "deny" policy (see UI component 1306 of FIG. 13), which indicates how a match of the policy in the nodal graph of the graph directory 104 should be treated. For instance, when a policy is designated as an "allow" policy, when the policy is matched to a portion of the nodal graph, the multiplexing logic 1908 designates the policy evaluation result as "allow." However, when a policy designated as "allow" does not return a match, the multiplexing logic 1908 defaults to a configuration set by the protected system from which the access request originated, which may be either "allow" or "deny." When a policy that is designated as "deny" at the time of creation (or upon editing the policy) returns a match, the multiplexing logic 1908 designates the policy evaluation result as "deny," and when the a "deny" policy does not return a match, the multiplexing logic 1908 defaults to a configuration set by the protected system from which the access request originated, which may be either "allow" or "deny." Evaluation of a policy may be skipped (e.g., filtered out) or return an evaluation result of "not applicable," when the conditions required by the policy are not met, e.g., a policy grants access to an application during business hours (08:00:00-17:00:00) but an access request is received by the policy evaluation engine 316 at 18:05:10.

When the query 1916 consists of a single policy, an evaluation result of either allow or not applicable will result in a response 1920 of "allow." However, when the query 1916 consists of a single policy, an evaluation result of deny will result in a response 1920 of "deny." When the single policy returns a result of "not applicable," the policy evaluation engine 316 may query a configuration file that provides a default value for the response 1920 in such an instance.

When the query 1916 is comprised of multiple policies, the multiplexing logic 1908 determines the value of the response 1920 (either allow or deny) as follows. When the evaluation result of each of the policies is "allow" or a combination of "allow" and "not applicable" (i.e., at least one "allow" and all others "not applicable"), the multiplexing logic 1908 designates the value of the response 1920 as allow. When the evaluation result of any policy is "deny," the multiplexing logic 1908 designates the value of the response 1920 as deny. In the event that each policy returns a result of "not applicable," the policy evaluation engine 316 may query a configuration file that provides a default value for the response 1920 in such an instance.

Referring now to FIG. 20, a flowchart illustrating operations of a method of evaluating a policy in response to receipt of an access request from a protected system is shown in accordance with embodiments of the disclosure. Each block illustrated in FIG. 20 represents an operation in the process 2000 performed by, for example, the policy engine platform 102 of FIG. 1. It should be understood that not every operation illustrated in FIG. 20 is required. In fact, certain operations may be optional to complete aspects of the process 2000. The discussion of the operations of process 2000 may be done so with reference to any of the previously described figures.

The process 2000 begins with an operation of receiving an access request from a first protected system, where the access request corresponds to an attempt by a principal to perform an action on an asset (block 2002). Upon receipt of the access request, the policy engine platform 102 performs a translation process that includes querying a nodal graph to identify a principal node within the nodal graph that corresponds to a principal_Id within the access request (block 2004). The principal node (anchor node) may be identified based on the principal_Id and the protected system from which the access request originated. As discussed above, the translation process may also include identifying additional principal nodes connected to the anchor node via a "same as" relationship and further extract parameters and context from the access request and a set of policies assigned to the protected system from which the access request originated.

A query is then generated based on the policies assigned to the protected system from which the access request originated along with the parameters and context extracted from the access request and policies (block 2006). The query is executed against the nodal graph with the graph directory 104 with a multiplexing of evaluation results of one or more policies forming the query to determine a response to the access request (blocks 2008, 2010). The response, e.g., allow or deny, is then transmitted to the first protected system (block 2012).

Figure 21:
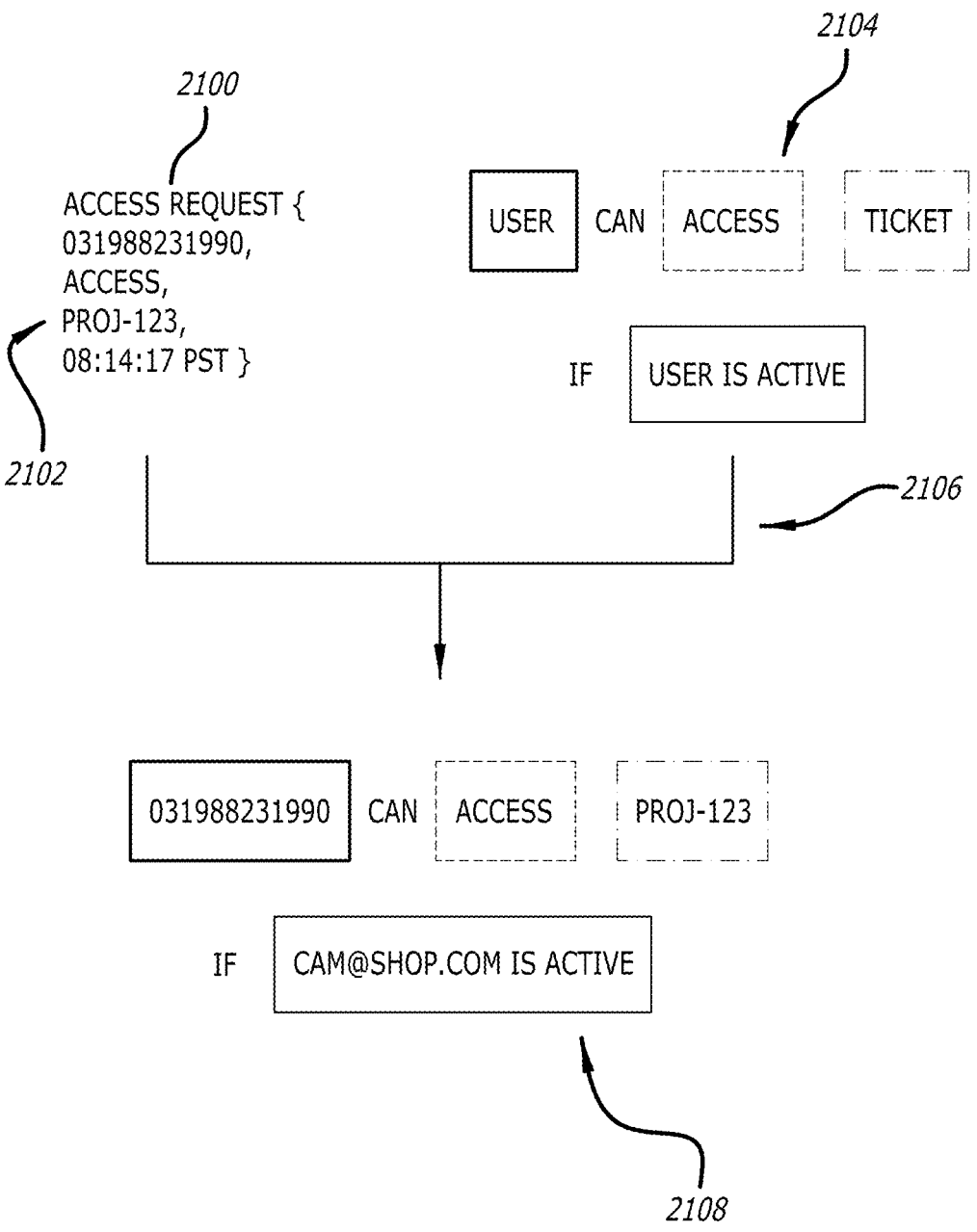
FIG. 21 provides an illustrative example of populating a policy with content from an access request in accordance with embodiments of the disclosure.

Referring now to FIG. 21, an illustrative example of populating a policy with content from an access request is shown in accordance with embodiments of the disclosure. FIG. 21 illustrates an example access request 2100 that includes parameters and context 2102. It is noted that the access request 2100 provides one example in which a device identifier and an IP address are not included (as discussed above). Additionally, FIG. 21 does not illustrate a token transmitted along with the access request 2100, e.g., that serves to authenticate the protected system from which the access request 2100 originated (originating protected system). However, it should be understood that such a token would be included in or accompany the access request 2100.

As described above, upon receipt of the access request 2100, the policy evaluation engine 316 performs a translation process, which may include extracting parameters from the access request 2100 including a principal identifier (principal_Id) of "031988231990", an action of "access", an asset of "PROJ-123", and a timestamp. It should be understood that the access request 2100 provides an illustrative example and the access 2100 may take alternative forms, for example, as a JSON-like format.

FIG. 21 also illustrates an example policy 2104 comprised of basic snippets, including a principal snippet ("user"), an action snippet ("access"), an asset snippet ("ticket") and a condition ("if user is active"), which represents "a user can access a ticket if the user is active." As such a policy may be utilized across different protected systems, which may each have different formats for representing the user identifier, the ticket identifier, and an indication if the user is active, the policy evaluation engine 316 translates parameters extracted from the access request 2100 and context or other data from a graph node of the graph directory 104 in order to populate the parameter fields of the policy 2104. The populated policy 2108 represents a conceptual illustration of the parameters extracted from the access request and nodal graph (e.g., "cam@shop.com" being identified as a principal identifier of a principal node having a "same as" relationship with the anchor node corresponding to the user identifier "031988231990") being populated into the policy 2104. As discussed above, a query is created by on the policy 2108 for execution against a nodal graph of the graph directory 104.

Figure 22:
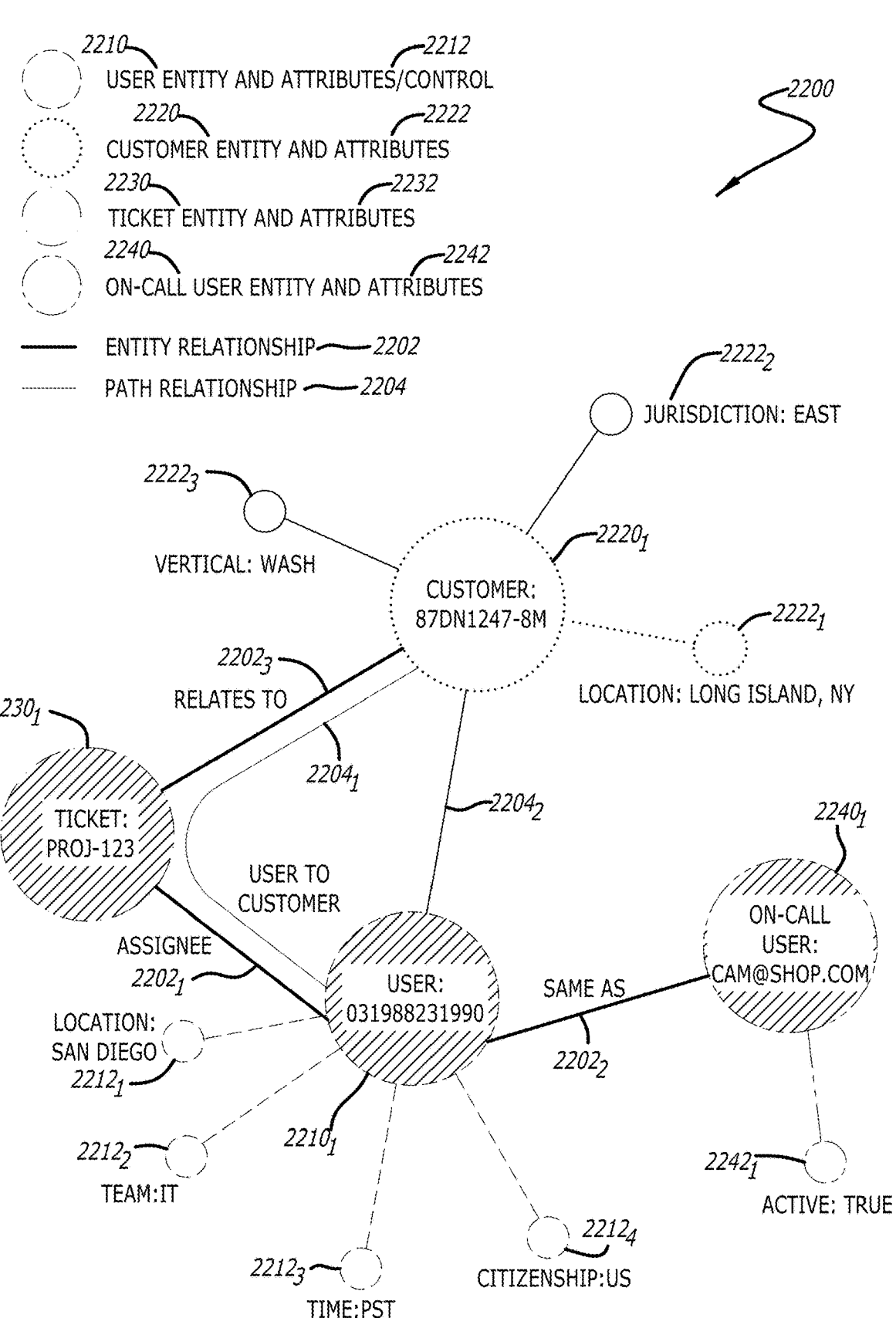
FIG. 22 provides an illustrative representation of the example policy of FIG. 21 matching a portion of an example graph representation of customer account information from various cloud applications and/or on-premises systems in accordance with embodiments of the disclosure.

Referring to FIG. 22, an illustrative representation of the example policy of FIG. 21 matching a portion of an example graph representation of customer account information from various cloud applications and/or on-premises systems is shown in accordance with embodiments of the disclosure. The example graph structure 2200 includes a plurality of entities and relationships therebetween. The illustrated example entities include a user $2210_1$, a customer $2220_1$, a ticket $2230_1$, and an on-call user $2240_1$.

Additionally, the graph structure 2200 provides a conceptual illustration of a policy "matching" with a portion of the graph structure 2200. In particular, continuing the example from FIG. 21 in which an access request was received including a principal identifier (principal_Id) of "031988231990," an action of "access," an asset of "PROJ-123," and a timestamp, eventually resulting in generation of query following a translation process discussed above. FIG. 22 illustrates that beginning at the anchor node of "user; 031988231990," execution of the query against the graph structure 2200 identifying an on-call user entity $2240_1$ of "on-call user: cam@shop.com" that has a parameter $2242_1$ of "active: true" and has a "same as" relationship $2202_2$ with the anchor node $2210_1$. Additionally, the anchor node of "user: 031988231990," is connected to node $2230_1$ being an asset node of "ticket: PROJ-123" with an "assignee" relationship with the anchor node $2210_1$. Thus, the illustration of FIG. 22 conceptually illustrates the policy 2108 matching against a portion of the graph structure 2200.

Further, and similar to the discussion of FIG. 6 and the graph structure 600, the user entity $2210_1$ includes attributes of location $2210_1$, team $2212_2$, time $2212_3$, and citizenship $2212_4$. Additionally, the user entity $2210_1$ has relationships to other entities including an "assignee" relationship $2202_1$ with a ticket entity $2230_1$, which indicates that a particular user may be assigned to a particular ticket, and a "same as" relationship $2202_2$ with the on-call user entity 2240, which indicates that a user node and an on-call user node may refer to the same individual. The customer entity $2220_1$ includes attributes of location $2222_1$, jurisdiction $2222_2$, and vertical $2222_3$. Additionally, the customer entity $2220_1$ has relationships to other entities including a "relates to" relationship $2202_3$ with the ticket entity $2230_1$. The ticket entity $2230_1$ is shown without having attributes as an example.

The graph structure 2200 also illustrates path relationships, which indicate how various nodes are related, either through a direct relationship between entities ("entity relationship") or through a series of entity relationships. For instance, a first path relationship $2204_1$ illustrates a path between a customer node and a user node based on each node's entity relationship with a particular ticket node. Additionally, a path relationship may bridge two or more relationships to create a direct relationship between two nodes such as the path relationship $2204_2$.

Additionally, an on-call user entity $2240_1$ includes an attribute of active $2242_1$. The use of subscripts in FIG. 22 are intended to note that there may be a plurality of nodes for an entity type, e.g., a fully formed graph may include a plurality of user nodes, a plurality of on-call user nodes, a plurality of tickets, etc. In such instances, a user node may have "assignee" relationships with a plurality of ticket nodes. It should be understood by one of skill in the art that not all customers have a relationship to all tickets, for example. The ingested data discussed above is stored in a graph directory and nodes/relationships are formed based on the values of the ingested data and in accordance with the configuration files pertaining to each data source. Thus, building a graph structure involves creating the proper nodes, relationships (entity and/or path) as rules of the configuration files dictate.

Figure 23:
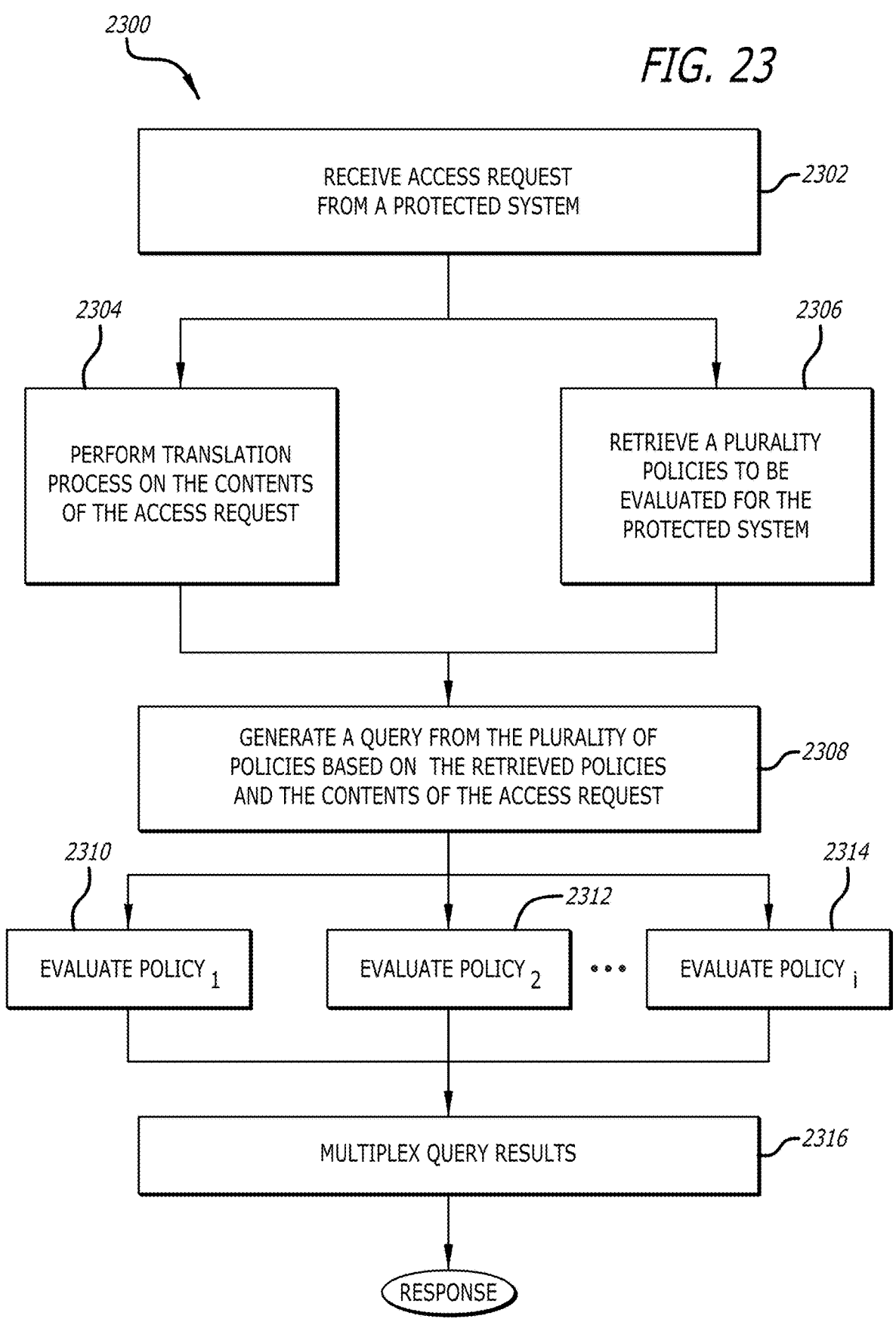
FIG. 23 is a flowchart illustrating operations of a method of evaluating a query comprising a plurality of policies in response to receipt of an access request from a protected system in accordance with embodiments of the disclosure.

Referring to FIG. 23, a flowchart illustrating operations of a method of evaluating a query comprising a plurality of policies in response to receipt of an access request from a protected system is shown in accordance with embodiments of the disclosure. Each block illustrated in FIG. 23 represents an operation in the process 2300 performed by, for example, the policy engine platform 102 of FIG. 1. It should be understood that not every operation illustrated in FIG. 23 is required. In fact, certain operations may be optional to complete aspects of the process 2300. The discussion of the operations of process 2300 may be done so with reference to any of the previously described figures.

The process 2300 begins with an operation of receiving an access request from a protected system (block 2302). As discussed above, the receipt of the access request may trigger performance of a translation process on the contents of the access request and retrieval of a plurality of polices to be evaluated for the protected system (blocks 2304, 2306). As noted above, the policies may be stored in a nodal graph. Based on extracted content of the access request and of the nodal graph, a query is generated that represents the plurality of retrieved policies and is configured to be executable against the nodal graph (block 2308). The query is executed against the nodal graph such that each of the plurality of policies is executed (unless one or more are skipped or filtered out) (blocks 2310, 2312, 2314). The execution results of each of the policies are multiplexed in order to determine a response value (allow or deny) (block 2316).

Figure 24:
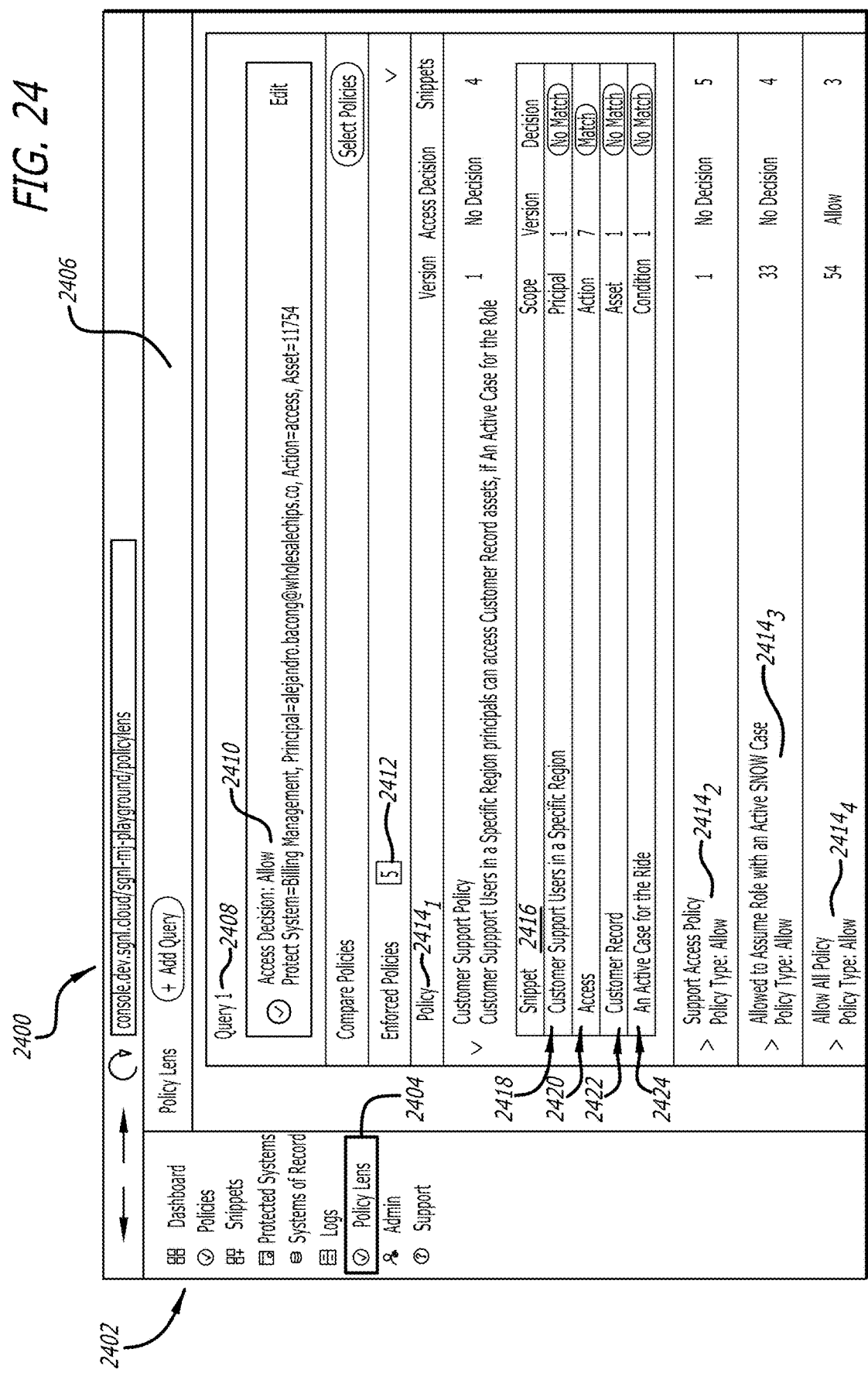
FIG. 24 is a graphical user interface providing a visual indication of results of an evaluation of a query comprised of a plurality of policies in accordance with embodiments of the disclosure.

Referring to FIG. 24, a graphical user interface providing a visual indication of results of an evaluation of a query comprised of a plurality of policies is shown in accordance with embodiments of the disclosure. The GUI 2400 provides an illustrative example of a display screen that may be rendered for an IT administrator enabling the IT administrator to view a graphical and textual representation of results of execution of a query, e.g., Query_1 2408.

The GUI 2400 is shown to be displayed in a web-browser and may be understood as being rendered on a physical display screen of a network device. The GUI 2400 provides a sidebar 2402 illustrating that a "Policy Lens" component 2402 is being displayed, which corresponds to the body 2406 of the GUI 2400. The Policy Lens provides the graphical and textual representation of results of execution of a query, e.g., Query_1 2408. For example, a decision 2410 is provided, e.g., "Access Decision: Allow" with additional information or context such as a protected system affected, a principal_Id, an action, an asset_Id, etc.

The body 2406 provides a policy count 2412, that displays a count of the number of polices in the Query_1 2408, including the policies $2414_1$, $2414_2$, $2414_3$, $2414_4$, and $2414_5$ (not shown). The GUI 2400 may be configured to receive user input to expand body 2406 to display details on the execution of the corresponding policy. For example, the GUI 2400 shows the details on the first policy $2414_1$ including an execution result of each snippet comprising the first policy $2414_1$ (snippets 2418, 2420, 2422, and 2424) in, for example, a table form as with the table 2416. Such details may include a snippet name, a scope, a version, and a decision.

V. Security and Access Management Through Policy Evaluation

In some embodiments, the policy engine platform discussed above may be integrated with a Continuous Access Evaluation Profile (CAEP) hub engine that is configured to process real-time events from various data sources and/or protected systems, which may include identity providers (e.g., Okta, Microsoft Entra ID, Ping), human resources (HR) and information technology (IT) systems (e.g., Workday, ServiceNow, SAP), security tools (e.g., CrowdStrike, Zscaler, SentinelOne), etc., as discussed above. The CAEP hub engine operations with an event-driven approach, which enables real-time monitoring of user sessions and permissions. As one illustrative example, when an employee's status in Workday changes to "Terminated," the CAEP hub engine detects such a change, following the next data ingestion from Workday, by detecting a change in a nodal graph. In response to detecting the change, the CAEP hub engine determines whether the change triggers analysis of a rule that is evaluated against the nodal graph of the graph directory through a query. Based a result of the query, the CAEP hub engine may determine one or more actions need to be taken, such as revoking the former employee's access across connected applications.

Technically, the CAEP hub engine deployment provides significant benefits over current or traditional management systems, which typically utilize static rules-based access control (RBAC). The policy engine platform 102 continuously evaluates policies at the moment of access (e.g., at the time an action is attempted at the protected system) and also throughout a user session. For example, when an attribute changes mid-session (e.g., antivirus protections are disabled on a device that is authenticated to a protected system), access can be revoked in real time without waiting for a manual review based on the attribute change acting as a triggering for the CAEP hub engine to evaluate one more rules with the trigger and protected system. As an example, a user may attempt to log into a cloud application from a secure laptop and the attempt may be permitted (i.e., access granted) based on the settings and configurations of the laptop meeting required conditions such as having antivirus protections enabled. However, mid-session, the laptop may become non-compliant (e.g., antivirus is disabled) and access may then be revoked in real-time, where the term "in real-time" used here may refer to a time immediately following ingestion of data resulting in a change to the nodal graph and evaluation of rules and one or more queries in response to the change to the nodal graph being a triggering event. Current access management systems fail to provide such event-based monitoring and instead grant static "always-on" access.

Additional technological advantages over the current access management systems include the continuous access evaluation compared to the standard periodic re-evaluation. As noted above and described in detail below, the CAEP hub engine continuously evaluates user access based on dynamic conditions (e.g., location, device security posture, risk signals) and may also continuously evaluation user behavior, resource usage, etc., by time analyzing a data ingestions (and/or access requests) over time in order to detect trends and establish normal usage or parameters (e.g., a baseline) and compare current usage and parameters thereto. As the CAEP hub engine evaluates access, behaviors, usage, etc. continuously (following each ingestion of a data set from a data source) resulting in real-time adjustments to user access or generation of alerts or implementation of automated actions to remediate or attempt to remediate the condition that triggered evaluation by the CAEP hub engine. In contrast, traditional systems typically rely on periodic token refreshes or session timeouts before performing an evaluation of access permissions, which leaves gaps where unauthorized access can persist.

The CAEP hub engine is configured to instantly revoke access when risk conditions change, ensuring security policies adapt in real-time. Legacy systems typically revoke sessions only after pre-set time intervals or require manual intervention, i.e., there is no dynamic or "instantaneous" revocation in the current art. The CAEP hub engine integrates with multiple identity and security signals (e.g., Identity Providers, EDR/XDR, UEBA) to make real-time access decisions. The CAEP hub engine 104 aligns with Zero Trust principles by continuously verifying user legitimacy throughout a session, where current technology assumes that users remain trusted after initial authentication, making them vulnerable to session hijacking. Additionally, the CAEP hub engine supports open identity standards like OIDC, OAuth, and CAEP, making it highly interoperable. However, traditional solutions may use proprietary enforcement mechanisms that limit integration flexibility.

Figure 25:
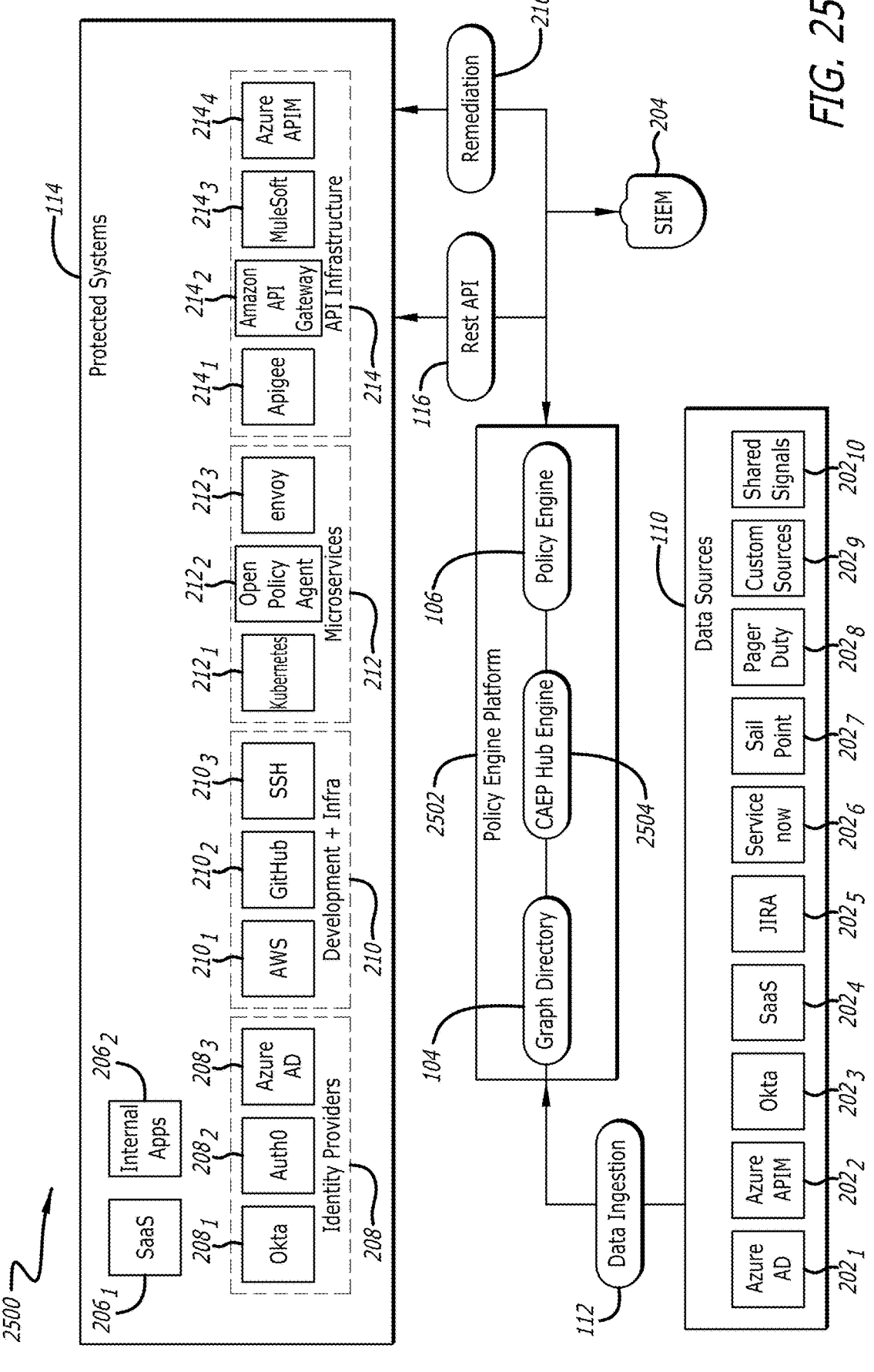
FIG. 25 is a detailed system diagram illustrating the networked exchange of data in a similar manner as shown in FIG. 2 and further including a CAEP Hub engine in accordance with embodiments of the disclosure.

Referring now to FIG. 25, a detailed system diagram illustrating the networked exchange of data in a similar manner as shown in FIG. 2 and further including a CAEP Hub engine is shown in accordance with embodiments of the disclosure. FIG. 25 illustrates the networked environment 2500 that includes many of the same components as illustrated in FIGS. 1-2 while also included a CAEP hub engine 2504 within the policy engine platform 2502. For example, the networked environment 2500 includes the data sources 110, the data ingestion pipeline 112, the protected systems 114, and the API pipeline 116, which are all discussed in detail above.

As shown, the CAEP hub engine 2504 may be communicatively coupled to the graph directory 104 and the policy engine 106, e.g., exchange data via APIs or other transmission media. In some instances, the CAEP hub engine 2504 monitors the graph directory 104 by performing one or more queries upon completion of an ingestion of a data set from one or more data sources 110 into a nodal graph of the graph directory 104 and taking automated action depending on the query results. More specifically, upon completion of an ingestion, the CAEP hub engine 2504 executes one or more queries against the nodal graph, where the one or more queries include one or more triggers, which each represents a condition check such as identifying all Okta authenticated devices that do not have an antivirus activated. Such a trigger, as executed as part of the one or more queries, would return a listing of any Okta authenticated devices that do not have an antivirus activated. Each entry in the listing is associated with a state node (or "view") that indicates certain information about the state of the component (where component broadly refers to a principal, an asset, or attribute).

Thus, following the execution of the one or more queries, the CAEP hub engine 2504 obtains a listing of state nodes and a corresponding triggering snippet that identified the condition responsible for the state node. The CAEP hub engine 2504 is configured to then assess whether each trigger in the listing is associated with a rule, which includes (i) a trigger, and (ii) a listing of automated actions to be taken in response to the trigger, where an automated action may include one or more variables that are dynamically populated by parameters of the state node. The rules are stored in the nodal graph and may be retrieved via a query when a trigger forms a part of a rule, i.e., the CAEP hub engine 2504 may be configured with triggers that are not currently utilized in a rule as users, admins, SOC analysts, etc., for an enterprise organization may determine the rules to be used. Thus, not every trigger needs to be included in a rule. The list of triggers comprising a part of a rule may change frequently as a user, admin, etc., add, edit, or remove rules that are to be evaluated for the enterprise organization. For each state node identified by a trigger within a rule, the rule is populated with parameters from the state node and the list of actions are initiated or otherwise performed.

As a further explanation of a rule, rules make use of triggers to then take action. Within a rule a user, an admin, etc., may determine whether any actions are to be initiated when the trigger matches, or no longer matches. As an example, a rule may be created and stored in the nodal graph that matches when a "User has a Defender Incident" in order to add a number of actions to revoke the user's session across a range of SaaS and Internal Applications. A second rule may be created that looks to see when the trigger no longer matches in order to send a notification to the SOC analyst and/or conduct a set of re-enablement actions. As detailed above, actions are the individual tasks that are conducted in the CAEP hub engine 2504 in order to perform updates, changes, notifications, and more in all of the protected systems connected to policy engine platform 102.

It should be understood that those components illustrated in FIG. 2 having the same reference numeral have the same functionality and operability as discussed above, unless noted otherwise in the discussion of FIG. 25.

Figure 26:
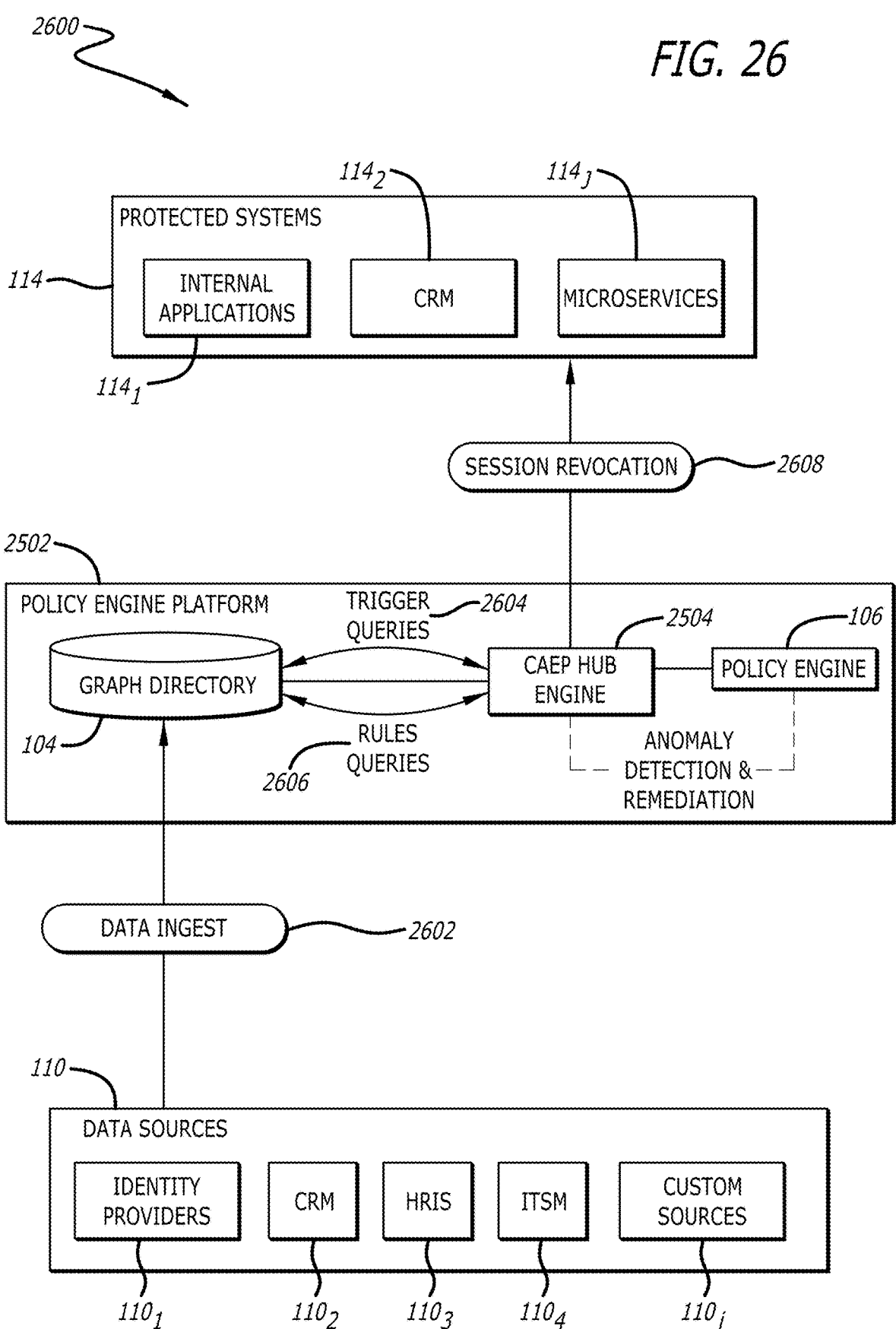
FIG. 26 is a conceptual diagram illustrating a sequence of operations including a change in a nodal graph triggering a rule resulting in an active user session revocation in accordance with embodiments of the disclosure.

Referring to FIG. 26, a conceptual diagram illustrating a sequence of operations including a change in a nodal graph triggering a rule resulting in an active user session revocation is shown in accordance with embodiments of the disclosure. As described above, the CAEP hub engine 2504 continuously monitors the nodal graph of the graph directory 104. Upon detection that an ingestion of data 2602 into the nodal graph has completed, the CAEP hub engine 2504 executes one or more trigger queries (trigger query) on the nodal graph. The trigger query 2604 is formed of one or more triggers that identify states in the nodal graph having defined states (e.g., non-compliant network devices authenticated in Otka), where state nodes are returned as query results (the trigger queries and results are collectively illustrated as 2604). The CAEP hub engine 2504 subsequently identifies which of the trigger queries that identified a condition resulting in a state node (addition thereof, edit thereof, or deletion thereof) and retrieve rules associated with such trigger queries (the rules query and the results are collectively illustrated as 2606).

Each rule is associated with a state node, where each rule may include one or more variables, and the state node includes parameters that are populated into the rule variables. The rules are then executed, which in some embodiments, includes performing a list of dynamic actions (e.g., dynamic due to the populating of parameters into variables). The dynamic actions may include remediation actions 2608 depending on the rule and trigger. For example, a rule that is implicated by a trigger of "If device authenticated by Okta and antivirus disable, revoke session," would result in the Okta session for the user being terminated. The user would be forced to reauthenticate. Further, in the event that the Okta session was used to authenticate and access, revoking the Otka session may also serve to revoke all sessions authenticated through Okta.

Figure 27:
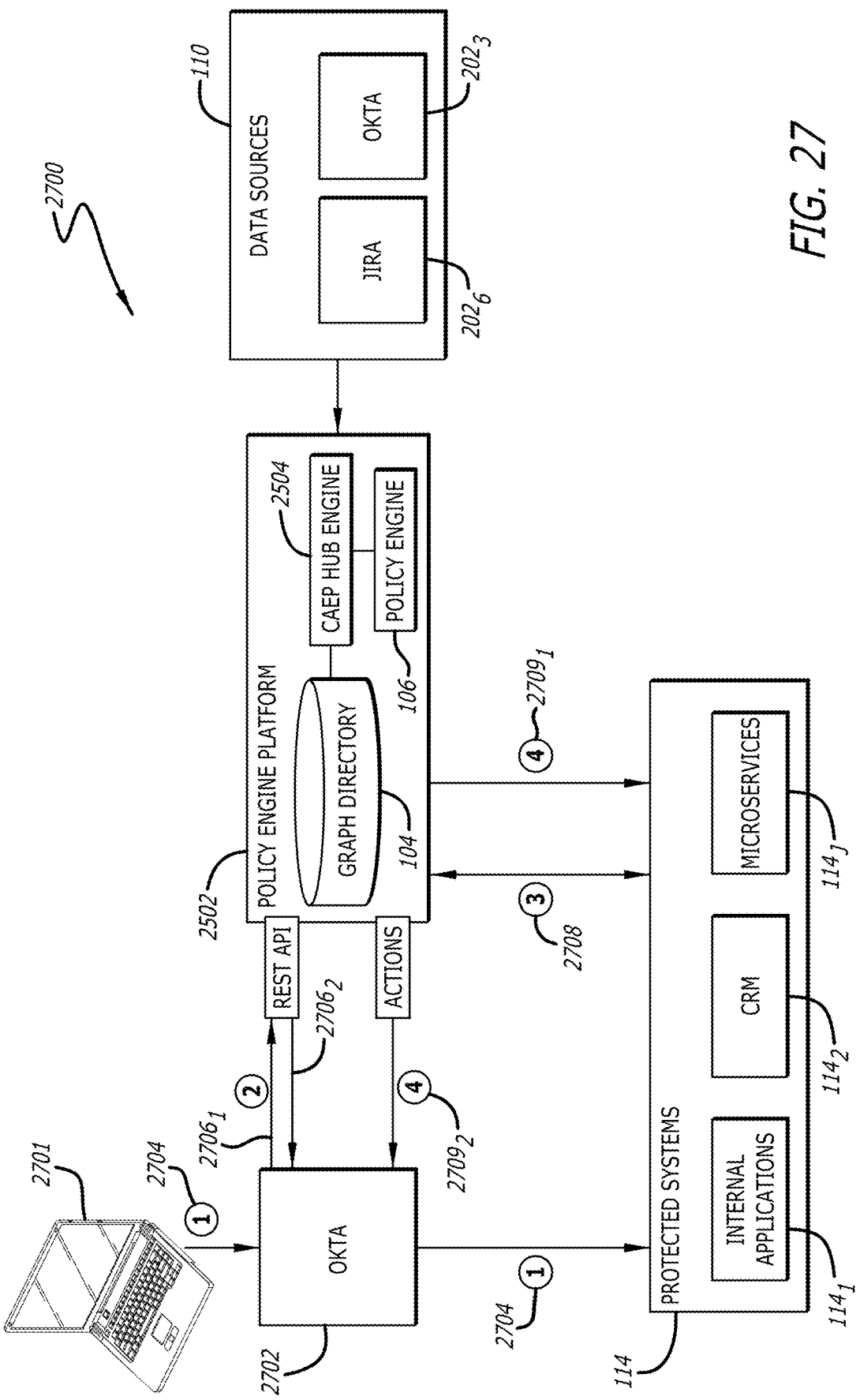
FIG. 27 is a conceptual diagram illustrating a sequence of operations detailing a deployment of the CAEP Hub engine with the policy engine platform in accordance with embodiments of the disclosure.

Referring now to FIG. 27, a conceptual diagram illustrating a sequence of operations detailing a deployment of the CAEP Hub engine with the policy engine platform is shown in accordance with embodiments of the disclosure. The network environment 2700 is shown to include many components illustrated in prior figures such as the data sources 110, the protected systems 114, and the policy engine platform 2502. Any discussion of the components illustrated in prior figures and discussed above will not be repeated here; however, any changes in functionality based on the embodiment illustrated in FIG. 27 will be discussed.

Broadly, FIG. 27 provides a sequence of operations that are labeled 1-4 that pertain to the deployment of the CAEP hub engine 2504, and specifically, illustrate an example of how the CAEP hub engine 2504 monitors access to resources and/or applications by analyzing access requests. Additionally, the sequence of operations illustrates how the CAEP hub engine 2504 may be configured to detect anomalies such as suspicious or anomalous user behavior (e.g., excessive login attempts within a given time period), suspicious or anomalous resource usage (e.g., anomalous timing of attempted access of a resource), etc.

In more detail, the sequence of operations begins when a user 2701 attempts to access a protected system 114, e.g., login to Salesforce (operation_1 2704). In this example, the user 2701 may have previously authenticated with a single sign-on service (SSO) 2702, such as Okta, and the SSO 2702 communicates with a protected system 114 such as Salesforce. In order for the user 2701 to authenticate with the protected system 114 through the SSO 2702, the SSO 2702 makes an access request via a REST API to the policy engine platform 2502, which is relayed to the CAEP hub engine 2504 and the policy engine 106 (operation_2 $2706_1$). In response to the access request, the policy engine 106 processes the access request as discussed above to determine a response, e.g., allow or deny, which is passed back to the SSO 2702 (operation_2 $2706_2$) and, in this example, the response is "allow," which enables the user 2701 to login to the protected system 114 (Salesforce).

In addition to the monitoring of data ingestion to determine whether changes to the nodal graph trigger changes to user access or other permissions, the CAEP hub engine 2504 may be configured to analyze user access requests to detect anomalous or suspicious behaviors. As the user 2701 interacts with the protected system 114 (Salesforce), access requests are continuously made to the policy engine platform 2502 from the protected system 114 (Salesforce) and responses are returned following processing by the policy engine 106 (operation_3 2708). The CAEP hub engine 2504 may monitor the continuous back-and-forth communications of operation_3 2708 to detect anomalous or suspicious behavior or activity. Examples of such detection may include detecting an anomalous number of access requests in a predetermined time frame, e.g., minute, hour, 24 hours, etc.; access requests to an unexpected resource; access requests to unusual times (e.g., outside business hours); an unusual string or sequence of access requests; etc.

In some embodiments, the CAEP hub engine 2504 may query the nodal graph for security rules such as "If user attempts to access asset_X outside of business hours, throw flag, block access, and revoke session." In such an example, the CAEP hub engine 2504 may automatically evaluate a set of security rules on each access request, where the set of security rules may be particular to an organization or to the user 2701. While the term "security rules" is utilized here to distinguish from the rules discussed in FIG. 28, the term "security rules" encompasses rules that are broader than merely security purposes (e.g., productivity rules such that when a sequence of access requests occurs, the CAEP hub engine 2504 may create a new grouping of users for efficient access to certain assets based on inclusion).

The CAEP hub engine 2504 may identify a set of rules to be evaluated at each access request based on the user, one or more groups to which the user belongs (e.g., engineering, human resources, legal, etc., within an organization), the organization that employs the user, etc., where the set of rules to be evaluated is retrieved from the nodal graph at the time of the access request. Such allows for dynamic evaluation of access requests based on the context at the time of each access request that is obtained at least from the access request, e.g., the user making the access request, the parameters and context of the access request.

Further, the CAEP hub engine 2504 may utilize historical data, e.g., past access requests, based on a rule to be evaluated. For example, the CAEP hub engine 2504 may evaluate a rule that determines whether a number of access requests have been made by a particular user within a predetermined time frame, or may be more specific in determining whether a number of access requests have been made by a particular user for a type of action to one or more assets within a predetermined time frame (e.g., repeated access requests for a particular asset within a predetermined time frame such as 5 minutes, 10 minutes, 24 hours, etc.

Thus, responsive to the access requests received by the policy engine platform 2502 at operation_3 2708, the CAEP hub engine 2504 evaluates one or more rules and when a rule triggers an action, one or more actions are initiated by the CAEP hub engine 2504 (operation_4 $2709_1$ and $2709_2$). The one or more actions may include denying access to a specific access request, revoking a user session of the user 2701, requiring reauthentication with SSO 2702 by the user 2701, generating and transmitting alerts of the anomalous or suspicious behavior to the user 2701, an admin, a SOC analyst, etc., removing the user 2701 from one or more groups (e.g., a group that has access to resource based on inclusion in the group), adding the user 2701 to one or more groups (e.g., a group that indicates recent anomalous behavior of its members and thus access to predetermined confidential or sensitive resources is denied to its members), etc. Additional example actions taken or initiated by the CAEP hub engine 2504 are illustrated at least in FIG. 30 and discussed below. It should be noted that the rules and actions taken in response may be built by users, admins, SOC analysts, etc., in much the same way as discussed herein with respect to snippets, policies, triggers, rules as discussed with respect to FIGS. 28-31G, which may include assembly of parameters forming a rule through user input to a graphical user interface.

Figure 28:
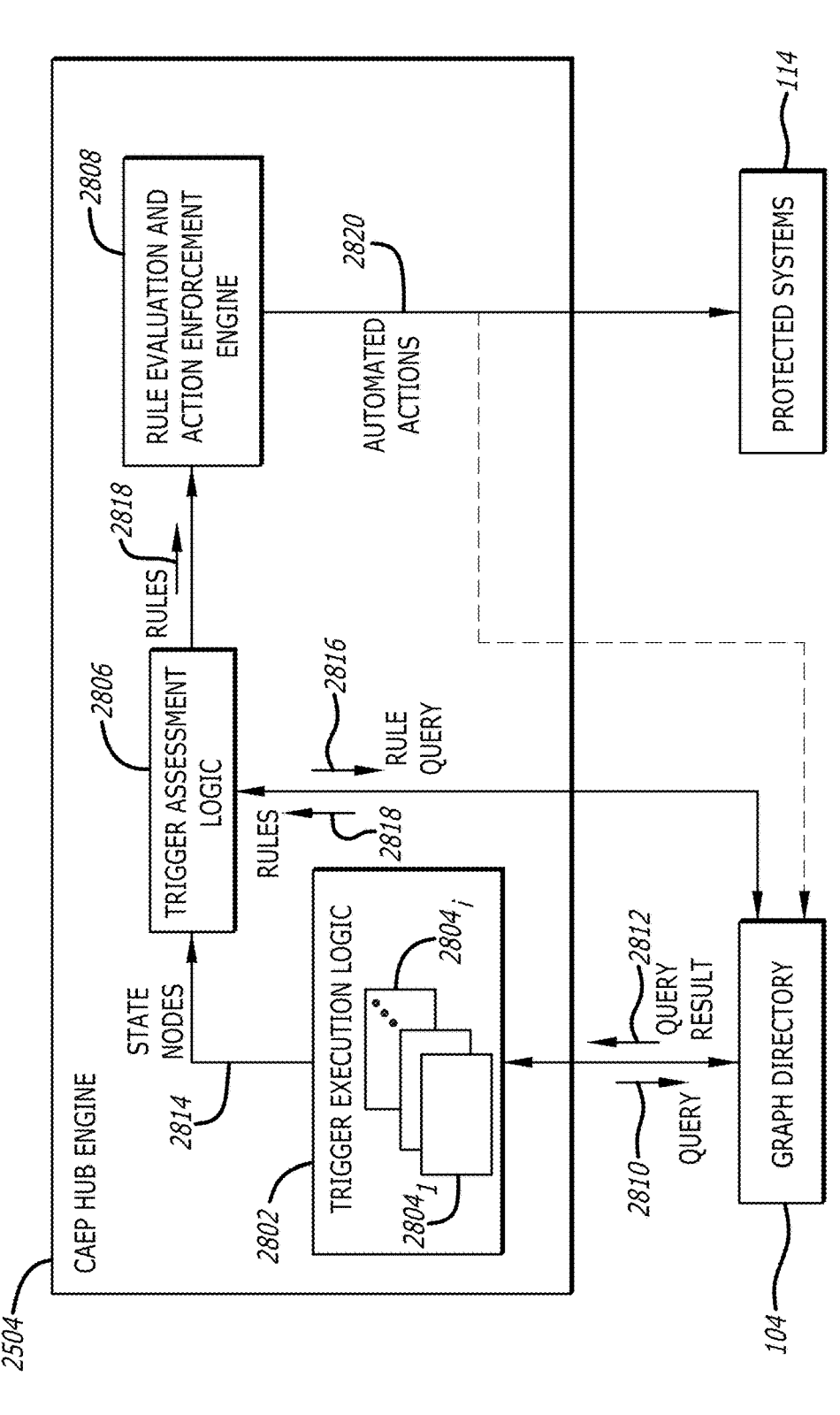
FIG. 28 is a logical representation of the CAEP hub engine within the policy engine platform of FIG. 25 operating on a computing device in accordance with embodiments of the disclosure.

Referring now to FIG. 28, a logical representation of the CAEP hub engine within the policy engine platform of FIG. 25 operating on a computing device is shown in accordance with embodiments of the disclosure. It should be understood that the CAEP hub engine 2502 may be stored on persistent storage and executed by one or more processors in the same manner as shown in with the policy engine platform 102 in FIG. 3. Further, the CAEP hub engine 2502 may be processing in the network environment 2800. The logical representation of the CAEP hub engine 2502 illustrates logical components that perform operations performed as a result of detecting that an ingestion of a data set into a nodal graph of the graph directory 104 has completed. As shown, logical components comprising the CAEP hub engine 2502 include a trigger execution logic 2802 that includes or otherwise access a plurality of triggers 2804₁-2804ᵢ, a trigger assessment logic 2806, and a rule evaluation and action enforcement engine (evaluation and enforcement engine) 2808.

The trigger execution logic 2802 identifies that a data ingestion process has completed (e.g., may notified by the policy engine platform 102 generally) and executes one or more queries (trigger query) 2810 against the nodal graph in the graph directory 104. The trigger query 2810 may be comprised of a set of triggers 2804₁-2804ᵢ such that the results 2812 return a result for each of the triggers 2804₁-2804ᵢ. The result corresponds to a state node, which as discussed above, provides state information at to a component of the nodal graph, and optionally parameters related to the component. As an example, a first trigger may query for user accounts that have attempts to access resources from multiple geographic areas in a short, predetermined time period (e.g., minutes, hours, days, etc.). Such a first trigger may cause a querying of all user access log nodes to identify access from multiple regions within the short, predetermined time period. The query results 2812 for such an example query would include a set of state nodes, each representing an account that has made access attempts from multiple geographic areas in a short, predetermined time period.

The trigger assessment logic 2806 assesses the triggers that are associated with the state. nodes 2814. Specifically, the trigger assessment logic 2806 determines, on a per state node basis, whether each trigger identifying a respective state node is utilized in a rule stored in the nodal graph. Those that are not included in a rule are filtered out or disregarded and those that are, are retrieved from the nodal graph via the rule query 2816 and not included in the results (rules) 2818. For instance, the rules query 2816 may request all rules including a particular trigger. Those triggers that are included in a rule in the nodal graph are returned in the results 2818 and are paired with corresponding state nodes; the state node identified by a trigger is paired with the rule in which the trigger appears as a rule:state node pairing. To note, a state node may be paired with a plurality of rules in the event that the trigger that identifies the state node is utilized in a plurality of rules stored in the nodal graph.

The rule:state node pairings 2818 are provided to the rule evaluation and enforcement engine 2808, which evaluates each rule by populating the rule with parameters from the state node of the rule:state node pairing and implements or initiates a set of automated (without human intervention) remediation actions 2820. As discussed through the disclosure, the remediation actions 2820 may be performed at a protected system 114, such as revoking a user session or on the nodal graph such as creating a new user group.

Referring now to FIG. 29, a flowchart illustrating operations of a method of real-time access enforcement through continuous monitoring of changes to a nodal graph generated through ingestion of data from a plurality of data sources is shown in accordance with embodiments of the disclosure. Each block illustrated in FIG. 29 represents an operation in the process 2900 performed by, for example, the CAEP hub engine 2504 of the policy engine platform 102 of FIG. 1. It should be understood that not every operation illustrated in FIG. 29 is required. In fact, certain operations may be optional to complete aspects of the process 2900. The discussion of the operations of process 2900 may be done so with reference to any of the previously described figures.

The process 2900 begins with an operation of executing a query against a nodal graph resulting in a set of state nodes, where the query is comprised of a plurality of trigger snippets and is executed in response to completion of an ingestion of a data set from a data source into the nodal graph (block 2902). An assessment is then performed on the listing of the set of state nodes resulting in a determination as to whether a trigger snippet that resulted in the identification (or creation) of a state node is associated with a rule stored within the nodal graph (block 2904). As discussed above, a rule may be formed of a trigger and a listing of actions to be initiated or taken in response to the trigger occurring. A set of rule:state node pairings is identified based on the assessment, e.g., a query is made to the nodal graph to determine which rules include a particular trigger snippet (as a trigger snippet may be generated but not used in a current rule) (block 2906). The query returns the rules that include the trigger snippets that were triggered in response to the ingestion of the data set. Each rule is then evaluated in view of the corresponding state node, which may include initiating or taking automated actions as set forth in the respective rule (block 2908).

As an example, a trigger snippet may conceptually be "Retrieve all Okta-authenticated devices that have antivirus disabled." Following the completion of a data ingestion, the trigger execution logic 2802 of FIG. 2 executes the query 2810 against the nodal graph of the graph directory 104, where the query 2810 includes the above-recited trigger snippet. When no such devices appear in the nodal graph, the trigger snippet is not triggered. However, when such a device appears in the nodal graph (e.g., an Okta-authenticated device disabled antivirus since the previous ingestion), a list of such devices is returned. The trigger assessment logic 2806 may query the nodal graph of the graph directory 104 to retrieve rules that include the trigger recited above and create a rule:state node pairing. A state node, as described above, includes context and/or parameters detailing a state of a component with the nodal graph, e.g., whether an Okta-authenticated device has antivirus with a status of true/false. Each rule is then evaluated by the rule evaluation and action enforcement engine 2808 such that one or more automated actions may be taken in response such as revoke a user session and transmit an alert to a user as to why the user session was revoked.

Figure 30:
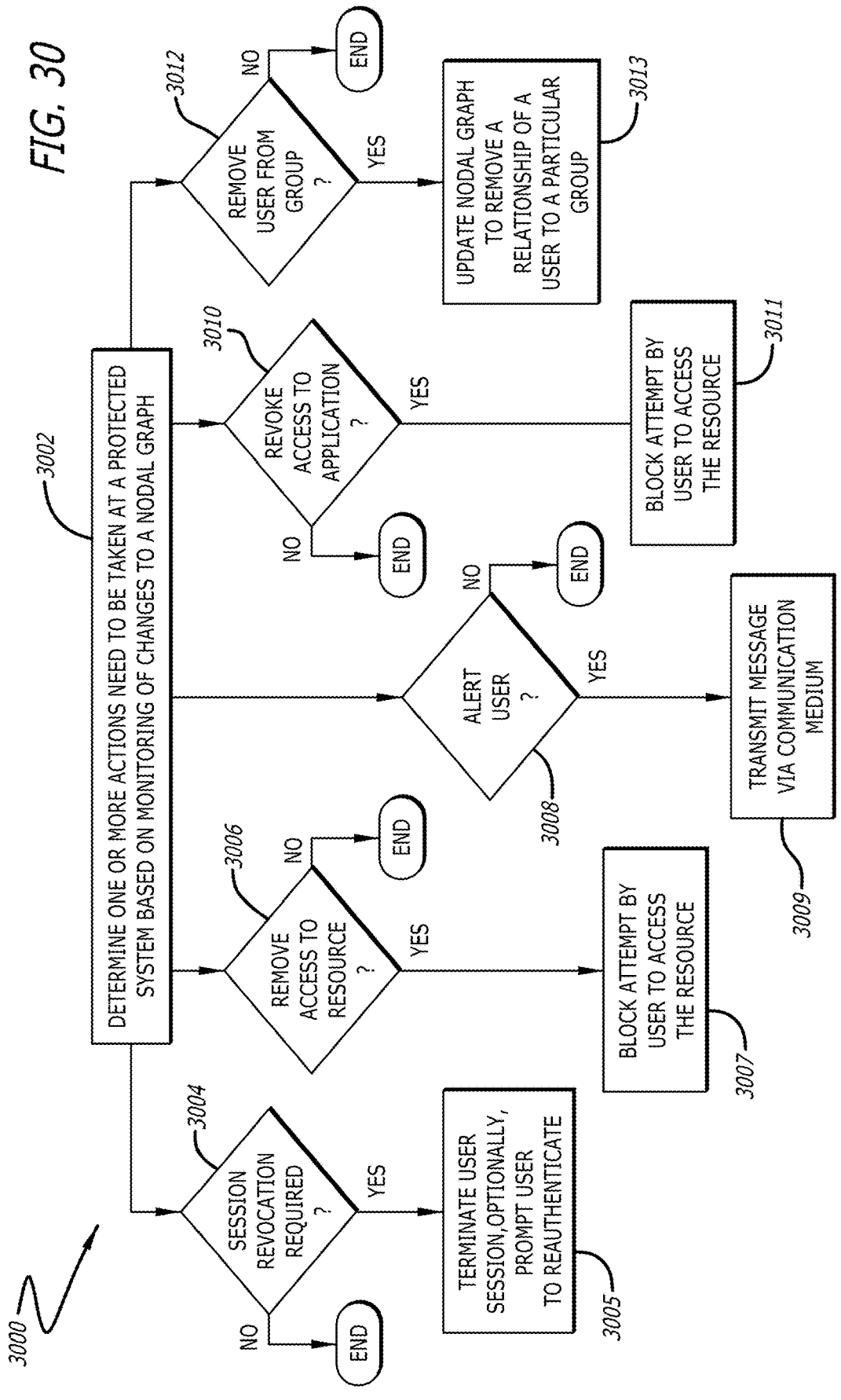
FIG. 30 is a flowchart illustrating detailed operations of a method of real-time access enforcement through continuous monitoring of changes to a nodal graph generated through ingestion of data from a plurality of data sources in accordance with embodiments of the disclosure.

Referring to FIG. 30, a flowchart illustrating detailed operations of a method of real-time access enforcement through continuous monitoring of changes to a nodal graph generated through ingestion of data from a plurality of data sources is shown in accordance with embodiments of the disclosure. Each block illustrated in FIG. 30 represents an operation in the process 3000 performed by, for example, the CAEP hub engine 2504 of the policy engine platform 102 of FIG. 1. It should be understood that not every operation illustrated in FIG. 30 is required. In fact, certain operations may be optional to complete aspects of the process 3000. The discussion of the operations of process 3000 may be done so with reference to any of the previously described figures.

The process 3000 begins with an operation of determining one or more actions are to be taken at a protected system based on monitoring of changes to a nodal graph (block 3002). As noted above with respect to FIG. 27, the one or more actions illustrated in FIG. 30 may also apply to the determination that one or more actions are to be taken due to monitoring of access requests. FIG. 30 provides a set of possible actions to be taken and how such is implemented. To note, the illustration of FIG. 30 emphasizes possible actions and implementations while other aspects of the disclosure focus on the procedure in determining which rule to evaluate, where a rule includes a listing of actions.

In some embodiments, following determination that one or more actions are to be taken, a session revocation may be required, which may be implemented by terminating a user session, and optionally, prompting the user to reauthenticate (blocks 3004, 3005). In some embodiments, following determination that one or more actions are to be taken, access to a resource may be removed or revoked, which may be implemented by blocking an attempt by the user to access the resource (blocks 3006, 3007). In some embodiments, following determination that one or more actions are to be taken, a user may be provided with an alert, which may be implemented by generating an alert and transmitting the alert via email, text message, or displaying the alert in a user interface (blocks 3008, 3009). In some embodiments, following determination that one or more actions are to be taken, a user may be removed from a group, which may be implemented by transmitting a signal to the nodal graph of the graph directory 104 to update a parameter resulting in removal of the user from a designated group (block 3012, 3013).

Referring now to FIGS. 31A-31G, example graphical user interface screens that are configured to enable interaction between a user and the CAEP hub engine are shown in accordance with embodiments of the disclosure. FIGS. 31A-31G generally provide a dashboard configured to display various deployment results of the CAEP hub engine 2504 and receive user input enabling navigation and filtering through results of processing by the CAEP hub engine 2504 as well as creating, editing, or deleting of protected systems, rules, and triggers. Many of the FIGS. 31A-31G illustrate a GUI displayed within a web browser application (web browser) 3100 that includes a side panel 3102 from which the "CAEP Hub" option is selected. Some of the FIGS. 31A-31G do not illustrate the web browser 3100 or the side panel 3102 or do so in a condensed manner. It should be understood that any of the GUIs in FIGS. 31A-31G may be rendered on a physical display screen of a network device within a web browser.

Figure 31A:
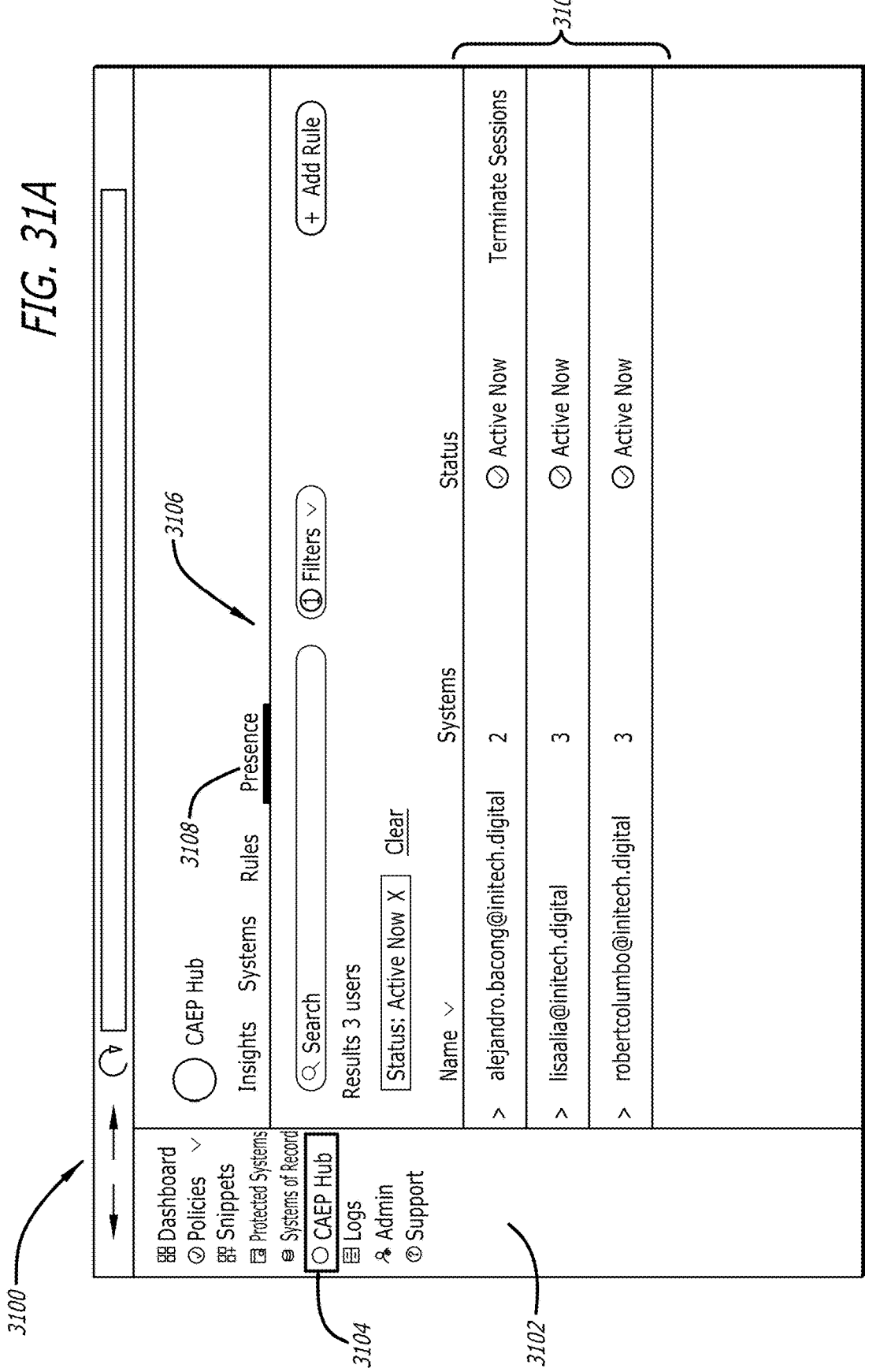
FIGS. 31A-31G illustrate example graphical user interface screens that are configured to enable interaction between a user and the CAEP hub engine in accordance with embodiments of the disclosure.

Referring now to FIG. 31A, a body display portion 3106 illustrates selection of a "Presence" tab, which corresponds to the display of users represented by a node in the nodal graph of the graph directory 104. The listing of users 3109 illustrates in this example that all users are "Active Now" and each present in multiple systems. However, it should be understood that users on the listing 3109 may not be active and have a status of "Last Active: [timestamp]," where the timestamp of the time at which the user was last active would be provided.

Figure 31B:
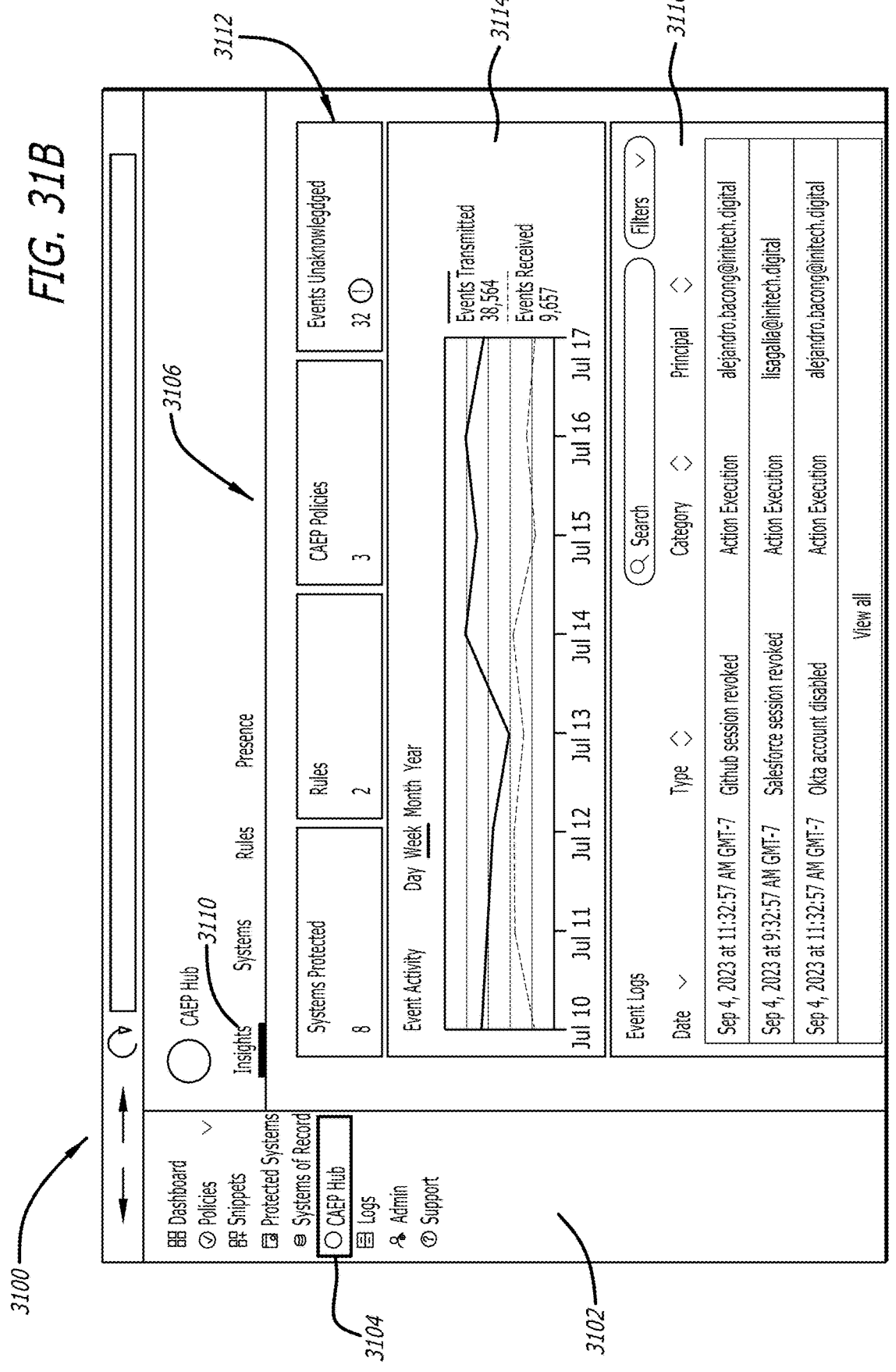

Referring now to FIG. 31B, a body display portion 3106 illustrates selection of an "Insights" tab, which corresponds to the display of a plurality of display components, each providing results of analytics or statistics performed by the CAEP hub engine 2504. For example, a row of display components 3112 may provide a quick reference to a number of total protected systems represented in the nodal graph, a total number of rules active in the nodal graph, a total number of CAEP policies, and a total number of unacknowledged events. The graphical diagram 3114 may illustrate event activity over a given time period thereby providing a visualization of activity over time enabling a user to identify any trends or spikes. As discussed above, the CAEP hub engine 2504 may perform anomaly detection methodologies upon receipt of an access request by the policy engine 106. While not shown here, results of the anomaly detection may be displayed on the "Insights" display and include a separate display component and/or be indicated on the graphical diagram 3114. For example, the CAEP hub engine 2504 may establish a normal behavior at an organizational level, group/department level, resource level, and/or user level, e.g., determining average usage of resources, access requests, or other metrics based on historical data, and then compare current data against the normal behavior to identify anomalies. In some embodiments, machine learning techniques may be utilized to identify trends or outliers. In some example, the machine learning techniques may predict future anomalies based on identified trends and proactively alert a user, an admin, a SOC analyst, etc., and optionally take any of the remediation actions discussed above to prevent or mitigate any possible harm due to anomalous access requests or resource usage. Additionally, the display component 3116 provides an event log listing.

Figure 31C:
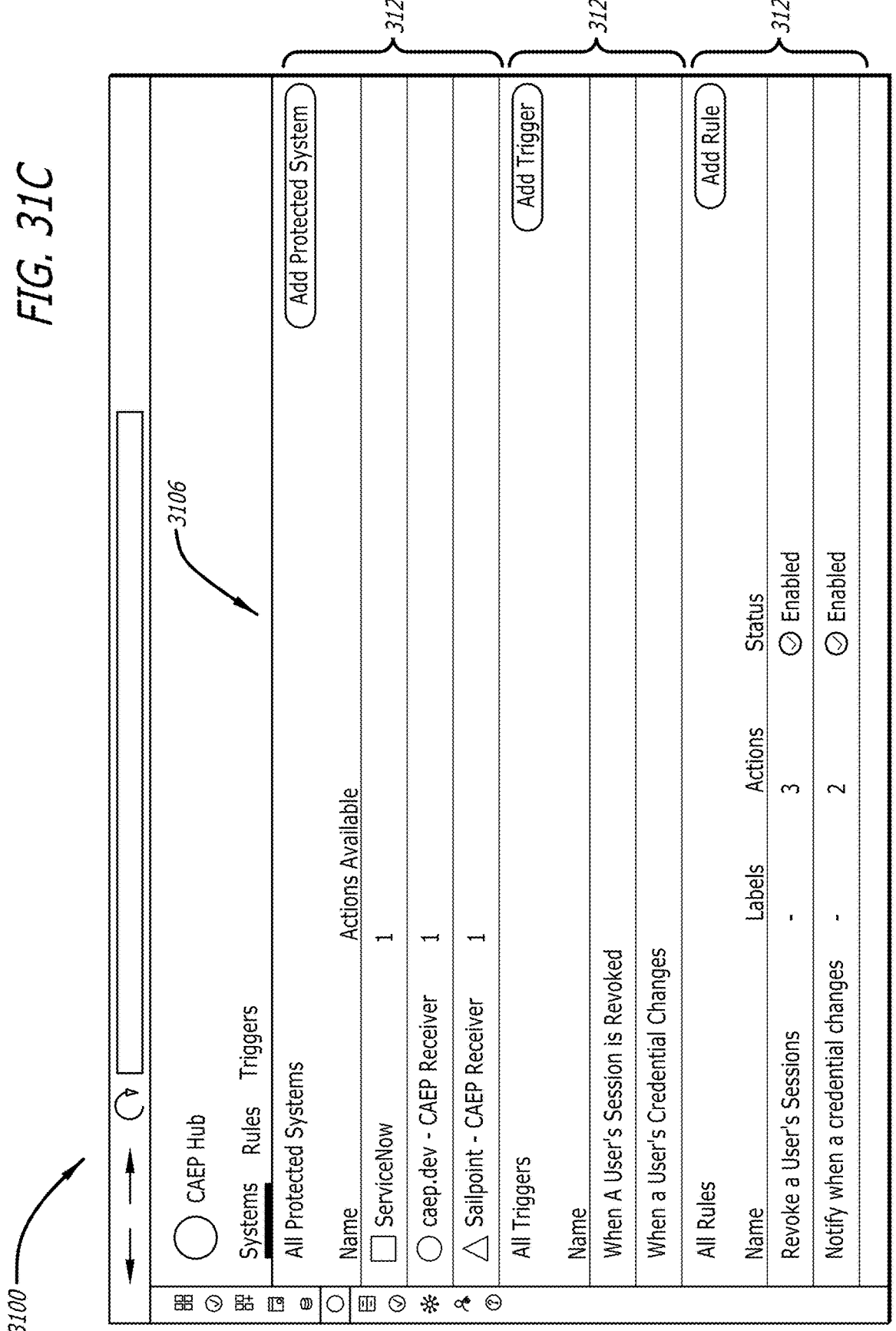

Referring now to FIG. 31C, a body display portion 3106 illustrates a combination of three tabs: "Systems," "Rules," and "Triggers." In some embodiments, each may be displayed in separate display screens. As shown in FIG. 31C, the body display portion 3106 includes a listing of the protected systems represented in the nodal graph (listing 3120), a listing of triggers in the nodal graph (listing 3122), and a listing of rules in the nodal graph (listing 3124).

Figure 31D:
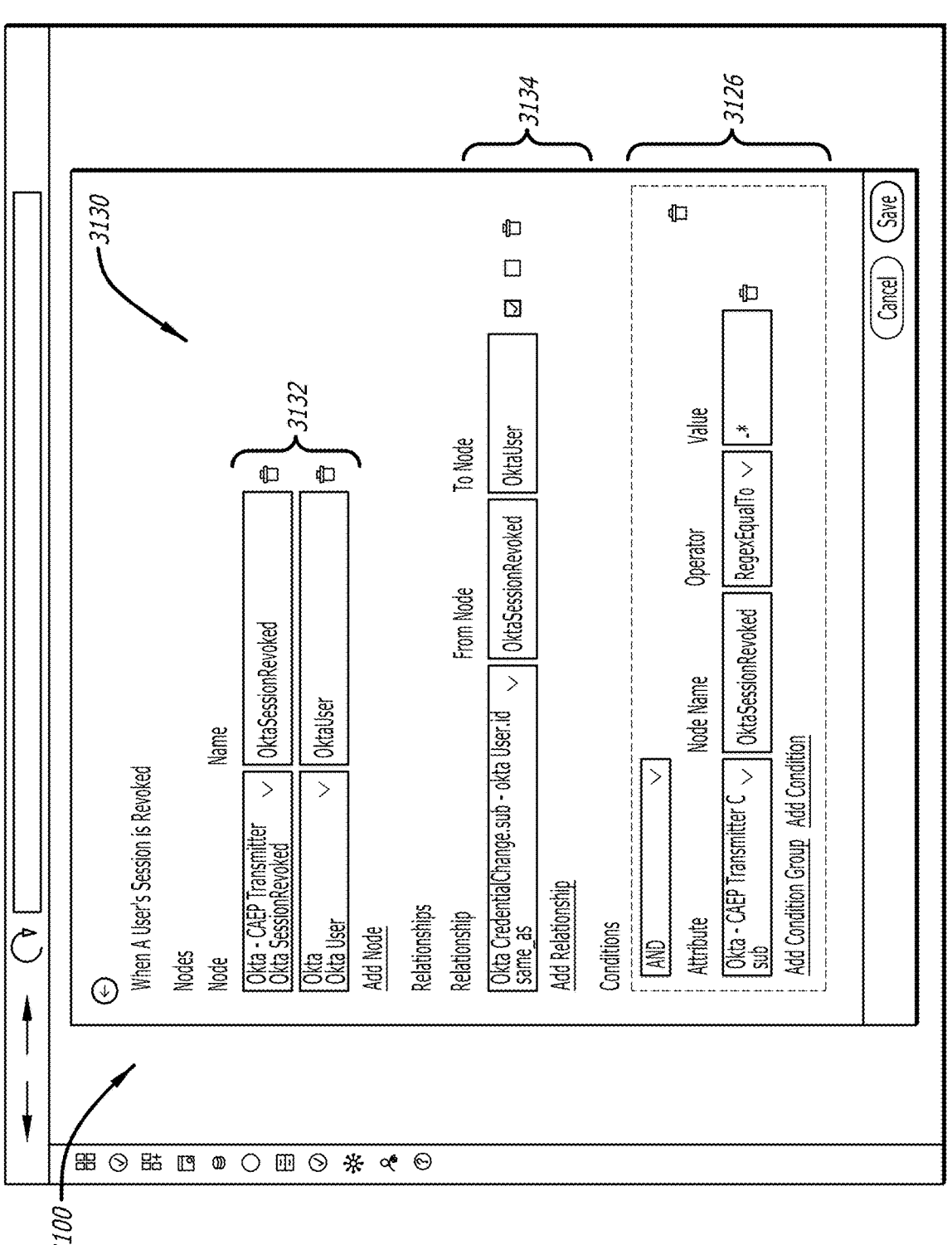

Referring now to FIG. 31D, a pop-up window 3130 (although may be displayed within the body display portion 3106) illustrates user interface (UI) components configured to receive user input pertaining to adding or editing a trigger (see the first trigger in the listing 3122 of FIG. 31C). The UI components 3132 provide for selection of nodes, the UI components 3134 provide for selection of relationships, and the UI components 3136 provide for selection of conditions.

Figure 31E:
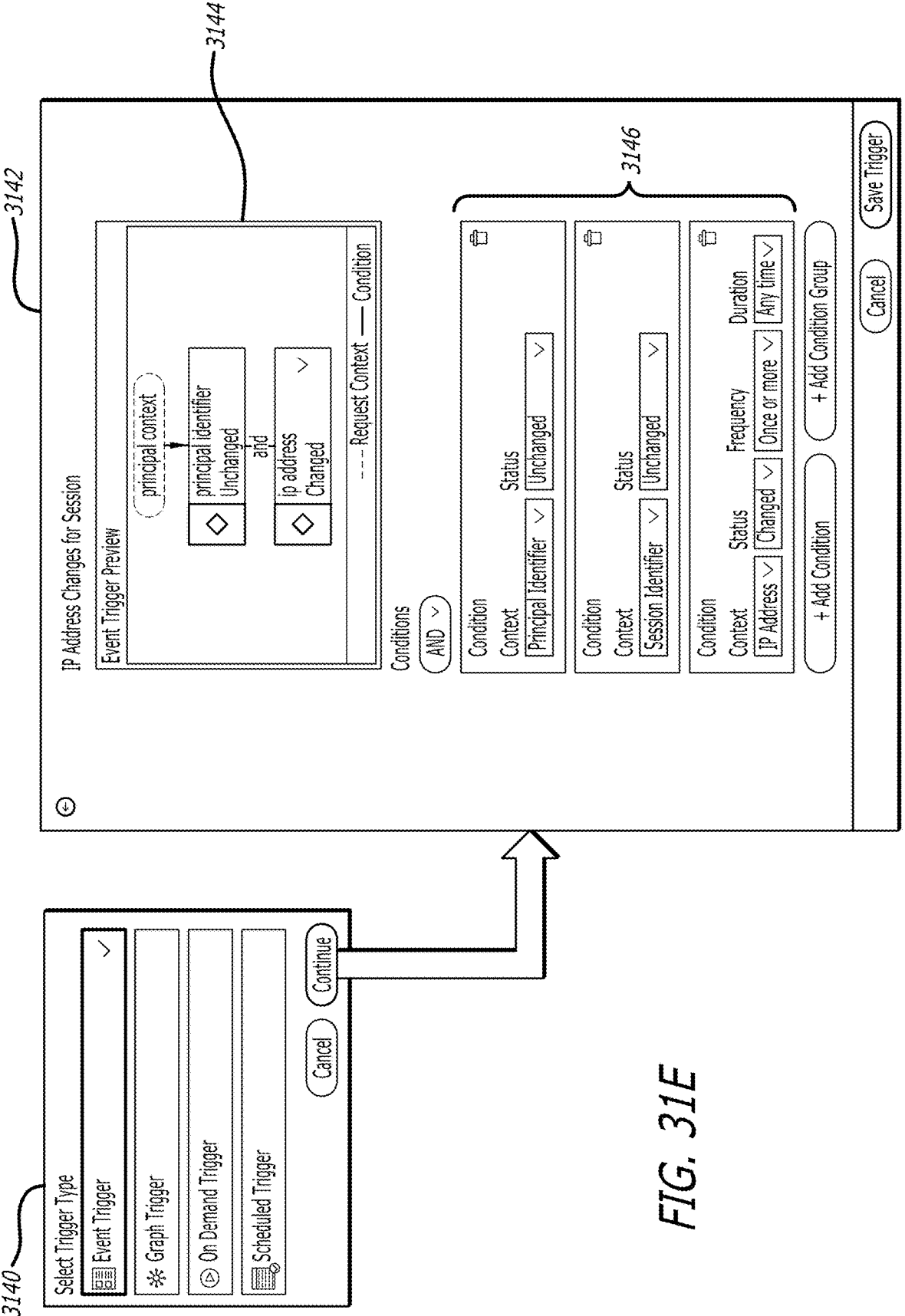

Referring now to FIG. 31E, the windows 3140, 3142 are shown (which may be pop-ups or displayed within the body display portion 3106) and illustrate UI components configured to receive user input pertaining to adding a trigger. The window 3140 provides for selection of a trigger type, where the selection results in particularized content displayed in the window 3142. Taking the event trigger selection as an example, the window 3142 display an event trigger preview component 3144 and a set of UI components 3146 corresponding to a set of conditions for the trigger.

Figure 31F:
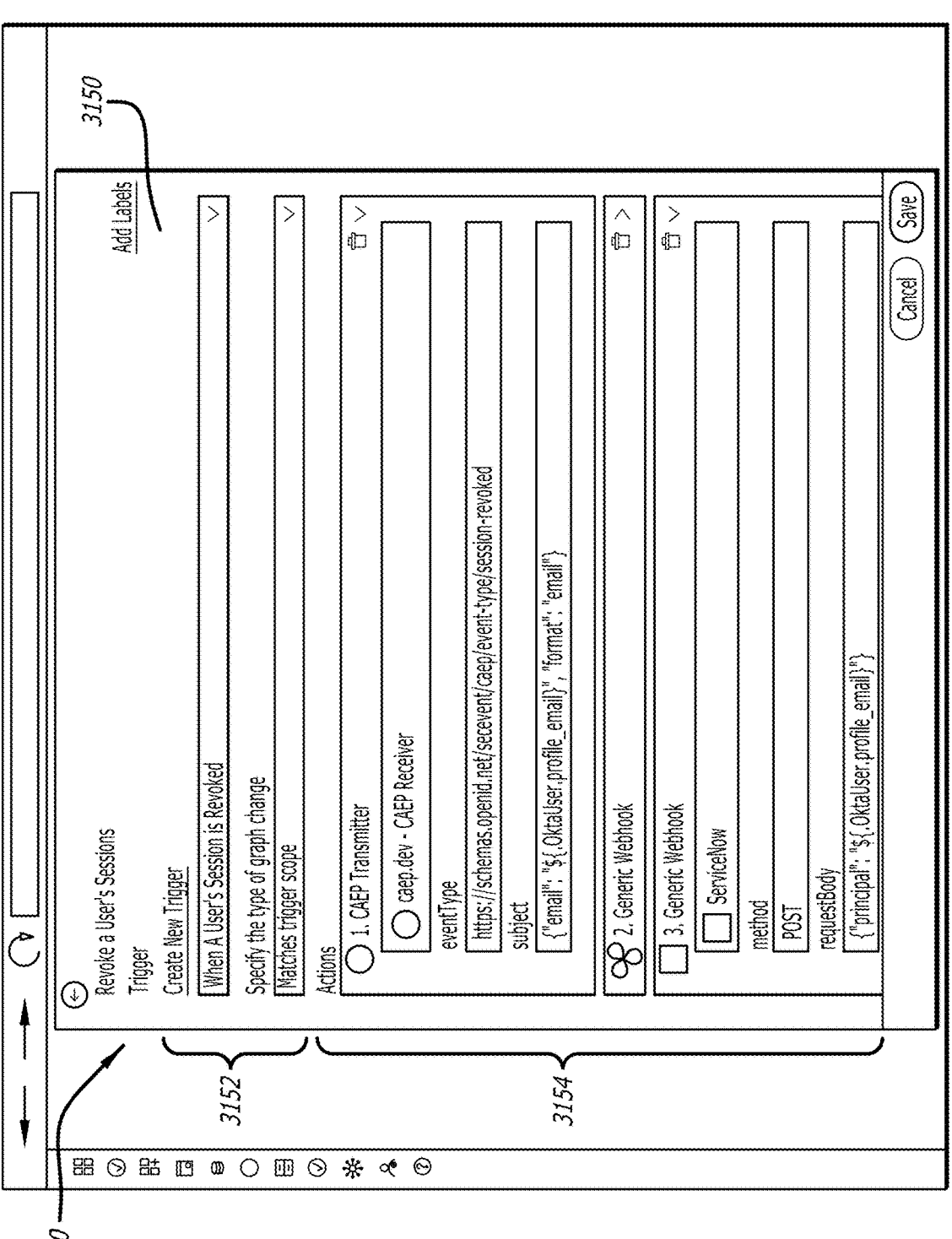

Referring now to FIG. 31F, a pop-up 3150 is shown (which may alternatively be displayed within the body display portion 3106) and illustrates UI components configured to receive user input pertaining to adding or editing a rule (see the first rule in the listing 3124 of FIG. 31C). The pop-up 3150 provides UI components 3152 for receiving user input corresponding to selection of a trigger, and UI components 3154 for receiving user input corresponding to selection of one or more actions to be taken in response to the trigger being detected.

Figure 31G:
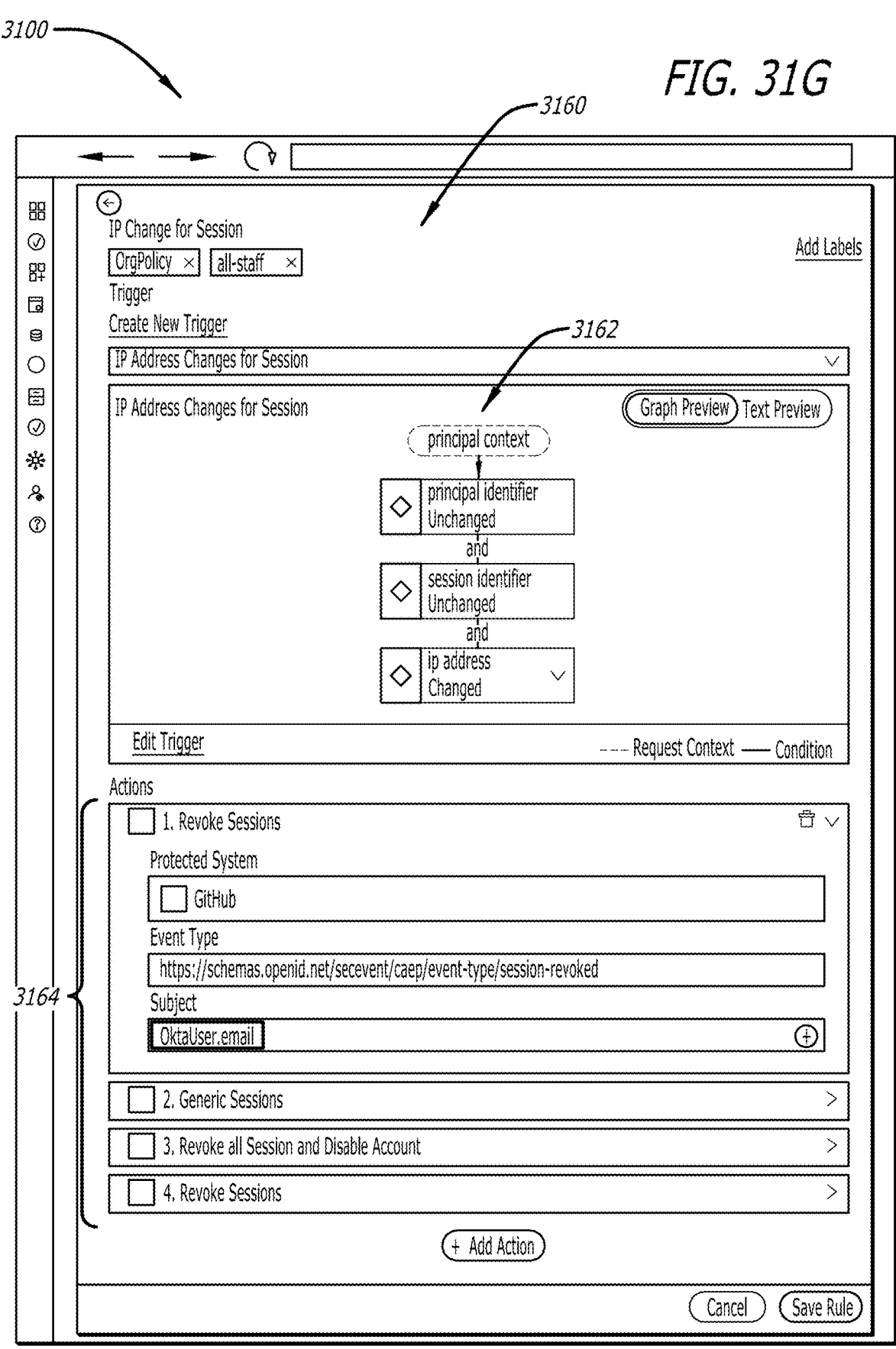

Referring now to FIG. 31G, a pop-up 3160 is shown (which may alternatively be displayed within the body display portion 3106) and illustrates UI components configured to receive user input pertaining to adding or editing a rule. The pop-up 3160 provides UI component 3160 for receiving user input corresponding to selection of a trigger, a graph preview 3162 of the trigger, and UI components 3164 for receiving user input corresponding to selection of one or more actions to be taken in response to the trigger being detected.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, data stores can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a computing device for execution thereby resulting in performance of the operations described in the flow chart by one or more components of the networked environments illustrated or described herein. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
executing a first query against a nodal graph resulting in retrieval of a state node, wherein the state node includes state information of a node or a relationship stored in the nodal graph, wherein the first query is comprised of a first trigger that represents a predetermined condition;
determining whether the first trigger forms a portion of a first rule stored in the nodal graph, wherein the first rule is comprised of the first trigger and a list of one or more actions to be taken when the predetermined condition of the first trigger appears in the nodal graph;
responsive to determining that the first trigger forms the portion of the first rule, executing a second query against the nodal graph resulting in retrieval of the first rule; and
executing the first rule based on context extracted from the state node, wherein executing the first rule results in an automated access management action.

2. The computer-implemented method of claim 1, wherein the automated access management action includes one or more of revoking a user session of a first user for a software application, denying access to the first user to a resource, or requiring the first user to reauthenticate with the software application, wherein the first user is indicated in the state node.

3. The computer-implemented method of claim 2, wherein revoking the user session includes either automatically (i) transmitting a logoff request to the software application or (ii) revoking an access token for the first user for the software application.

4. The computer-implemented method of claim 1, wherein the first query is comprised of a plurality of triggers including the first trigger, wherein each of the plurality of triggers is evaluated against the nodal graph.

5. The computer-implemented method of claim 1, further comprising:
ingesting data from one or more data sources; and
modifying at least a portion of the nodal graph based on the ingested data.

6. The computer-implemented method of claim 5, wherein executing the first query against the nodal graph is performed in response to completion of ingesting the data.

7. The computer-implemented method of claim 1, wherein the first trigger evaluates the nodal graph for a change to a node attribute or the relationship.

8. A computing device, comprising:
a processor; and
a non-transitory computer-readable medium having stored thereon instructions that, when executed by the processor, cause the processor to perform operations including:
executing a first query against a nodal graph resulting in retrieval of a state node, wherein the state node includes state information of a node or a relationship stored in the nodal graph, wherein the first query is comprised of a first trigger that represents a predetermined condition,
determining whether the first trigger forms a portion of a first rule stored in the nodal graph, wherein the first rule is comprised of the first trigger and a list of one or more actions to be taken when the predetermined condition of the first trigger appears in the nodal graph, responsive to determining that the first trigger forms the portion of the first rule, executing a second query against the nodal graph resulting in retrieval of the first rule, and executing the first rule based on context extracted from the state node, wherein executing the first rule results in an automated access management action.

9. The computing device of claim 8, wherein the automated access management action includes one or more of revoking a user session of a first user for a software application, denying access to the first user to a resource, or requiring the first user to reauthenticate with the software application, wherein the first user is indicated in the state node.

10. The computing device of claim 9, wherein revoking the user session includes either automatically (i) transmitting a logoff request to the software application or (ii) revoking an access token for the first user for the software application.

11. The computing device of claim 8, wherein the first query is comprised of a plurality of triggers including the first trigger, wherein each of the plurality of triggers is evaluated against the nodal graph.

12. The computing device of claim 8, wherein the operations further comprise:

ingesting data from one or more data sources; and modifying at least a portion of the nodal graph based on the ingested data.

13. The computing device of claim 12, wherein executing the first query against the nodal graph is performed in response to completion of ingesting the data.

14. The computing device of claim 8, wherein the first trigger evaluates the nodal graph for a change to a node attribute or the relationship.

15. A non-transitory computer-readable medium having stored thereon instructions that, when executed by one or more processors, cause the one or more processor to perform operations including:

executing a first query against a nodal graph resulting in retrieval of a state node, wherein the state node includes state information of a node or a relationship stored in the nodal graph, wherein the first query is comprised of a first trigger that represents a predetermined condition;

determining whether the first trigger forms a portion of a first rule stored in the nodal graph, wherein the first rule is comprised of the first trigger and a list of one or more actions to be taken when the predetermined condition of the first trigger appears in the nodal graph;

responsive to determining that the first trigger forms the portion of the first rule, executing a second query against the nodal graph resulting in retrieval of the first rule; and executing the first rule based on context extracted from the state node, wherein executing the first rule results in an automated access management action.

16. The non-transitory computer-readable medium of claim 15, wherein the automated access management action includes one or more of revoking a user session of a first user for a software application, denying access to the first user to a resource, or requiring the first user to reauthenticate with the software application, wherein the first user is indicated in the state node.

17. The non-transitory computer-readable medium of claim 16, wherein revoking the user session includes either automatically (i) transmitting a logoff request to the software application or (ii) revoking an access token for the first user for the software application.

18. The non-transitory computer-readable medium of claim 15, wherein the first query is comprised of a plurality of triggers including the first trigger, wherein each of the plurality of triggers is evaluated against the nodal graph.

19. The non-transitory computer-readable medium of claim 15, wherein the operations further comprise:

ingesting data from one or more data sources; and modifying at least a portion of the nodal graph based on the ingested data, wherein executing the first query against the nodal graph is performed in response to completion of ingesting the data.

20. The non-transitory computer-readable medium of claim 15, wherein the first trigger evaluates the nodal graph for a change to a node attribute or the relationship.

* * * * *